US010259210B2

(12) United States Patent
Vidavsky et al.

(10) Patent No.: US 10,259,210 B2
(45) Date of Patent: Apr. 16, 2019

(54) THREE-DIMENSIONAL INKJET PRINTING USING RING-OPENING METATHESIS POLYMERIZATION

(71) Applicant: Stratasys Ltd., Rehovot (IL)

(72) Inventors: Yuval Vidavsky, Moshav Sitriya (IL); Ira Yudovin-Farber, Rehovot (IL)

(73) Assignee: Statasys Ltd., Rehovot (IL)

( * ) Notice: Subject to any disclaimer, the term of this patent is extended or adjusted under 35 U.S.C. 154(b) by 0 days.

(21) Appl. No.: 15/520,458

(22) PCT Filed: Oct. 21, 2015

(86) PCT No.: PCT/IL2015/051038
§ 371 (c)(1),
(2) Date: Apr. 20, 2017

(87) PCT Pub. No.: WO2016/063282
PCT Pub. Date: Apr. 28, 2016

(65) Prior Publication Data

US 2017/0306171 A1 Oct. 26, 2017

Related U.S. Application Data

(60) Provisional application No. 62/066,398, filed on Oct. 21, 2014, provisional application No. 62/066,402, filed on Oct. 21, 2014.

(51) Int. Cl.
*C09D 11/101* (2014.01)
*B41J 2/135* (2006.01)
(Continued)

(52) U.S. Cl.
CPC ............... *B33Y 30/00* (2014.12); *B01J 37/34* (2013.01); *B29C 64/112* (2017.08); *B33Y 70/00* (2014.12);
(Continued)

(58) Field of Classification Search
CPC ....... B33Y 30/00; B33Y 70/00; B29C 64/112; B29C 67/0059; B01J 37/34; B41J 2/135; C08F 2/46; C08G 61/06; C09D 11/101
(Continued)

(56) References Cited

U.S. PATENT DOCUMENTS 5,059,266 A * 10/1991 Yamane .................. B29C 41/08 118/313
5,312,940 A 5/1994 Grubbs et al.
(Continued)

FOREIGN PATENT DOCUMENTS

CN 103338864 10/2013
EP 1498256 1/2005
(Continued)

OTHER PUBLICATIONS

International Search Report and the Written Opinion dated Apr. 3, 2017 From the International Searching Authority Re. Application No. PCT/IL2017/050141. (12 Pages).
(Continued)

*Primary Examiner* — Huan Tran
*Assistant Examiner* — Alexander D Shenderov

(57) ABSTRACT

Methods for fabricating three-dimensional objects by 3D-inkjet printing technology are provided. The methods utilize curable materials that polymerize via ring-opening metathesis polymerization (ROMP) for fabricating the object. Systems suitable for performing these methods and kits containing modeling material formulations usable in the methods are also provided.

40 Claims, 3 Drawing Sheets

(51) Int. Cl.
*B01J 37/34* (2006.01)
*B33Y 70/00* (2015.01)
*C08F 2/46* (2006.01)
*B33Y 30/00* (2015.01)
*B29C 64/112* (2017.01)
*C08J 3/28* (2006.01)
*C08G 61/08* (2006.01)

(52) U.S. Cl.
CPC ................. *B41J 2/135* (2013.01); *C08F 2/46* (2013.01); *C08G 61/08* (2013.01); *C08J 3/28* (2013.01); *C09D 11/101* (2013.01); *C08G 2261/135* (2013.01); *C08G 2261/3325* (2013.01); *C08G 2261/62* (2013.01); *C08G 2261/63* (2013.01); *C08G 2261/74* (2013.01); *C08G 2261/76* (2013.01)

(58) Field of Classification Search
USPC .......................................................... 347/107
See application file for complete search history.

(56) References Cited

U.S. PATENT DOCUMENTS

| | | | |
|---|---|---|---|
| 5,342,909 A | 8/1994 | Grubbs et al. | |
| 5,710,298 A | 1/1998 | Grubbs et al. | |
| 5,728,917 A | 3/1998 | Grubbs et al. | |
| 5,831,108 A | 11/1998 | Grubbs et al. | |
| 6,001,909 A | 12/1999 | Setiabudi | |
| 6,259,962 B1 | 7/2001 | Gothait | |
| 6,569,373 B2 | 5/2003 | Napadensky | |
| 6,658,314 B1 | 12/2003 | Gothait | |
| 6,850,334 B1 | 2/2005 | Gothait | |
| 7,183,335 B2 | 2/2007 | Napadensky | |
| 7,209,797 B2 | 4/2007 | Kritchman et al. | |
| 7,225,045 B2 | 5/2007 | Gothait et al. | |
| 7,300,619 B2 | 11/2007 | Napadensky et al. | |
| 7,479,510 B2 | 1/2009 | Napadensky et al. | |
| 7,500,846 B2 | 3/2009 | Eshed et al. | |
| 7,962,237 B2 | 6/2011 | Kritchman | |
| 8,487,046 B2 | 7/2013 | Recher et al. | |
| 8,519,069 B2 | 8/2013 | Drozdzak | |
| 9,139,752 B2 | 9/2015 | Desbois et al. | |
| 2004/0256754 A1* | 12/2004 | Koguchi | B41J 3/4073 264/40.1 |
| 2005/0040564 A1* | 2/2005 | Oliver | B29C 64/112 264/494 |
| 2006/0111807 A1* | 5/2006 | Gothait | B29C 67/0059 700/119 |
| 2007/0168815 A1 | 7/2007 | Napadensky et al. | |
| 2008/0023884 A1* | 1/2008 | Konze | C08F 6/006 264/328.1 |
| 2009/0156766 A1 | 6/2009 | Lemcoff et al. | |
| 2010/0029801 A1* | 2/2010 | Moszner | A61K 6/0215 522/167 |
| 2011/0171147 A1 | 7/2011 | Samorski et al. | |
| 2012/0065755 A1 | 3/2012 | Steingart et al. | |
| 2012/0283406 A1 | 11/2012 | Klitschke et al. | |
| 2013/0065466 A1 | 3/2013 | Desbois et al. | |
| 2013/0073068 A1 | 3/2013 | Napadensky | |
| 2013/0128452 A1 | 5/2013 | Baquiano et al. | |
| 2018/0029291 A1 | 2/2018 | Matzner et al. | |

FOREIGN PATENT DOCUMENTS

| | | |
|---|---|---|
| EP | 1757613 | 2/2007 |
| EP | 2280017 | 2/2011 |
| EP | 2452958 | 5/2012 |
| EP | 2460587 | 6/2012 |
| EP | 2801588 | 11/2014 |
| GB | 2382798 | 6/2003 |
| WO | WO 97/20865 | 6/1997 |
| WO | WO 97/29135 | 8/1997 |
| WO | WO 99/51344 | 10/1999 |
| WO | WO 2009/013751 | 1/2009 |
| WO | WO 2013/072874 | 5/2013 |
| WO | WO 2013/128452 | 9/2013 |
| WO | WO 2014/144634 | 9/2014 |
| WO | WO 2016/063282 | 4/2016 |
| WO | WO 2016/125170 | 8/2016 |
| WO | WO 2017/068590 | 4/2017 |
| WO | WO 2017/134672 | 8/2017 |
| WO | WO 2017/134673 | 8/2017 |
| WO | WO 2017/134674 | 8/2017 |
| WO | WO 2017/134676 | 8/2017 |
| WO | WO 2017/187434 | 11/2017 |

OTHER PUBLICATIONS

International Search Report and the Written Opinion dated May 8, 2016 From the International Searching Authority Re. Application No. PCT/IL2016/050135.

International Search Report and the Written Opinion dated Apr. 10, 2017 From the International Searching Authority Re. Application No. PCT/IL2017/050138. (12 Pages).

International Search Report and the Written Opinion dated Jan. 28, 2016 From the International Searching Authority Re. Application No. PCT/IL2015/051038.

International Search Report and the Written Opinion dated Jan. 29, 2017 From the International Searching Authority Re. Application No. PCT/IL2016/051142. (12 Pages).

Ben-Asuly et al. "Photoactivation of Ruthenium Olefin Metathesis Initiators", Organometallics, 28: 4652-4655, Published on Web Jul. 24, 2009.

Diesendruck et al. "A Latent S-Chelated Ruthenium Benzylidene Initiator for Ring-Opening Metathesis Polymerization", Journal of Polymer Science, Part A: Polymer Chemistry, 47(16): 4209-4213, Published Online Jul. 8, 2009.

Doubrovski et al. "Voxel-Based Fabrication Through Material Property Mapping: A Design Method for Bitmap Printing", Computer-Aided Design, 60: 3-13, Available Online Jun. 5, 2014. Abstract, p. 7, Para 3.2.3, p. 11-12, Para 5.2.

Fleet et al. "Inkjet Printing of Self-Healing Polymers for Enhanced Composite Interlaminar Properties", Journal of Materials Chemistry A, 3(5): 2283-2293, Published Online Dec. 8, 2014.

Gong et al. "ROMP of Acetoxy-Substituted Dicyclopentadiene to Linear Polymer With a High Tg", RSC Advances, 5(33): 26185-26188, Mar. 20, 2015.

Harris et al. "Photolithographic Patterning of Ring-Opening Metathesis Catalysts on Silicon", Advanced Materials, 17(1): 39-42, Published Online Jan. 6, 2005.

Pastine et al. "Chemicals on Demand With Phototriggerable Microcapsules", Journal of the American Chemical Society, JACS, 131(38): 13586-13587, Sep. 30, 2009.

Piermattei et al. "Activating Catalysts With Mechanical Force", Nature Chemistry, 1(2): 133-137, Advanced Online Publication Apr. 6, 2009.

Saha et al. "Cross-Linked ROMP Polymers Based on Odourless Dicyclopentadiene Derivatives", Polymer Chemistry, 7(18): 3071-3075, Published Online Apr. 14, 2016.

Szadkowska et al. "Latent Thermo-Switchable Olefin Metathesis Initiators Bearing a Pyridyl-Functionalized Chelating Carbene: Influence of the Leaving Group's Rigidity on the Catalyst's Performance", Organometallics, 29: 117-124, Published on Web Dec. 14, 2009.

Vidavsky et al. "Light-Induced Olefin Metathesis", Beilstein Journal of Organic Chemistry, 6: 1106-1119, Nov. 23, 2010.

Wang et al. "Cationic RuII Complexes With N-Heterocyclic Carbene Ligands for UV-Induced Ring-Opening Metathesis Polymerization", Angewandte Chemie International Edition, 47(17): 3267-3270, Published Online Mar. 12, 2008.

Wilson et al. "Autonomic Healing of Epoxy Vinyl Esters via Ring Opening Metathesis Polymerization", Advanced Functional Materials, 18(1): 44-52, 2008.

International Preliminary Report on Patentability dated May 4, 2017 From the International Bureau of WIPO Re. Application No. PCT/IL2015/051038. (7 Pages).

(56) References Cited

OTHER PUBLICATIONS

Invitation to Pay Additional Fees, Communication Relating to the Results of the Partial International Search and the Provisional Opinion dated Jun. 26, 2017 From the International Searching Authority Re. Application No. PCT/IL2017/050136. (18 Pages).
Khodabakhshi et al. "Anionic Polymerisation of Caprolactam at the Small-Scale via DSC Investigations: A Method to Be Used in an Additive Manufacturing Process", Journal of Thermal Analysis and Calorimetry, XP055377014, 115(1): 383-391, Published Online Aug. 8, 2013. p. 384, Para 1, Fig.1, Para 2.
International Search Report and the Written Opinion dated Aug. 24, 2017 From the International Searching Authority Re. Application No. PCT/IL2017/050136. (22 Pages).
International Search Report and the Written Opinion dated May 18, 2017 From the International Searching Authority Re. Application No. PCT/IL2017/050140. (15 Pages).
International Search Report and the Written Opinion dated May 22, 2017 From the International Searching Authority Re. Application No. PCT/IL2017/050137. (12 Pages).
International Preliminary Report on Patentability dated Aug. 17, 2017 From the International Bureau of WIPO Re. Application. No. PCT/IL2016/050135. (7 Pages).
International Preliminary Report on Patentability dated Aug. 16, 2018 From the International Bureau of WIPO Re. Application No. PCT/IL2017/050136. (14 Pages).
International Preliminary Report on Patentability dated Aug. 16, 2018 From the International Bureau of WIPO Re. Application No. PCT/IL2017/050137. (8 Pages).
International Preliminary Report on Patentability dated Aug. 16, 2018 From the International Bureau of WIPO Re. Application No. PCT/IL2017/050138. (12 Pages).
International Preliminary Report on Patentability dated Aug. 16, 2018 From the International Bureau of WIPO Re. Application No. PCT/IL2017/050140. (10 Pages).
Supplementary European Search Report and the European Search Opinion dated Jun. 21, 2018 From the European Patent Office Re. Application No. 15852577.4. (6 Pages).
Supplementary European Search Report and the European Search Opinion dated Sep. 20, 2018 From the European Patent Office Re. Application No. 16746248.0. (8 Pages).
Doubrovski et al. "Voxel-Based Fabrication Through Material Property Mapping: A Design Method for Bitmap Printing", Computer-Aided Design, XP029107146, 60(C): 3-13, Mar. 2015. p. 1-9.
International Preliminary Report on Patentability dated Nov. 8, 2018 From the International Bureau of WIPO Re. Application No. PCT/IL2017/050141. (7 Pages).
Notification of Office Action and Search Report dated Oct. 23, 2018 From the State Intellectual Property Office of the People's Republic of China Re. Application No. 201580069912.7 and Its Summary of Office Action in English. (19 Pages).

* cited by examiner

THREE-DIMENSIONAL INKJET PRINTING USING RING-OPENING METATHESIS POLYMERIZATION

RELATED APPLICATIONS

This application is a National Phase of PCT Patent Application No. PCT/IL2015/051038 having International filing date of Oct. 21, 2015, which claims the benefit of priority under 35 USC § 119(e) of U.S. Provisional Patent Application Nos. 62/066,402 and 62/066,398 both filed on Oct. 21, 2014. The contents of the above applications are all incorporated by reference as if fully set forth herein in their entirety.

FIELD AND BACKGROUND OF THE INVENTION

The present invention, in some embodiments thereof, relates to three-dimensional inkjet printing and, more particularly, but not exclusively, to systems, methods and compositions employing ring-opening metathesis polymerization (ROMP) for producing three-dimensional objects.

Three-dimensional (3D) inkjet printing is a known process for building three dimensional objects by selectively jetting chemical compositions, for example, polymerizable compositions, via ink-jet printing head nozzles onto a printing tray in consecutive layers, according to pre-determined image data. 3D inkjet printing is performed by a layer by layer inkjet deposition of chemical formulations, which form together a building material formulation. Thus, a chemical formulation is dispensed in droplets from a dispensing head having a set of nozzles to form layers on a receiving medium. The layers may then be cured or solidified using a suitable methodology, to form solidified or partially solidified layers of the building material.

The chemical formulations used for forming the building material may be initially liquid and subsequently hardened (cured or solidified) to form the required layer shape. The hardening may be effected, for example, by exposing the building material to a curing energy such as thermal energy (e.g., by heating the building material) or to irradiation (e.g., UV or other photo-irradiation), or may be activated chemically, for example, by acid or base activation.

The chemical (e.g., polymerizable) formulations utilized in inkjet 3D printing processes are therefore selected so as to meet the process requirements, namely, exhibiting a suitable viscosity during jetting (thus being non-curable under jetting conditions) and rapid curing or solidification, typically upon exposure to a stimulus, on the receiving medium. For example, when used with currently available commercial print heads, the formulations should have a relatively low viscosity, of about 10-25 cPs, at the jetting temperature, in order to be jettable.

Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237 and U.S. Patent Application having Publication No. 2013/0073068, all of the same Assignee, the contents of which are hereby incorporated by reference.

In a 3D inkjet printing process such as Polyjet™ (Stratasys Ltd., Israel), the building material is selectively jetted from one or more printing heads and deposited onto a fabrication tray in consecutive layers according to a pre-determined configuration as defined by a software file.

A printing system utilized in a 3D inkjet printing process may include a receiving medium and one or more printing heads. The receiving medium can be, for example, a fabrication tray that may include a horizontal surface to carry the material dispensed from the printing head. The printing head(s) may be, for example, an ink jet head having a plurality of dispensing nozzles arranged in an array of one or more rows along the longitudinal axis of the printing head. The jetting nozzles dispense material onto the receiving medium to create the layers representing cross sections of a 3D object.

In addition, there may be a source of curing energy, for curing the dispensed building material.

Additionally, the printing system may include a leveling device for leveling and/or establishing the height of each layer after deposition and at least partial solidification, prior to the deposition of a subsequent layer.

The building materials may include modeling materials and support materials, which form the object and optionally the temporary support constructions supporting the object as it is being built, respectively.

The modeling material (which may include one or more material(s)) is deposited to produce the desired object/s and the support material (which may include one or more material(s)) is used, with or without modeling material elements, to provide support structures for specific areas of the object during building and assure adequate vertical placement of subsequent object layers, e.g., in cases where objects include overhanging features or shapes such as curved geometries, negative angles, voids, and so on.

Both the modeling and support materials are preferably liquid at the working temperature at which they are dispensed, and subsequently hardened, upon exposure to a condition that affects curing of the materials, to form the required layer shape. After printing completion, support structures are removed to reveal the final shape of the fabricated 3D object.

In order to be compatible with most of the commercially-available printing heads utilized in a 3D inkjet printing system, the uncured building material should feature the following characteristics: a relatively low viscosity (e.g., Brookfield Viscosity of up to 35 cps, preferably from 8 to 20 cps) at the working (e.g., jetting) temperature; Surface tension of from about 25 to about 40 Dyne/cm; and a Newtonian liquid behavior and high reactivity to a selected curing energy, to enable immediate solidification of the jetted layer upon activation (e.g., application of curing energy).

For example, a thin layer (5-40 microns) of the building material should be sufficiently cured within about 200 milliseconds when exposed to UV radiation (of 0.5 $W/cm^2$, 340-390 nm), in order to enable the building of subsequent layers.

When a cured rigid modeling material forms the final object, the cured material should preferably exhibit heat deflection temperature (HDT) which is higher than room temperature, in order to assure its usability. Typically, the cured modeling material should exhibit HDT of at least 35° C. For an object to be stable in variable conditions, a higher HDT is desirable.

Currently, the most commonly used building materials in 3D inkjet printing are photocurable, particularly, UV-curable materials such as acrylic based materials.

Currently available UV-curable modeling material formulations for forming rigid objects by inkjet printing which exhibit the properties required for 3D inkjet printing, while being jetted, as described herein, are acrylic-based materials, which typically exhibit HDT in the range of 35-50° C. Exemplary such formulations are generally described, for example, in U.S. Pat. No. 7,479,510, to the present Assignee.

Such modeling material formulations, when cured, typically feature impact resistance in the range of 20-25 J/m.

While rigid objects, or parts thereof, fabricated by 3D inkjet printing, should desirably exhibit good durability and stability, a cured modeling material should feature both high HDT and high toughness, i.e., impact resistance.

Ring-opening metathesis polymerization (ROMP) is a type of olefin metathesis chain-growth polymerization. The driving force of the reaction is the relief of strained cyclic structures, typically cyclic olefins (e.g., norbornenes or cyclopentenes) or dienes (e.g., cyclopentadiene-based compounds). The polymerization reaction typically occurs in the presence of organometallic catalysts, and the ROMP catalytic cycle involves formation of metal-carbene species, which reacts with the double bond in the cyclic structure to thereby form a highly strained metallacyclobutane intermediate. The ring then opens, giving a linear chain double bonded to the metal with a terminal double bond as well. The as formed metal-carbene species then reacts with the double bond on another cyclic monomer, and so forth.

During recent decades ROMP evolved as a powerful polymerization tool especially due to the development of well-defined transition metal complexes as catalysts. Ruthenium, molybdenum and osmium carbene complexes useful as catalysts of ROMP reactions are described, for example, in U.S. Pat. Nos. 5,312,940, 5,342,909, 5,728,917, 5,710, 298, 5,831,108, and 6,001,909; and PCT International Patent Applications having Publication Nos. WO 97/20865, WO 97/29135 and WO 99/51344.

The use of ROMP reactions in reaction injection molding (RIM) has been described, for example, in U.S. Patent Application Publication Nos. 2011/0171147, 2005/0691432, U.S. Pat. No. 8,487,046, EP Patent Application Publication No. 2452958, and EP Patent No. 2280017. One of the ROMP materials used in ROMP-based RIM is dicyclopentadiene (DCPD).

Poly-DCPD-based materials exhibit good mechanical properties and combine both good toughness and high thermal resistance. For example, polymeric materials based on DCPD were used to produce Telene 1810, which features a viscosity of about 200 cps at room temperature, HDT of 120° C. and impact of 300 J/m; and Metton M15XX, which features a viscosity of 300 cps at room temperature, Tg of 130° C. and impact of 460 J/m [see, for example, www(dot) metton(dot)com/index(dot)php/metton-lmr/benefits].

Additional background art includes WO 2013/128452; Adv. Funct. Mater. 2008, 18, 44-52; Adv. Mater. 2005, 17, 39-42; and Pastine, S. J.; Okawa, D.; Zettl, A.; Fréchet, J. M. J. J. Am. Chem. Soc. 2009, 131, 13586-13587; Vidavsky and Lemcoff, *Beilstein J. Org. Chem.* 2010, 6, 1106-1119; Ben-Asuly et al., Organometallics 2009, 28, 4652-4655; Piermattei et al., Nature Chemistry, DOI: 10.1038/NCHEM.167; Szadkowska et al., Organometallics 2010, 29, 117-124; Diesendruck, C. E.; Vidavsky, Y.; Ben-Asuly, A.; Lemcoff, N. G., J. Polym. Sci., Part A: Polym. Chem. 2009, 47, 4209-4213; Wang et al., Angew. Chem. Int. Ed. 2008, 47, 3267-3270; U.S. Patent Application Publication No. 2009-0156766; WO 2014/144634; EP Patent No. 1757613 and U.S. Pat. No. 8,519,069.

SUMMARY OF THE INVENTION

A need still exists for a 3D inkjet printing technology which employs curable materials that exhibit, upon curing, improved mechanical performance, particularly a combination of high thermal resistance and high toughness.

Ring Opening Metathesis Polymerization (ROMP) systems are used for producing cured material that exhibit valuable properties, such as relatively low shrinkage, high thermal resistance, high impact, and chemical and solvent resistance.

However, the ROMP technology is limited to methodologies such as, for example, RIM, mainly due to its rapid curing at ambient conditions (e.g., room temperature). Typically, a formulation polymerizable by ROMP immediately solidifies once a catalyst is added and/or activated. This limits the use of ROMP formulations in 3D inkjet processes, where liquid formulations that feature viscosity within a pre-determined range are required to be passed through inkjet printing heads.

The present inventors have now designed various methodologies which enable using ROMP formulations in 3D inkjet printing.

Embodiments of the present invention therefore relate to methods (processes) and systems designed for practicing ROMP-based methodologies while meeting the requirements of 3D inkjet printing processes.

According to an aspect of some embodiments of the present invention there is provided a method of fabricating a three-dimensional object, the method comprising sequentially forming a plurality of layers in a configured pattern corresponding to the shape of the object, thereby forming the object, wherein the formation of each layer comprises dispensing by at least one inkjet printing head at least one modeling material formulation, the at least one modeling material formulation comprising an unsaturated cyclic monomer polymerizable by ring opening metathesis polymerization (ROMP) and a catalyst for initiating ROMP of the monomer; and exposing the modeling material formulation to a condition for inducing initiation of ROMP of the monomer by the catalyst, to thereby obtain a cured modeling material.

According to some of any of the embodiments described herein, the at least one modeling material formulation is characterized by a viscosity of no more than 35 centipoises at a temperature of the inkjet printing head during the dispensing.

According to some of any of the embodiments described herein, prior to the exposing the catalyst does not initiate ROMP of the monomer.

According to some of any of the embodiments described herein, the modeling material formulation is such that the catalyst is active towards initiating ROMP of the monomer, and wherein prior to the exposing, the catalyst and the monomer are physically separated in the modeling material formulation.

According to some of any of the embodiments described herein, the condition comprises removing the physical separation between the catalyst and the monomer.

According to some of any of the embodiments described herein, at least one of the monomer and the catalyst is enveloped by a capsule and the condition affects a release of the monomer or the catalyst from the capsule.

According to some of any of the embodiments described herein, the condition is selected from heat, irradiation, and shear forces.

According to some of any of the embodiments described herein, the modeling material formulation is such that the catalyst is inactive towards initiating ROMP of the monomer.

According to some of any of the embodiments described herein, the catalyst is activatable upon exposure to the condition.

According to some of any of the embodiments described herein, the condition is selected from heat, and irradiation.

According to some of any of the embodiments described herein, the formulation further comprises an activator for chemically activating the catalyst towards initiating ROMP of the monomer, and wherein prior to the exposing, the activator is incapable of activating the catalyst.

According to some of any of the embodiments described herein, the activator is physically separated from the catalyst and/or the monomer in the modeling material formulation.

According to some of these embodiments, the condition comprises removing the physical separation between the activator and the catalyst and/or the monomer.

According to some of any of the embodiments described herein, the activator is enveloped by a capsule, and the condition affects a release of the activator from the capsule.

According to some of these embodiments, the condition is selected from heat, irradiation, and shear forces.

According to some of any of the embodiments described herein, prior to the exposing, the activator is chemically inactive in the modeling material formulation.

According to some of any of the embodiments described herein, the activator is activatable upon exposure to the condition, such that exposing to the condition activates the activator, thereby activating the catalyst towards initiating ROMP of the monomer.

According to some of any of the embodiments described herein, the modeling material formulation further comprises a ROMP inhibitor.

According to some of any of the embodiments described herein, the unsaturated cyclic monomer comprises a chemical group polymerizable via a non-ROMP reaction, and wherein the exposing further comprises exposing the at least modeling material formulation to a condition for inducing polymerization of the chemical group.

According to some of any of the embodiments described herein, the at least one modeling material formulation further comprises at least one material polymerizable or curable via a non-ROMP reaction, and wherein the exposing further comprises exposing the at least one modeling material formulation to a condition for inducing polymerization or curing of the at least one material.

According to some of any of the embodiments described herein, the material comprises a monomer and/or an oligomer polymerizable by free-radical polymerization, cationic polymerization, anionic polymerization, or polycondensation.

According to some of any of the embodiments described herein, the material is polymerizable or curable upon exposure to irradiation (photopolymerizable).

According to some of any of the embodiments described herein, the polymerizable material and the unsaturated cyclic monomer polymerizable by the ROMP are included in the same modeling material formulation.

According to some of any of the embodiments described herein, at least one of the non-ROMP polymerizable or curable material, an initiator of the non-ROMP reaction, the monomer polymerizable by the ROMP, and the catalyst is physically separated from other components in the formulation.

According to some of any of the embodiments described herein, the formation of each layer comprises dispensing at least two modeling material formulations by at least two inkjet printing heads, each head jetting one of the at least two modeling material formulations.

According to some of any of the embodiments described herein, at least one of the modeling material formulations comprises the unsaturated cyclic monomer polymerizable by ROMP, and at least another one of the modeling material formulations comprises the catalyst.

According to some of any of the embodiments described herein, at least one of the modeling material formulations which comprises the monomer polymerizable by ROMP further comprises an activator for chemically activating the catalyst towards initiating ROMP of the monomer.

According to some of any of the embodiments described herein, at least one of the modeling material formulations comprises the unsaturated cyclic monomer polymerizable by ROMP, and the catalyst, and at least another one of the modeling material formulations comprises an activator for chemically activating the catalyst towards initiating ROMP of the monomer.

According to some of any of the embodiments described herein, the material polymerizable or curable by the non-ROMP reaction is comprised in at least one modeling material formulation which is devoid of the monomer polymerizable by the ROMP.

According to some of any of the embodiments described herein, at least one of the modeling material formulations further comprises an initiator of the non-ROMP reaction.

According to some of any of the embodiments described herein, the initiator is comprised in at least one modeling material formulation which is devoid of the material polymerizable or curable via the non-ROMP reaction.

According to some of any of the embodiments described herein, the condition for inducing ROMP of the unsaturated cyclic monomer and the condition for inducing polymerization or curing of the chemical group or material polymerizable or curable via a non-ROMP reaction are the same.

According to some of any of the embodiments described herein, the formation of each layer comprises dispensing at least two modeling material formulations by at least two inkjet printing heads, each head jetting one of the at least two modeling material formulations, wherein at least two of the modeling material formulations independently comprise the unsaturated cyclic monomer polymerizable by ROMP, and wherein at least one of the modeling material formulations comprises the catalyst.

According to some of any of the embodiments described herein, at least one of the modeling material formulations comprises the monomer and the catalyst.

According to some of any of the embodiments described herein, the catalyst is activatable by the condition.

According to some of any of the embodiments described herein, the catalyst is activatable by an activator, and at least one of the modeling material formulations comprises the activator and is devoid of the catalyst.

According to some of any of the embodiments described herein, at least one of the formulations comprises the monomer and the activator and at least another one of the formulations comprises the monomer and the catalyst.

According to some of any of the embodiments described herein, at least one of the formulations comprises a ROMP inhibitor.

According to some of any of the embodiments described herein, the at least one modeling material formulation further comprises an impact modifying agent, a stabilizing agent, a surface active agent, an elastomeric component or composition, and an antioxidant, a filler, a pigment, and a dispersant.

According to some of any of the embodiments described herein, the method further comprises dispensing a support material formulation by at one additional inkjet printing head.

According to some of any of the embodiments described herein, the method further comprises exposing the support material formulation to a condition for inducing polymerization or curing of the support material formulation.

According to some of any of the embodiments described herein, a temperature of an inkjet printing head for dispensing the at least one modeling material formulation ranges from 25° C. to 65° C.

According to some of any of the embodiments described herein, a temperature of an inkjet printing head for dispensing the at least one modeling material formulation ranges from 65° C. to about 85° C.

According to some of any of the embodiments described herein, the condition is heat and wherein the exposing to the condition comprises heating the at least one modeling material formulation following the dispensing.

According to some of any of the embodiments described herein, the heating is by infrared radiation.

According to some of any of the embodiments described herein, the heating is by a ceramic radiation source.

According to some of any of the embodiments described herein, the dispensing is in a chamber, and wherein the heating comprises heating the chamber to a temperature of from 25° C. to 65° C.

According to some of any of the embodiments described herein, the plurality of layers are formed on a working tray, the method comprising heating the working tray to a temperature of from 25° C. to 65° C.

According to some of any of the embodiments described herein, the dispensing and/or the exposing are performed under inert atmosphere.

According to some of any of the embodiments described herein, the method further comprises straightening the layer by a leveling device.

According to some of any of the embodiments described herein, the method further comprises removing cured or partially cured formulation off the leveling device.

According to some of any of the embodiments described herein, the straightening is while the at least one formulation is at a cured or partially cured state.

According to some of any of the embodiments described herein, the straightening comprises milling.

According to an aspect of some embodiments of the present invention there is provided a method of fabricating a three-dimensional object, the method comprising:

sequentially forming a plurality of layers in a configured pattern corresponding to a shape a mold of the object; and introducing to the mold a molding composition comprising an unsaturated cyclic monomer polymerizable by ROMP and a catalyst for initiating ROMP of the monomer, thereby obtaining the object.

According to some of any of the embodiments described herein, the method further comprises exposing the mold to a condition for inducing initiation of ROMP of the monomer by the catalyst.

According to an aspect of some embodiments of the present invention there is provided a system for three-dimensional inkjet printing, comprising: a plurality of inkjet printing heads, each having a plurality of separated nozzles; and a controller configured for controlling the inkjet printing heads to dispense droplets of a building material formulation in layers, such as to print a three-dimensional object on the tray; and a leveling device configured for straightening at least one of the layers, while the at least one formulation is at a cured or partially cured state.

According to some of any of the embodiments described herein, the leveling device comprises a milling device.

According to some of any of the embodiments described herein, the leveling device is a self-cleaning leveling device, wherein the cured or partially cured formulation is periodically removed from the leveling device.

According to some of any of the embodiments described herein, at least one of the inkjet printing heads is configured to maintain a temperature of at least 25° C. but which does not exceed 65° C.

According to some of any of the embodiments described herein, at least one of the inkjet printing heads is configured to heat at least one modeling material formulation of the building material formulation prior to the dispensing, and wherein the controller is configured to ensure that a temperature within the at least one inkjet printing head is at least 25° C. but not above 65° C.

According to some of any of the embodiments described herein, the system further comprises a mixing chamber for preparing at least modeling material formulation of the building material formulation prior to entry of the at least one modeling material formulation into a respective head, wherein a position and fluid communication between the mixing chamber and the respective head is selected such that at least 80% of the at least one modeling material formulation entering the respective head remains uncured.

According to some of any of the embodiments described herein, the system further comprises a ceramic radiation source for heating the building material formulation by radiation.

According to some of any of the embodiments described herein, the system further comprises a chamber containing the plurality of inkjet printing heads, and a chamber heater configured for heating the chamber, wherein the controller is configured to maintain, within the chamber, a temperature of at least about 25° C. but no more than 65° C.

According to some of any of the embodiments described herein, the system further comprises a chamber containing the plurality of inkjet printing heads, the chamber being generally sealed to an environment outside the chamber.

According to some of any of the embodiments described herein, the chamber comprises a gas inlet and the system comprises a gas source configured for filling the chamber by an inert gas through the gas inlet.

According to some of any of the embodiments described herein, the controller is configured for generating, continuously or intermittently, inflow and outflow of the inert gas through the gas inlet and the gas outlet, respectively.

According to some of any of the embodiments described herein, the system further comprises a gas flow generating device, placed within the chamber and configured for generating a flow of the inert gas within the chamber.

According to some of any of the embodiments described herein, the system further comprises a working tray for carrying the layers once formed, and a working tray heater for heating the working tray.

Further according to any one of the embodiments of the present invention, there are provided kits usable in the methods as described herein.

Further according to any one of the embodiments of the present invention, there are provided three-dimensional objects obtainable by the methods as described herein.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
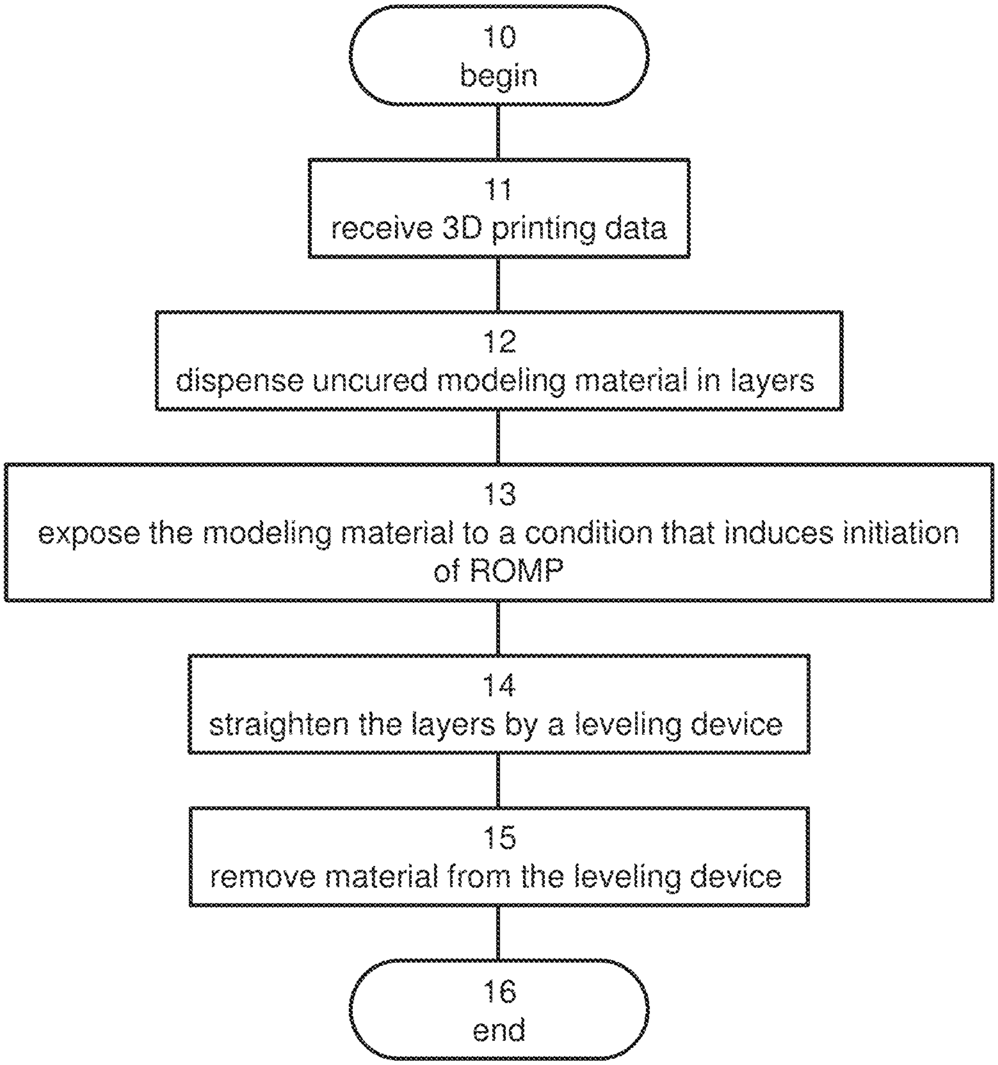
FIG. 1 is a flowchart describing an exemplary method according to some embodiments of the present invention.

The present invention, in some embodiments thereof, relates to three-dimensional inkjet printing and, more particularly, but not exclusively, to systems, methods and compositions employing ring-opening metathesis polymerization (ROMP) for producing three-dimensional objects.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present inventors have sought for methodologies that enable utilizing materials obtained via ring opening metathesis polymerization (ROMP) in three-dimensional (3D) inkjet printing processes.

As discussed hereinabove, 3D inkjet printing systems require, on one hand, using building material formulations which exhibit certain properties while being dispensed from inkjet printing heads, and, on the other hand, aim to obtain three-dimensional objects which feature stability, durability and toughness.

Most of the currently available 3D inkjet printing processes utilize photocurable (e.g., UV curable) formulations. These formulations, while meeting the requirements of suitable viscosity at the jetting temperature and a rapid hardening upon exposure to irradiation, often provide objects with mechanical properties that are less than desired.

Materials obtained by ring-opening metathesis polymerization (ROMP) are characterized by exceptional mechanical and other properties. However, employing ROMP chemistry in 3D inkjet printing requires solving problems associated with, for example, fast propagation of the polymerization reaction, immediately once a catalyst contacts a ROMP monomer. Thus, for example, pre-mixing a ROMP monomer and a ROMP catalyst before jetting leads to substantial increase in viscosity when such a formulation passes through the inkjet printing head and nozzle plate, resulting in clogging due to polymerization of the composition on the nozzle plate.

The present inventors have now designed and successfully practiced novel methodologies for utilizing the valuable properties of materials prepared by ROMP in the fabrication of three-dimensional objects in 3D inkjet printing processes.

The Method:

According to aspects of some embodiments of the present invention, there is provided a method of three-dimensional (3D) inkjet printing of a three-dimensional object. According to embodiments of these aspects, the method is effected by sequentially forming a plurality of layers in a configured pattern corresponding to the shape of the object, thereby forming the object.

According to embodiments of these aspects, formation of each layer is effected by dispensing at least one building material formulation (uncured building material), and exposing the dispensed building material formulation to condition which affect curing of the formulation to thereby obtain a cured building material.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

Each layer is preferably formed by three-dimensional inkjet printing which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

When three-dimensional inkjet printing is employed, a building material is dispensed from a dispensing head having a set of nozzles to deposit the building material in layers on a supporting structure. The inkjet printing system thus dispenses building material in target locations which are to be occupied and leaves other target locations void. The inkjet printing typically includes a plurality of dispensing heads, each of which can be configured to dispense a different building material formulation. Thus, different target locations can be occupied by different building materials.

The types of building materials can be categorized into two major categories: modeling material and support material. The support material serves as a supporting matrix or construction for supporting the object or object parts during the fabrication process and/or other purposes, e.g., providing hollow or porous objects. Support constructions may additionally include modeling material elements, e.g. for further support strength.

Herein throughout, the phrases "building material formulation", "uncured building material", "uncured building material formulation", "building material" and other variations therefore collectively describe the materials that are dispensed to sequentially form the layers, as described herein. This phrase encompasses uncured materials dispensed so as to form the object, namely, one or more uncured modeling material formulation(s), and uncured materials dispensed so as to form the support, namely uncured support material formulations.

Herein throughout, the term "object" describes a final product of the additive manufacturing. This term refers to the product obtained by a method as described herein, after removal of the support material, if such has been used as part of the uncured building material. The "object" therefore essentially consists (at least 95 weight percents) of a cured modeling material.

The term "object" as used herein throughout refers to a whole object or a part thereof.

Herein throughout, the phrase "cured modeling material" describes the part of the building material that forms the object, as defined herein, upon exposing the dispensed building material to curing (and optionally post-treatment), and, optionally, if a support material has been dispensed, removal of the cured support material, as described herein. The cured modeling material can be a single cured material or a mixture of two or more cured materials, depending on the modeling material formulations used in the method, as described herein.

The phrase "cured modeling material" or "cured modeling material formulation" can be regarded as a cured building material wherein the building material consists only of a modeling material formulation (and not of a support material formulation). That is, this phrase refers to the portion of the building material, which is used to provide the final object.

Herein throughout, the phrase "modeling material formulation", which is also referred to herein interchangeably as "modeling formulation", "modeling material" "model material" or simply as "formulation", describes a part or all of the uncured building material which is dispensed so as to form the object, as described herein. The modeling material formulation is an uncured modeling formulation (unless specifically indicated otherwise), which, upon exposure to a condition that effects curing, forms the object or a part thereof.

In some embodiments of the present invention, a modeling material formulation is formulated for use in three-dimensional inkjet printing and is able to form a three-dimensional object on its own, i.e., without having to be mixed or combined with any other substance.

An uncured building material can comprise one or more modeling formulations, and can be dispensed such that different parts of the object are made, upon curing, of different cured modeling formulations, and hence are made of different cured modeling materials or different mixtures of cured modeling materials.

The method of the present embodiments manufactures three-dimensional objects in a layerwise manner by forming a plurality of layers in a configured pattern corresponding to the shape of the objects, as described herein.

The final three-dimensional object is made of the modeling material or a combination of modeling materials or a combination of modeling material/s and support material/s or modification thereof (e.g., following curing). All these operations are well-known to those skilled in the art of solid freeform fabrication.

In some exemplary embodiments of the invention an object is manufactured by dispensing a building material that comprises two or more different modeling material formulations, each modeling material formulation from a different dispensing head of the inkjet printing apparatus. The modeling material formulations are optionally and preferably deposited in layers during the same pass of the printing heads. The modeling material formulations and/or combination of formulations within the layer are selected according to the desired properties of the object.

FIG. 1 presents a flowchart describing an exemplary method according to some embodiments of the present invention. It is to be understood that, unless otherwise defined, the operations described hereinbelow can be executed either contemporaneously or sequentially in many combinations or orders of execution. Specifically, the ordering of the flowchart is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 10 and optionally and preferably continues to 11 at which 3D printing data corresponding to the shape of the object are received. The data can be received, for example, from a host computer which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The method continues to 12 at which droplets of a building material as described herein are dispensed in layers, on a receiving medium, using at least two different multi-nozzle inkjet printing heads, according to the printing data.

The receiving medium can be a tray of a three-dimensional inkjet system or a previously deposited layer. The building material comprises one or more modeling material formulations that can undergo polymerization via ROMP, as described herein. The building material cam optionally further comprise a support material formulation.

In some embodiments of the present invention, the dispensing 12 is effected within an environment that is similar in its thermodynamic condition (for example, temperature, humidity, pressure) to the ambient environment. Alternatively, the dispensing 12 can be executed in a generally dry (e.g., relative humidity of less than 60% or less than 50% or less than 40%, or less) and inert environment. For example, the dispensing can be executed in a nitrogen environment. In these embodiments, dispensing 12 is executed in a chamber and is optionally and preferably preceded by an operation in which an inert gas, e.g., nitrogen, helium, krypton and the like is introduced into the chamber.

Optionally, before being dispensed, the uncured building material, or a part thereof (e.g., one or more formulations of the building material), is heated, prior to being dispensed. These embodiments are particularly useful for uncured building material formulations having relatively high viscosity at the operation temperature of the working chamber of a 3D inkjet printing system. The heating of the formulation(s) is preferably to a temperature that allows jetting the respective formulation through a nozzle of a printing head of a 3D inkjet printing system. In some embodiments of the present invention, the heating is to a temperature at which the respective formulation exhibits a viscosity of no more than X centipoises, where X is about 40 centipoises, or about 35 centipoises, or about 30 centipoises, preferably about 25 centipoises and more preferably about 20 centipoises, or 18 centipoises, or 16 centipoises, or 14 centipoises, or 12 centipoises, or 10 centipoises and even as low as 2 centipoises.

The heating can be executed before loading the respective formulation into the printing head of the 3D printing system, or while the formulation is in the printing head or while the formulation passes through the nozzle of the printing head.

In some embodiments, the heating is executed before loading of the respective formulation into the printing head, so as to avoid clogging of the printing head by the formulation in case its viscosity is too high.

In some embodiments, the heating is executed by heating the printing heads, at least while passing the formulations making up the building material through the nozzle of the printing head.

In some embodiments, a temperature of an inkjet printing head for dispensing a modeling material formulation as described herein is lower than 70° C., and ranges, for example, from about 25° C. to about 65° C., including any subranges and intermediate values therebetween. Modeling material formulations which comprise one or more monomers that undergo polymerization via ROMP, as described herein, and optionally other, non-curable components, are suitable for use in the context of these embodiments.

In some embodiments, higher temperatures of an inkjet printing head are required, for example, higher than 70° C., or ranging from about 65° C. to about 95° C., including any subranges and intermediate values therebetween. Modeling material formulations which comprise curable materials which are polymerizable by non-ROMP reactions, as described herein (for example, UV-curable acrylates and methacrylates, and/or epoxy monomers useful for cationic photopolymerization), as curable components, optionally in addition to ROMP-curable components, are suitable for use in the context of these embodiments.

Once the uncured building material is dispensed on the receiving medium according to the 3D printing data, the method optionally and preferably continues to 13 at which the deposited layers are exposed to a condition (or two or more conditions) that induces ROMP, as defined herein. Preferably, each individual layer is exposed to this condition following or during the deposition of the layer, and prior to the deposition of the subsequent layer.

In some embodiments, exposing to conditions that effect curing is performed under a generally dry and inert environment, as described herein.

In these embodiments, the dry and inert environment is optionally and preferably prepared before the material is dispensed so that 13 can be executed simultaneously with 12 wherein the material is exposed to the environment upon exiting the inkjet printing head.

Alternatively, the exposure 13 can include exposing the dispensed layer to radiation, such as, but not limited to, electromagnetic radiation, for example, infrared radiation (e.g., at a wavelength of from about 800 nm to about 4 μm), ultraviolet radiation (e.g., at a wavelength of from about 200 nm to about 400 nm) and visible or near-visible light radiation (e.g., at a wavelength of from about 400 nm to about 800 nm), or particle radiation, for example in the form of an electron beam, depending on the modeling material being used. Preferably, but not necessarily, the infrared radiation is applied by a ceramic lamp, for example, a ceramic lamp that produces infrared radiation of from about 3 μm to about 4 μm, e.g., about 3.5 μm, or of any other wavelength suitable for efficient application of heat, as discussed hereafter. Alternatively or additionally, the exposure 13 can include exposing the dispensed layer to elevated temperature (for example, from about 25° C. to about 100° C., or from about 25° C. to about 65° C., or from about 65° C. to about 100° C. The elevated temperatures can be generated by heating the tray on which the layers are dispensed, and/or the chamber within which the printing process is executed or heat-inducing irradiation, using a radiation source as described herein, at a suitable wavelength for providing a required temperature. A ceramic lamp, for example, when operated at the above-described wavelengths, may result in heating a dispensed formulation to up to 300° C.

The method can preferably continue to 14 at which the deposited layer is straightened, for example, by a leveling device. Optionally, the layer is straightened after the dispensed formulation is cured. Alternatively, the layer is straightened while the dispensed formulation is still uncured.

As used herein the phrase“cured” refers to a formulation that underwent curing or at least a partial curing, as defined herein, and encompasses a state of the formulation in which at least 20% or at least 30% or at least 40% or at least 50% or at least 60% or at least 70% of the formulation underwent curing, as defined herein, and a state of a formulation that underwent up to 100% curing.

Typically, a formulation that underwent curing or partial curing is characterized by a viscosity that is substantially higher than an uncured formulation, and preferably, a formulation, or at least a part thereof, solidifies upon curing.

Straightening after curing (or partial curing) can be achieved by a leveling device that is capable of deforming the solidified portion of the formulation. A representative example of such a leveling device is a roller capable of milling, grinding and/or flaking a solidified formulation or part thereof. Straightening while the formulation is uncured can be achieved by a leveling device that is capable of leveling the formulation in its liquid or gel state. A representative example of such a leveling device is a roller or a blade, which is optionally and preferably, but not necessarily, incapable of effecting milling, grinding and/or flaking.

In some embodiments of the present invention the method continues to 15 at which cured or partially cured formulation is removed off the leveling device. These embodiments are particularly useful when the leveling device is applied to the layer while the formulation is uncured or partially cured. In this case, a portion of the formulation collected by the leveling device can experience curing or partial curing while the formulation is on the leveling device (for example on the roller, when the leveling device comprises a roller), and the method preferably removes that cured or partially cured formulation from the device. These embodiments can also be useful when the leveling device is applied to the layer while the formulation is cured (for example, when the leveling device effects milling, grinding and/or flaking of the solidified portion of the formulation). In this case the method removes the debris of the milling, grinding and/or flaking process from the leveling device.

Operation 15 is preferably executed automatically and optionally also continuously while the leveling device is in motion over the layer. For example, the leveling device can comprise a double roller having a first roller that contacts and straightens the layer and a second that is in contact with the first roller but not with the layer and which is configured to remove the formulation from the first roller.

The method ends at 16.

In some of any of the embodiments described herein, the building material comprises one or more modeling material formulations, as described in further detail hereinafter, and dispensing the building material comprises dispensing one or more modeling material formulations.

In some of any of the embodiments described herein, the building material further comprises one or more support material formulations.

In some of any of the embodiments described herein, dispensing a building material further comprises dispensing the support material formulation(s).

Dispensing the support material formulation, in some embodiments, is effected by inkjet printing head(s) other than the inkjet printing heads used for dispensing the modeling material formulation(s).

In some embodiments, exposing the building material to a condition that induces curing includes one or more conditions that affect curing of a support material formulation, to thereby obtain a cured support material.

In some of any of the embodiments described herein, once a building material is cured, the method further comprises removing the cured support material. Any of the methods usable for removing a support material formulation can be used, depending on the materials employed in the modeling material formulation and the support material formulation. Such methods include, for example, mechanical removal of the cured support material and/or chemical removal of the cured support material by contacting the cured support material with a solution in which it is dissolvable (e.g., an alkaline aqueous solution).

As used herein, the term "curing" describes a process in which a formulation is hardened. This term encompasses polymerization of monomer(s) and/or oligomer(s) and/or cross-linking of polymeric chains (either of a polymer present before curing or of a polymeric material formed in a polymerization of the monomers or oligomers). The product of a curing reaction is therefore typically a polymeric material and in some cases a cross-linked polymeric material. This term, as used herein, encompasses also partial curing, for example, curing of at least 20% or at least 30% or at least 40% or at least 50% or at least 60% or at least 70% of the formulation, as well as 100% of the formulation.

Herein, the phrase "a condition that affects curing" or "a condition for inducing curing", which is also referred to herein interchangeably as "curing condition" or "curing inducing condition" describes a condition which, when applied to a formulation that contains a curable material, induces polymerization of monomer(s) and/or oligomer(s) and/or cross-linking of polymeric chains. Such a condition can include, for example, application of a curing energy, as described hereinafter to the curable material(s), and/or contacting the curable material(s) with chemically reactive components such as catalysts, co-catalysts, and activators.

When a condition that induces curing comprises application of a curing energy, the phrase "exposing to a condition that affects curing" means that the dispensed layers are exposed to the curing energy and the exposure is typically performed by applying a curing energy to the dispensed layers.

A "curing energy" typically includes application of radiation or application of heat.

The radiation can be electromagnetic radiation (e.g., ultraviolet or visible light), or electron beam radiation, or ultrasound radiation or microwave radiation, depending on the materials to be cured. The application of radiation (or irradiation) is effected by a suitable radiation source. For example, an ultraviolet or visible or infrared or Xenon lamp can be employed, as described herein.

A curable material or system that undergoes curing upon exposure to radiation is referred to herein interchangeably as "photopolymerizable" or "photoactivatable" or "photocurable".

When the curing energy comprises heat, the curing is also referred to herein and in the art as "thermal curing" and comprises application of thermal energy. Applying thermal energy can be effected, for example, by heating a receiving medium onto which the layers are dispensed or a chamber hosting the receiving medium, as described herein. In some embodiments, the heating is effected using a resistive heater.

In some embodiments, the heating is effected by irradiating the dispensed layers by heat-inducing radiation. Such irradiation can be effected, for example, by means of an IR lamp or Xenon lamp, operated to emit radiation onto the deposited layer.

In some embodiments, heating is effected by infrared radiation applied by a ceramic lamp, for example, a ceramic lamp that produces infrared radiation of from about 3 μm to about 4 μm, e.g., about 3.5 μm.

In some embodiments, the heat-inducing radiation is selected to emit radiation at a wavelength that results in efficient absorption of the heat energy by a selected ROMP monomer or mixture of monomers, so as to effect efficient application of heat energy (efficient heating or thermal curing).

A curable material or system that undergoes curing upon exposure to heat is referred to herein as "thermally-curable" or "thermally-activatable" or "thermally-polymerizable".

In some of any of the embodiments described herein, the method further comprises exposing the cured modeling material formulation(s) either before or after removal of a support material formulation, if such has been included in the building material, to a post-treatment condition. The post-treatment condition is typically aimed at further hardening the cured modeling formulation(s). In some embodiments, the post-treatment hardens a partially-cured formulation to thereby obtain a completely cured formulation.

In some embodiments, the post-treatment is effected by exposure to heat or radiation, as described in any of the respective embodiments herein. In some embodiments, when the condition is heat, the post-treatment can be effected for a time period that ranges from a few minutes (e.g., 10 minutes) to a few hours (e.g., 1-24 hours).

In some of any of the embodiments described herein, at least one of the modeling material formulations as described herein comprises a monomer that is polymerizable by ring opening metathesis polymerization (ROMP). Such a monomer is also referred to herein interchangeably as a ROMP monomer, a ROMP-polymerizable monomer, a ROMP curable monomer, a ROMP component, a ROMP active component, and similar diversions. In some embodiments, one or more of the modeling material formulations in the (uncured) building material comprises a catalyst for initiating a ROMP reaction of the monomer, as described in further detail hereinunder.

In some of any of the embodiments described herein, the ROMP monomer is an unsaturated cyclic monomer, preferably a strained unsaturated cyclic olefin, as described in further detail hereinunder.

In some of any of the embodiments described herein, exposing the modeling material formulation to a condition that induces curing comprises exposing the dispensed modeling material formulation(s) to a condition for inducing initiation of ROMP of the monomer by the catalyst, as described in further detail hereinunder. Any of the conditions for effecting curing as described hereinabove are contemplated, depending on the materials selected for the ROMP system.

Herein throughout, a condition for inducing initiation of ROMP of the monomer by the catalyst is also referred to herein interchangeably as "a ROMP inducing condition" or simply as "inducing condition", and describes a condition to which a modeling material formulation is exposed so as to effect ROMP of the ROMP monomer (e.g., to effect initiation of ROMP of the ROMP monomer by the catalyst).

It is to be noted that a building material, including the one or more modeling material formulations included therein, can be exposed also to a condition that affects curing via other modes of action (e.g., via other polymerization reactions and/or via cross-linking of polymeric chains), that is, a non-ROMP curing condition, as described in further detail hereinafter.

The ROMP inducing condition and a non-ROMP curing condition can be the same or different.

A ROMP System:

Herein, a "ROMP system" describes a set of materials and optionally conditions for effecting polymerization, via a ROMP reaction, of an unsaturated cyclic ROMP monomer (or a mixture of ROMP monomers). The materials included in a ROMP system are also referred to herein as "ROMP components" or "ROMP active components".

A ROMP system requires at least a ROMP monomer and a catalyst for initiating the ROMP reaction. The catalyst is also referred to herein throughout as a "ROMP catalyst" or a "ROMP catalyst system".

In some embodiments, a ROMP system consists of a catalyst and a ROMP monomer. In such cases, the catalyst in referred to herein as an "active catalyst", which is active towards initiation of ROMP of the monomer immediately once it contacts the monomer, without a need to apply an external stimulus such as, for example, heat, radiation, or chemical additives.

In some of these embodiments, a condition for inducing initiating of ROMP of the monomer by the catalyst requires contacting the catalyst with the ROMP monomer.

By "active towards initiation of ROMP" of the monomer it is meant that in the presence of the catalyst, at least 50% or at least 60% or at least 70% or at least 80% of the monomer polymerizes via ROMP mechanism to provide a respective polymer.

In some embodiments, a ROMP system consists of a catalyst and a ROMP monomer and a condition for activating the catalyst towards initiation of ROMP of the monomer. In such cases, the catalyst is referred to herein as a "latent catalyst", which is activatable upon exposure to the condition. According to some of these embodiments, the catalyst is inactive towards initiation of ROMP of the monomer when the ROMP system is not exposed to the condition that activates the catalyst, namely, prior to exposure to a ROMP inducing condition.

By "inactive towards initiation of ROMP" of the monomer it is meant that in the presence of the catalyst, no more than 40% or no more than 30% or no more than 20% or no more than 10% or no more than 5% of the monomer polymerizes via ROMP mechanism to provide a respective polymer.

Latent catalysts as described herein can be thermally-activatable catalysts, which are converted into active catalysts upon exposure to heat (that is, a condition for inducing initiation of ROMP comprises heat or heating a ROMP system, optionally in addition to contacting the catalyst and the ROMP monomer).

Latent catalysts as described herein can be photo-activatable catalysts, which are converted into active catalysts upon exposure to radiation (that is, a condition for inducing initiation of ROMP comprises exposure to radiation or application of radiation to the ROMP system, optionally in addition to contacting the catalyst and a ROMP monomer). The radiation can be, for example, an electromagnetic radiation (e.g., UV or visible or IR light), or ultrasound radiation, or heat-inducing radiation, and can be applied by a suitable source of the radiation, as described herein.

Latent catalysts activatable by exposure to other conditions are also contemplated.

In some embodiments, a ROMP system consists of a ROMP monomer, a ROMP catalyst and an activator, for chemically activating the ROMP catalyst. In such cases, the ROMP catalyst is inactive towards initiation of ROMP of the monomer, as defined herein, in the absence of the activator (when it is not contacted with the activator). A ROMP catalyst that is activatable in the presence of an activator is referred to herein also as a "pre-catalyst", and the activator is referred to herein as a "co-catalyst". A combination of pre-catalyst and an activator is also referred to herein and in the art as a catalyst system, and herein also as a ROMP catalyst system.

By "chemically activating" it is meant that the activation of a catalyst is made by an addition of a chemical entity (a chemical additive), e.g., a chemical compound or a chemical species such as an ion.

According to some of these embodiments, the catalyst is inactive towards initiation of ROMP of the monomer, as defined herein, in the absence of a respective activator.

According to these embodiments, a condition for initiating ROMP of a monomer requires a contact between the catalyst and the activator and the catalyst and the ROMP monomer.

In some of these embodiments, the activator is an activatable activator, which is rendered active towards chemically activating the catalyst when exposed to a certain condition. In such cases, the activator is incapable of chemically activating the catalyst unless it is activated (by exposure to the condition). Such activators are also referred to herein as "latent activators".

A latent activator is incapable of activating a catalyst for initiating ROMP of the monomer, and can be converted to an active activator when exposed to an activating condition (which can be the ROMP inducing condition as described herein).

According to some of these embodiments, the activator is inactive towards chemically activating the catalyst, and the catalyst is therefore inactive towards initiation of ROMP of the monomer when the ROMP system is not exposed to the condition that activates the activator.

By "inactive towards chemically activating the catalyst" it is meant that no chemical reaction between the activator and the catalyst occurs, such that in the ROMP system containing the ROMP monomer, a ROMP catalyst which is chemically activatable by the activator, and the latent activator, no more than 40% or no more than 30% or no more than 20% or no more than 10% or no more than 5% of the monomer polymerizes via ROMP mechanism to provide a respective polymer.

Latent activators as described herein can be thermally-activatable activators, which are converted into active activators upon exposure to heat (that is, a condition for inducing initiation of ROMP comprises heat or heating a ROMP system, optionally in addition to contacting an activator and a catalyst and a ROMP monomer).

Latent activators as described herein can be photo-activatable catalysts, which are converted into active activators upon exposure to radiation (that is, a condition for inducing initiation of ROMP comprises exposure to radiation or application of radiation to the ROMP system, optionally in addition to contacting an activator and a catalyst and a catalyst and a ROMP monomer). The radiation can be, for example, an electromagnetic radiation (e.g., UV or visible or IR light), or ultrasound radiation, and can be applied by a suitable source of the radiation.

In some of any of the embodiments described herein, a ROMP system can further comprise a ROMP inhibitor.

A "ROMP inhibitor" as used herein refers to a material that slows down a ROMP reaction initiated by a catalyst. ROMP inhibitors can be used with active catalysts, latent catalysts and pre-catalysts, as described herein. In some embodiments, a ROMP inhibitor inhibits a ROMP reaction initiated in the presence of an active catalyst, or once a latent catalyst or pre-catalyst is converted to an active catalyst, by interfering with the chemical reactions that activate a latent catalyst or a pre-catalyst.

It is to be noted that a ROMP system as described herein refers to the active components and/or conditions that together lead to ROMP polymerization of a ROMP monomer. A formulation that comprises a ROMP system can further comprise other components which can participate in polymerization or curing reactions, and/or form a part of the final polymeric material, as described in further detail hereinbelow.

ROMP Monomers:

A ROMP monomer as described herein describes any material that undergoes ROMP in the presence of a ROMP catalyst or ROMP catalyst system.

Typically ROMP monomers are unsaturated cyclic compounds (cyclic olefins), and preferably strained unsaturated cyclic compounds (strained cyclic olefins).

Any compound that can undergo ROMP is encompassed by the present embodiments.

The phrase "ROMP monomer" as used herein encompasses one ROMP monomer or a combination of ROMP monomers, and also encompasses a mixture of a ROMP monomer with another cyclic olefin that can react with a ROMP monomer during ROMP of the ROMP monomer, if included in the same reaction mixture. Such cyclic olefins can be recognized by those skilled in the art.

Exemplary ROMP monomers include, but are not limited to dicyclopentadiene (DCPD), cyclopentadiene trimer, tetramer, pentamer, etc., norbornene, cyclooctene, cyclooctadiene, cyclobutene, cyclopropene and substituted derivatives thereof, for example, substituted norbornenes such as carboxylated norbornenes, butyl norbornene, hexyl norbornene, octyl norbornene.

Some exemplary ROMP monomers are presented also in Tables 1, 3, 4, 5 and 7-9.

Any cyclic olefin (unsaturated cyclic compounds) suitable for the metathesis reactions disclosed herein may be used.

Herein, the phrases "cyclic olefin" and "unsaturated cyclic compound" are used interchangeably encompasses compounds comprising one, two, three or more non-aromatic rings (fused and/or unfused rings) which comprise at least one pair of adjacent carbon atoms in the ring which are bound to one another by an unsaturated bond. The ring may optionally be substituted or unsubstituted, and the cyclic olefin may optionally comprise one unsaturated bond ("monounsaturated"), two unsaturated bonds ("di-unsaturated"), three unsaturated bond ("tri-unsaturated"), or more than three unsaturated bonds. When substituted, any number of substituents may be present (optionally from 1 to 5, and optionally 2, 3, 4 or 5 substituents), and the substituent(s) may optionally be any substituent describes herein as being optionally attached to an alkyl or alkenyl.

Examples of cyclic olefins include, without limitation, cyclooctene, cyclododecene, and (c,t,t)-1,5,9-cyclododecatriene.

Examples of cyclic olefins with more than one ring include, without limitation, norbornene, dicyclopentadiene, tricyclopentadiene, and 5-ethylidene-2-norbornene.

The cyclic olefin may be a strained or unstrained cyclic olefin, provided the cyclic olefin is able to participate in a ROMP reaction either individually or as part of a ROMP cyclic olefin composition. While certain unstrained cyclic olefins such as cyclohexene are generally understood to not undergo ROMP reactions by themselves, under appropriate circumstances, such unstrained cyclic olefins may nonetheless be ROMP active. For example, when present as a co-monomer in a ROMP composition, unstrained cyclic olefins may be ROMP active. Accordingly, as used herein and as would be appreciated by the skilled artisan, the term "unstrained cyclic olefin" is intended to refer to those unstrained cyclic olefins that may undergo a ROMP reaction under any conditions, or in any ROMP composition, provided the unstrained cyclic olefin is ROMP active.

In some embodiments of any one of the embodiments described herein, the substituted or unsubstituted cyclic olefin comprises from 5 to 24 carbon atoms. In some such embodiments, the cyclic olefin is a hydrocarbon devoid of heteroatoms. In alternative embodiments, the cyclic olefin comprises one or more (e.g., from 2 to 12) heteroatoms such as O, N, S, or P, for example, crown ether cyclic olefins which include numerous O heteroatoms throughout the cycle, are within the scope of the invention.

In some embodiments of any one of the embodiments described herein relating to a cyclic olefin comprising from 5 to 24 carbon atoms, the cyclic olefin is mono-unsaturated, di-unsaturated, or tri-unsaturated.

In some embodiments of any of the embodiments described herein, the cyclic olefin has the general formula (A)

Formula (A)

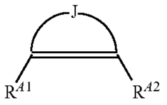

wherein:

$R^{A1}$ and $R^{A2}$ are each independently hydrogen, alkyl, cycloalkyl, alkenyl, alkynyl, aryl, heteroaryl, heteroalicyclic, halo, hydroxy, alkoxy, aryloxy, thiohydroxy, thioalkoxy, thioaryloxy, sulfinyl, sulfonyl, sulfonate, nitrile, nitro, azide, phosphonyl, phosphinyl, oxo, carbonyl, thiocarbonyl, urea, thiourea, carbamyl, N-carbamyl, O-thiocarbamyl, N-thiocarbamyl, C-amido, N-amido, C-carboxy, O-carboxy, sulfonamido, and amino;

J is a saturated or unsaturated hydrocarbon, which may be substituted or unsubstituted, and may optionally comprise one or more heteroatoms between the carbon atoms thereof. Additionally, two or more substituents attached to ring atoms within J may optionally be linked to form a bicyclic or polycyclic olefin.

In some embodiments of any of the respective embodiments described herein, the compound of formula (A) contains from 5 to 14 ring atoms, optionally from 5 to 8 ring atoms, for a monocyclic olefin; and, for bicyclic and polycyclic olefins, from 4 to 8 ring atoms in each ring, optionally from 5 to 7 ring atoms in each ring.

In some embodiments of any of the embodiments described herein, the cyclic olefin has the general formula (B)

Formula (B)

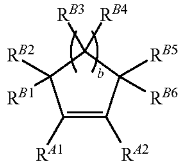

wherein:

b is an integer in a range of 1 to 10, optionally 1 to 5;

$R^{A1}$ and $R^{A2}$ are as defined above for formula (A); and $R^{B1}$, $R^{B2}$, $R^{B3}$, $R^{B4}$, $R^{B5}$, and $R^{B6}$ are each independently hydrogen, alkyl, cycloalkyl, alkenyl, alkynyl, aryl, heteroaryl, heteroalicyclic, halo, hydroxy, alkoxy, aryloxy, thiohydroxy, thioalkoxy, thioaryloxy, sulfinyl, sulfonyl, sulfonate, nitrile, nitro, azide, phosphonyl, phosphinyl, oxo, carbonyl, thiocarbonyl, urea, thiourea, carbamyl, N-carbamyl, O-thiocarbamyl, N-thiocarbamyl, C-amido, N-amido, C-carboxy, O-carboxy, sulfonamido, and amino, or alternatively, any of the $R^{B1}$, $R^{B2}$, $R^{B3}$, $R^{B4}$, $R^{B5}$, and $R^{B6}$ moieties can be linked to any of the other $R^{B1}$, $R^{B2}$, $R^{B3}$, $R^{B4}$, $R^{B5}$, and $R^{B6}$ moieties to provide a substituted or unsubstituted 4- to 7-membered ring;

In some embodiments of any of the embodiments described herein, the cyclic olefin is monocyclic.

In some embodiments of any of the embodiments described herein, the cyclic olefin is monounsaturated, optionally being both monocyclic and monounsaturated.

Examples of monounsaturated, monocyclic olefins encompassed by formula (B) include, without limitation, cyclopentene, cyclohexene, cycloheptene, cyclooctene, cyclononene, cyclodecene, cycloundecene, cyclododecene, tricyclodecene, tetracyclodecene, octacyclodecene, and cycloeicosene, and substituted versions thereof such as methylcyclopentene (e.g., 1-methylcyclopentene, 4-methyl-cyclopentene), ethylcyclopentene (e.g., 1-ethylcyclopentene), isopropylcyclohexene (e.g., 1-isopropylcyclohexene), chloropentene (e.g., 1-chloropentene), fluorocyclopentene (e.g., 1-fluorocyclopentene), methoxycyclopentene (e.g., 4-methoxy-cyclopentene), ethoxycyclopentene (e.g., 4-ethoxy-cyclopentene), cyclopentene-thiol (e.g., cyclopent-3-ene-thiol), methylsulfanyl-cyclopentene (e.g., 4-methylsulfanyl-cyclopentene), methylcyclohexene (e.g., 3-methylcyclohexene), methylcyclooctene (e.g., 1-methylcyclooctene), and dimethylcyclooctene (e.g., 1,5-dimethylcyclooctene).

In some embodiments of any of the embodiments described herein, the cyclic olefin is diunsaturated, optionally being both monocyclic and diunsaturated.

In some embodiments, the cyclic olefin has the general formula (C):

Formula (C)

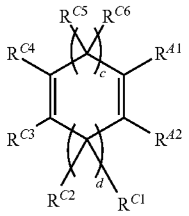

wherein:

c and d are each independently integers in the range of from 1 to 8, optionally from 2 to 4, and optionally 2 (such that the cyclic olefin is a cyclooctadiene);

$R^{A1}$ and $R^{A2}$ are as defined above for formula (A); and $R^{C1}$, $R^{C2}$, $R^{C3}$, $R^{04}$, $R^{C5}$, and $R^{C6}$ are each independently defined as for $R^{B1}$-$R^{B6}$.

In some embodiments, $R^{C3}$ and $R^{C4}$ are substituents (i.e., not hydrogen), in which case at least one of the olefinic moieties is tetrasubstituted.

Examples of diunsaturated, monocyclic olefins include, without limitation, 1,3-cyclopentadiene, 1,3-cyclohexadiene, 1,4-cyclohexadiene, heptadiene (e.g., 1,3-cycloheptadiene), octadiene (e.g., 1,5-cyclooctadiene, 1,3-cyclooctadiene), and substituted versions thereof (e.g., 5-ethyl-1,3-cyclohexadiene).

In some embodiments of any of the embodiments described herein, the cyclic olefin comprises more than two (optionally three) unsaturated bonds. In some embodiments, such compounds are analogous to the diene structure of formula (C), comprising at least one methylene linkage (analogous to the number of methylene linkages indicated by the variables c and d in formula (C)) between any two olefinic segments.

In some embodiments of any of the embodiments described herein, the cyclic olefin is polycyclic.

Herein, the term "polycyclic" refers to a structure comprising two or more fused rings.

In some embodiments of any of the embodiments described herein, the cyclic olefin is a polycyclic olefin having the general formula (D):

Formula (D)

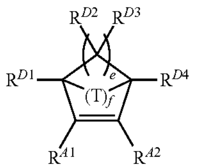

wherein:

$R^{A1}$ and $R^{A2}$ are each independently as defined above for formula (A);

$R^{D1}$, $R^{D2}$, $R^{D3}$ and $R^{D4}$ are each independently as defined for $R^{B1}$-$R^{B6}$;

c is an integer in the range of from 1 to 8, optionally from 2 to 4;

f is 1 or 2; and

T is a substituted or unsubstituted saturated or unsaturated hydrocarbon of 1-4 carbon atoms in length (optionally 1 or 2 carbon atoms in length, for example, substituted or unsubstituted methyl or ethyl), O, S, $N(R^{G1})$, $P(R^{G1})$, $P(=O)(R^{G1})$, $Si(R^{G1})_2$, $B(R^{G1})$, or $As(R^{G1})$, wherein $R^{G1}$ is alkyl, alkenyl, alkynyl, cycloalkyl, heteroalicyclic, aryl, heteroaryl, alkoxy or aryloxy.

Cyclic olefins encompassed by formula (D) are examples of compounds in the norbornene family.

As used herein, the term "norbornene" refers to any compound that includes at least one substituted or unsubstituted bicyclo[2.2.1]hept-2-ene moiety or dehydrogenated derivative thereof, including without limitation, bicyclo [2.2.1]hept-2-ene (referred to in the art as "norbornene") and substituted versions thereof, norbornadiene, (bicyclo[2.2.1] hepta-2,5-diene) and substituted versions thereof, and polycyclic norbornenes, and substituted versions thereof.

In some embodiments, the cyclic olefin is a polycyclic norbornene having the general formula (E):

Formula (E)

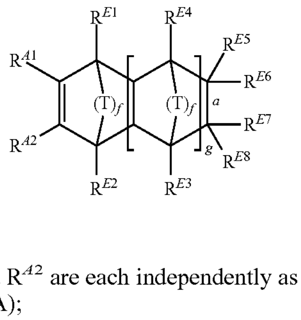

wherein:

$R^{A1}$ and $R^{A2}$ are each independently as defined above for formula (A);

T is as defined above for formula (D);

$R^{E1}$, $R^{E2}$, $R^{E3}$, $R^{E4}$, $R^{E5}$, $R^{E6}$, $R^{E7}$, and $R^{E8}$ are each independently as defined for $R^{B1}$-$R^{B6}$; and "a" represents a saturated bond or unsaturated double bond, wherein when "a" is an unsaturated double bond, one of $R^{E5}$, $R^{E6}$ and one of $R^{E7}$, $R^{E8}$ is absent;

f is 1 or 2; and g is an integer from 0 to 5.

In some embodiments, the cyclic olefin has the general formula (F):

Formula (F)

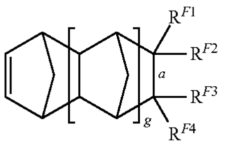

wherein:

$R^{F1}$, $R^{F2}$, $R^{F3}$ and $R^{F4}$ defined above for $R^{E4}$, $R^{E5}$, $R^{E6}$, $R^{E7}$, and $R^{E8}$ respectively; and a and g are as defined in formula (E) hereinabove.

Examples of bicyclic and polycyclic olefins include, without limitation, dicyclopentadiene (DCPD); trimer and higher order oligomers of cyclopentadiene (e.g., cyclopentadiene tetramer, cyclopentadiene pentamer); ethylidenenorbornene; dicyclohexadiene; norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethyoxycarbonyl-1-norbornene; 5-methyl-5-methoxy-carbonylnorbornene; 5-cyanonorbornene; 5,5,6-trimethyl-2-norbornene; cyclo-hexenylnorbornene; endo, exo-5,6-dimethoxynorbornene; endo,endo-5,6-dimethoxynorbornene; endo,exo-5,6-dimethoxycarbonylnorbornene; endo,endo-5,6-dimethoxycarbonylnorbornene; 2,3-dimethoxynorbornene; norbornadiene; tricycloundecene; tetracyclododecene; 8-methyltetracyclododecene; 8-ethyltetracyclododecene; 8-methoxycarbonyltetracyclododecene; 8-methyl-8-tetracyclododecene; 8-cyanotetracyclododecene; pentacyclopentadecene; pentacyclohexadecene; and the like, and their structural isomers, stereoisomers, and mixtures thereof.

Additional examples of bicyclic and polycyclic olefins include, without limitation, $C_2$-$C_{12}$-alkyl-substituted and $C_2$-$C_{12}$-alkenyl-substituted norbornenes, for example, 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, and 5-butenyl-2-norbornene, and the like.

In some embodiments of any of the embodiments described herein, the cyclic olefin is dicyclopentadiene; tricyclopentadiene; dicyclohexadiene; norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethoxycarbonyl-1-norbornene; 5-methyl-5-methoxy-carbonylnorbornene; 5-cyanonorbornene; 5,5,6-trimethyl-2-norbornene; cyclo-hexenylnorbornene; endo,exo-5,6-dimethoxynorbornene; endo, endo-5,6-dimethoxynorbornene; endo,exo-5-6-dimethoxycarbonylnorbornene; endo,endo-5,6-dimethoxycarbonylnorbornene; 2,3-dimethoxynorbornene; norbornadiene; tricycloundecene; tetracyclododecene; 8-methyltetracyclododecene; 8-ethyl-tetracyclododecene; 8-methoxycarbonyltetracyclododecene; 8-methyl-8-tetracyclo-dodecene; 8-cyanotetracyclododecene; pentacyclopentadecene; pentacyclohexadecene; an oligomer of cyclopentadiene (e.g., cyclopentadiene tetramer, cyclopentadiene pentamer); and/or a $C_2$-$C_{12}$-alkyl-substituted norbornene or $C_2$-$C_{12}$-alkenyl-substituted norbornene (e.g., 5-butyl-2-norbornene; 5-hexyl-2-norbornene; 5-octyl-2-norbornene;

5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; 5-butenyl-2-norbornene).

In some embodiments of any of the embodiments described herein, the cyclic olefin is dicyclopentadiene, tricyclopentadiene, or higher order oligomer of cyclopentadiene (e.g., cyclopentadiene tetramer, cyclopentadiene pentamer), tetracyclododecene, norbornene, and/or a $C_2$-$C_{12}$-alkyl-substituted norbornene or $C_2$-$C_{12}$-alkenyl-substituted norbornene (e.g., according to any of the respective embodiments described herein).

Additional examples for ROMP capable cyclic olefin monomers which may be optionally used in embodiments of the invention include any polycyclic compounds which are characterized by the presence of at least two norbornene moieties in its structure, for example:

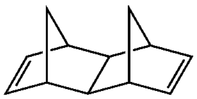
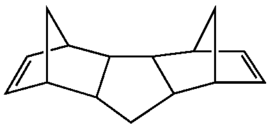

or

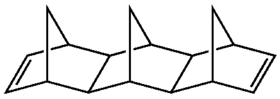

In some embodiments of any of the embodiments described herein, the cyclic olefin is characterized by the presence of at least three rings.

In some embodiments of any of the embodiments described herein relating to a norbornene-based monomer, a monocyclic olefin (e.g., cyclobutene, cyclopentene, cyclopentadiene, cyclooctene, cyclododecene) is copolymerized with the norbornene-based monomer.

Without being bound by any particular theory, it is believed that polycyclic monomers with a rigid backbone, such as cyclopentadiene trimer (TCPD or CPD trimer) will typically produce a cross-linked polymer with very high Tg and heat deflection temperature (HDT), but will also be more brittle and may have lower impact resistance.

In some embodiments of any of the embodiments described herein, a polycyclic monomer with a rigid backbone (e.g., according to any of the respective embodiments described herein) is formulated with one or more softer additional monomers and/or cross linkers.

Examples of additional monomers include, without limitation, monomers having the formula:

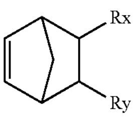

wherein Rx and Ry are each independently hydrogen, $C_1$-$C_{20}$-alkyl, cycloalkyl, hetroalicylic, aryl, polyethylene glycol, polypropylene glycol or benzyl.

Example of bifunctional cyclic olefins, which may also act as cross linkers include, without limitation, compounds having any one of the following formulas:

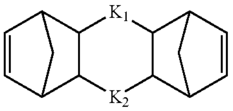
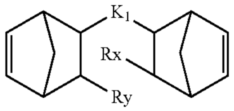

and

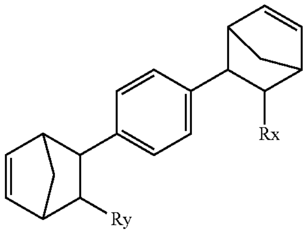

wherein Rx and Ry are each independently hydrogen, $C_1$-$C_{20}$-alkyl, cycloalkyl, hetroalicylic, aryl, polyethylene glycol, polypropylene glycol or benzyl; and $K_1$ and $K_2$ are each independently $C_1$-$C_{20}$-alkylene, cycloalkyl, heteroalicylic, aryl, polyethylene glycol, polypropylene glycol or benzyl.

Additional examples of bifunctional cyclic olefins include, without limitation:

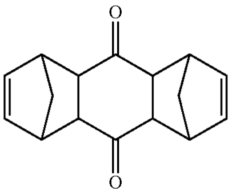
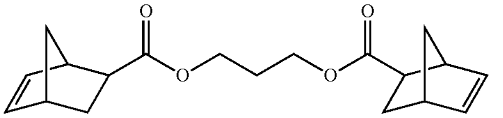

and

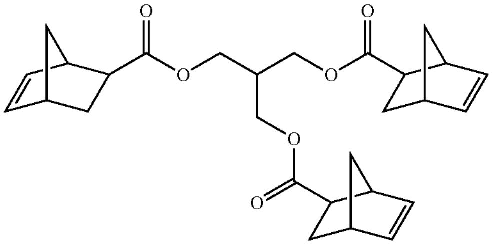

The connection between an additional monomer and/or bifunctional monomer (cross-linker) to a polycyclic (e.g., norbornene) monomer may optionally be, without limitation, through a saturated or unsaturated carbon-carbon bond, an ester bond, and ether bond, an amine, or an amide bond.

Synthesis of norbornene derivatives described herein according to any of the respective embodiments may optionally be performed by Diels-Alder reaction of double bond with cyclopentadiene (CPD), as depicted in Scheme 1 below:

Scheme 1

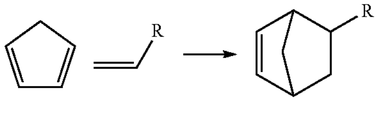

-continued

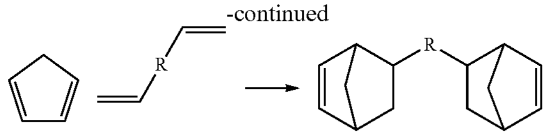

Substituents of a polymerized cyclic olefin may optionally be in a protected form in the monomer. For example, hydroxy groups, which may interfere with metathesis catalysis, may be protected by being in a form of any suitable protected group used in the art. Acceptable protecting groups may be found, for example, in Greene et al., Protective Groups in Organic Synthesis, 3rd Ed. (New York: Wiley, 1999).

ROMP Catalysts and Catalyst Systems:

ROMP catalysts typically include metal carbene organometallic complexes, with the metal being typically, but not necessarily, a transition metal such as ruthenium, molybdenum, osmium or tungsten.

Ruthenium based ROMP catalysts are more stable on exposure to non carbon-carbon double-bond functional groups, and to other impurities like water and oxygen. These catalysts can typically be used in low loading in the formulation (e.g., in a range of 0.002%-0.05% by weight of the total weight of a modeling material formulation containing same).

Ruthenium based ROMP catalysts that are usable in the context of embodiments of the present invention are marketed, for example, by Materia, Umicore, Evonic and BASF.

Exemplary ruthenium-based ROMP catalysts include, Grubbs $1^{st}$ and $2^{nd}$ generation catalysts, Hoveyda-Grubbs catalysts, umicore 41, umicore 42, umicore 61SIMes, and catMETium RF1.

ROMP catalysts can be divided into active catalysts, latent catalysts and pre-catalysts.

An active catalyst is a ROMP catalyst that initiates ROMP of a monomer when in contact with the ROMP monomer, without requiring a stimulus. ROMP active catalysts are typically active at room temperature.

Exemplary active catalysts usable in the context of the present embodiments are the Grubbs $2^{nd}$ generation, Hoveyda-Grubbs $2^{nd}$ generation, and Grubbs $3^{rd}$ generation catalysts, which are realized by any person skilled in the art.

Active catalysts are suitable for use in the context of the present embodiments in dual- or multi-jetting methodologies. Active catalysts are suitable for use in the context of the present embodiments in single-jetting methodologies, when physically separated from the ROMP monomer, and optionally other components in the modeling material formulation.

A latent catalyst is a ROMP catalyst that initiates ROMP of a monomer when in contact with the ROMP monomer, upon exposure to a physical stimulus, typically heat or radiation, as described herein. A latent catalyst is inactive in initiating ROMP of a monomer in the absence of a suitable physical stimulus.

A latent catalyst typically includes a chelating (e.g., donor) ligand which "blocks" a coordinative site of the metal and thus renders the catalyst inactive. Activating the catalyst is effected by dissociating the chelating ligand from the metal center, to thereby render it active towards metathesis.

In a latent catalyst, dissociating the chelating ligand requires a physical external stimulus, as described herein. The type of the external stimulus is determined by the nature of the metal, the chelating ligand and other ligands in the transition metal complex.

Latent ROMP catalysts that are activated in response to heat are also referred to as thermally-activatable catalysts. These include, for example, S-chelated ruthenium catalysts such as described, for example, in Diesendruck, C. E.; Vidavsky, Y.; Ben-Asuly, A.; Lemcoff, N. G., *J. Polym. Sci., Part A: Polym. Chem.* 2009, 47, 4209-4213, which is incorporated by reference as if fully set forth herein.

An exemplary S-chelated thermally-activatable latent catalyst is:

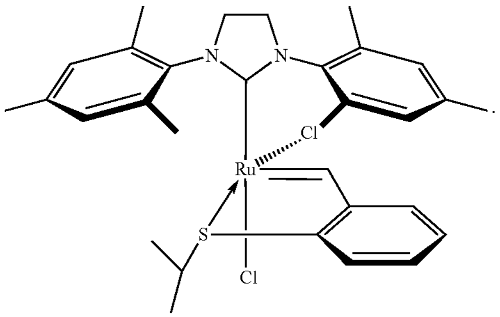

Other exemplary thermally-activatable ROMP catalysts include N-chelated ruthenium catalysts, such as, for example, described in Szadkowska et al., Organometallics 2010, 29, 117-124, which is incorporated by reference as if fully set forth herein.

Exemplary N-chelated thermally-activatable latent catalyst include, without limitation:

VIII

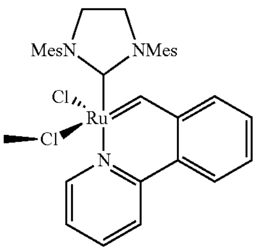

IX and

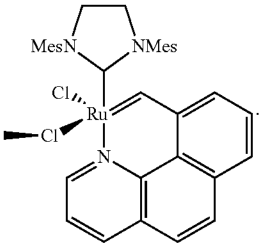

Any other thermally-activatable ROMP catalysts are contemplated.

Latent ROMP catalysts that are activated in response to radiation are also referred to as photoactivatable catalysts.

Photoactivatable ROMP catalysts are mostly UV-activatable catalysts, in which dissociation of a chelating ligand is effected in the presence of UV radiation. Exemplary UV-activatable ROMP latent catalysts are described, for example, in Vidavsky, Y. and Lemcoff, N. G. Beilstein J. Org. Chem., 2010, 6, 1106-1119; Ben-Asuly et al., Organometallics, 2009, 28, 4652-4655; Diesendruck et al., *J. Polym. Sci., Part A: Polym. Chem.* 2009, 47, 4209-4213;

Wang et al., Angew. Chem. Int. Ed. 2008, 47, 3267-3270; and U.S. Patent Application Publication No. 2009-0156766, all of which are incorporated by reference as if fully set forth herein.

UV-activatable ROMP catalysts can be, for example, 0-chelated and S-chelated Ruthenium catalysts.

Non-limiting examples include the following:

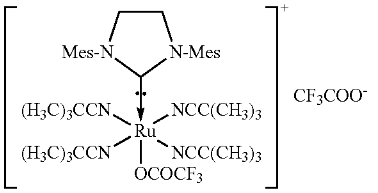

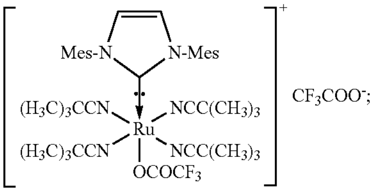

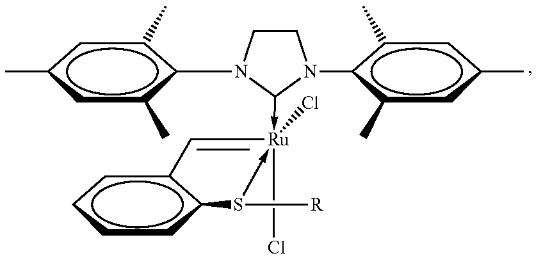

with R being Ph, beta-Naph, 1-Pyrenyl, or i-Pr;

and all catalysts described in Vidavsky, Y. and Lemcoff, N. G. Beilstein J. Org. Chem., 2010, 6, 1106-1119.

UV-activatable ROMP catalysts can be, for example, tungsten catalysts such as, for example:

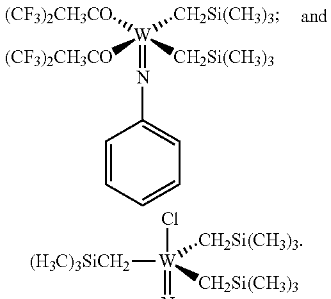

and

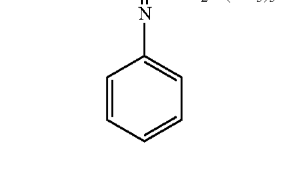

Photoactivatable latent catalyst can also be activated in response to ultrasound radiation. Such catalysts are described, for example, in Piermattei et al., Nature Chemistry, DOI: 10.1038/NCHEM.167, which is incorporated by reference as if fully set forth herein.

Latent catalysts as described herein are usable in the context of any of the embodiments described herein, including single jetting methodologies and multi-jetting methodologies.

A ROMP pre-catalyst is a ROMP catalyst that initiates ROMP of a monomer when in contact with the ROMP monomer, upon exposure to a chemical stimulus, as described herein, typically an addition of an acid or a proton. A pre-catalyst is inactive in initiating ROMP of a monomer in the absence of the chemical stimulus.

A pre-catalyst, similarly to a latent catalyst, typically includes a chelating (e.g., donor) ligand which "blocks" a coordinative site of the metal and thus renders the catalyst inactive. Activating the catalyst is effected by dissociating the chelating ligand from the metal center, to thereby render it active towards metathesis.

In a pre-catalyst, dissociating the chelating ligand requires a chemical stimulus, typically a presence of an acid. The agent that exerts a chemical stimulus that activates the catalyst is referred to herein as an activator or a co-catalyst.

A ROMP pre-catalyst and a suitable activator form together a catalyst system.

The activator can be, for example, an acid, such as HCl, an acid generator such as, but not limited to, ($R_nSiCl_{4-n}$), with R being an alkyl or aryl, and n being 1, 2, or 3, or an acid generator as described, for example, in EP Patent No. 1757613 and U.S. Pat. No. 8,519,069, the teachings of which are incorporated by reference as if fully set forth herein.

Alternatively, the activator is activatable in response to an external stimulus, for example, heat or radiation.

A group of latent activators which are usable in the context of the present embodiments is known in the art as photoacid generators (PAG). Such activators and corresponding pre-catalysts are described for example, in Keitz, B. K.; Grubbs, R. H. J. Am. Chem. Soc. 2009, 131, 2038-2039, which is incorporated by reference as if fully set forth herein.

Additional exemplary PAG include sulfonium salts such as triaryl sulfonium chloride and UVI 6976, iodonium salt Uvacure 1600, Speedcure 937, Irgacure 250, Irgacure PAG 103, Irgacure PAG 203, 2-(4-Methoxystyryl)-4,6-bis (trichloromethyl)-1,3,5-triazine and TMCH. Other exemplary commercially available PAG are described in Tables 1 and 3 hereinafter.

Acid-activatable ROMP catalysts are described, for example, in U.S. Pat. No. 6,486,279. Other catalysts that can be activated by PAG are acid activatable pre-catalysts such as the Schiff base-chelated catalysts described in EP Patent No. 1757613 and U.S. Pat. No. 8,519,069.

Other ROMP catalyst systems are recognizable by any person skilled in the art.

Additional exemplary ROMP catalysts and catalyst systems usable in the context of the present embodiments are described in Tables 1 and 3 hereinbelow.

Additional exemplary ROMP catalysts usable in the context of the present embodiments are described in WO 2014/144634, which is incorporated by reference as if fully set forth herein.

In some embodiments, a ROMP catalyst can be represented by the following Formula:

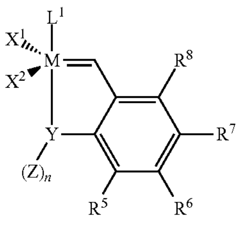

wherein,

M is a Group 8 transition metal, particularly Ru or Os, or, more preferably, Ru (ruthenium);

$X^1$, $X^2$, and $L^1$ are neutral ligands commonly used for olefin metathesis catalyst, particularly Ru-based catalyst;

Y is a heteroatom selected from N, O, S, and P; preferably Y is O or N;

$R^5$, $R^6$, $R^7$, and $R^8$ are each, independently, selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylaminosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, hydroxyl, ester, ether, amine, imine, amide, halogen-substituted amide, trifluoroamide, sulfide, disulfide, sulfonate, carbamate, silane, siloxane, phosphine, phosphate, borate, or -A-Fn, wherein "A" and Fn have been defined above; and any combination of Y, Z, $R^5$, $R^6$, $R^7$, and $R^8$ can be linked to form one or more cyclic groups;

n is 0, 1, or 2, such that n is 1 for the divalent heteroatoms O or S, and n is 2 for the trivalent heteroatoms N or P; and Z is a group selected from hydrogen, alkyl, aryl, functionalized alkyl, functionalized aryl where the functional group(s) may independently be one or more of the following: alkoxy, aryloxy, halogen, carboxylic acid, ketone, aldehyde, nitrate, cyano, isocyanate, hydroxyl, ester, ether, amine, imine, amide, trifluoroamide, sulfide, disulfide, carbamate, silane, siloxane, phosphine, phosphate, or borate; methyl, isopropyl, secbutyl, t-butyl, neopentyl, benzyl, phenyl and trimethylsilyl; and wherein any combination or combinations of $X^1$, $X^2$, $L^1$, Y, Z, $R^5$, $R^6$, $R^7$, and $R^8$ may be linked to a support. Additionally, $R^5$, $R^6$, $R^7$, $R^8$, and Z may independently be thioisocyanate, cyanato, or thiocyanato.

Additional exemplary ROMP catalysts can be represented by the following formula:

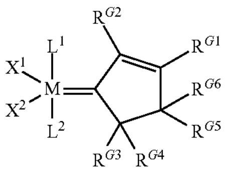

wherein M is a Group 8 transition metal, particularly ruthenium or osmium, or more particularly, ruthenium;

$X^1$, $X^2$, $L^1$, and $L^2$ are common ligands of catalysts as defined above; and $R^{G1}$, $R^{G2}$, $R^{G3}$, $R^{G4}$, $R^{G5}$, and $R^{G6}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, amino sulfonyl, mono alkylamino sulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein heteroatoms and/or functional groups may be present in either the aryl or the alkyl portions of the alkylene and arylalkylene groups, and Fn is a functional group, or any one or more of the $R^{G1}$, $R^{G2}$, $R^{G3}$, $R^{G4}$, $R^{G5}$, and $R^{G6}$ may be linked together to form a cyclic group.

Additional ROMP catalysts can be represented by the following formula:

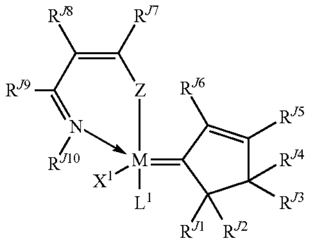

wherein M is a Group 8 transition metal, particularly ruthenium or osmium, or more particularly, ruthenium;

$X^1$ and $L^1$ are common ligands as defined above;

Z is selected from the group consisting of oxygen, sulfur, selenium, $NR^{JU}$, $PR^{JU}$, $AsR^{JU}$, and $SbR^{JU}$; and $R^{J1}$, $R^{J2}$, $R^{J3}$, $R^{J4}$, $R^{J5}$, $R^{J6}$, $R^{J7}$, $R^{J8}$, $R^{J9}$, $R^{J10}$, and $R^{JU}$ are each independently selected from the group consisting of hydrogen, halogen, alkyl, alkenyl, alkynyl, aryl, heteroalkyl, hetero atom containing alkenyl, heteroalkenyl, hetero aryl, alkoxy, alkenyloxy, aryloxy, alkoxycarbonyl, carbonyl, alkylamino, alkylthio, aminosulfonyl, mono alkylamino sulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{J1}$, $R^{J2}$, $R^{J3}$, $R^{J4}$, $R^{J5}$, $R^{J6}$, $R^{J7}$, $R^{J8}$, $R^{J9}$, $R^{J1o}$, and $R^{JU}$ may be linked together to form a cyclic group.

Additional ROMP catalysts can be represented by the following formula:

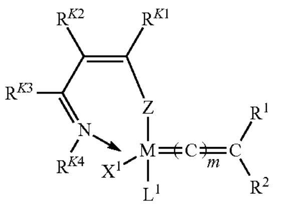

wherein M is a Group 8 transition metal, particularly ruthenium or osmium, or more particularly, ruthenium;

$X^1$, $L^1$, $R^1$, and $R^2$ are as commonly used in ligands of ROMP catalysts;

Z is selected from the group consisting of oxygen, sulfur, selenium, $NR^{K5}$, $PR^{K5}$, $AsR^{K5}$, and $SbR^{K5}$;

m is 0, 1, or 2; and $R^{k1}$, $R^{k2}$, $R^{k3}$, $R^{k4}$, and $R^{k5}$ are each independently selected from the group consisting of hydrogen, halogen, alkyl, alkenyl, alkynyl, aryl, heteroalkyl, heteroatom containing alkenyl, heteroalkenyl, heteroaryl, alkoxy, alkenyloxy, aryloxy, alkoxycarbonyl, carbonyl, alkylamino, alkylthio, aminosulfonyl, monoalkylammosulfonyl, dialkylaminosulfonyl, alkylsulfonyl, nitrile, nitro, alkylsulfinyl, trihaloalkyl, perfluoroalkyl, carboxylic acid, ketone, aldehyde, nitrate, cyano, isocyanate, thioisocyanate, cyanato, thiocyanato, hydroxyl, ester, ether, thioether, amine, alkylamine, imine, amide, halogen-substituted amide, trifluoroamide, sulfide, disulfide, sulfonate, carbamate, silane, siloxane, phosphine, phosphate, borate, or -A-Fn, wherein "A" is a divalent hydrocarbon moiety selected from alkylene and arylalkylene, wherein the alkyl portion of the alkylene and arylalkylene groups can be linear or branched, saturated or unsaturated, cyclic or acyclic, and substituted or unsubstituted, wherein the aryl portion of the arylalkylene can be substituted or unsubstituted, and wherein hetero atoms and/or functional groups may be present in either the aryl or the alkyl portions of the alkylene and arylalkylene groups, and Fn is a functional group, or any one or more of the $R^{K1}$, $R^{K2}$, $R^{K3}$, $R^{K4}$, and $R^{K5}$ may be linked together to form a cyclic group.

Additional ROMP catalysts can be represented by the following formula:

(I)

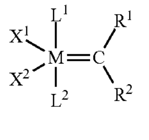

wherein:

M is a Group 8 transition metal;

$L^1$ and $L^2$ are neutral electron donor ligands;

$X^1$ and $X^2$ are anionic ligands; and $R^1$ and $R^2$ are independently selected from hydrogen, hydrocarbyl, substituted hydrocarbyl, heteroatom-containing hydrocarbyl, substituted heteroatom-containing hydrocarbyl, and functional groups, wherein any two or more of $X^1$, $X^2$, $L^1$, $L^2$, $R^1$, and $R^2$ can be taken together to form a cyclic group, and further wherein any one or more of $X^1$, $X^2$, $L^1$, $L^2$, $R^1$, and $R^2$ may be attached to a support.

Preferred catalysts contain Ru or Os as the Group 8 transition metal, with Ru particularly preferred.

The catalysts having the structure of formula (I) are in one of two groups. In the first group, $L^1$ and $L^2$ are independently selected from phosphine, sulfonated phosphine, phosphite, phosphinite, phosphonite, arsine, stibine, ether, amine, amide, imine, sulfoxide, carboxyl, nitrosyl, pyridine, substituted pyridine, imidazole, substituted imidazole, pyrazine, and thioether. Exemplary ligands are trisubstituted phosphines. The first group of catalysts, accordingly, is exemplified by the ruthenium bisphosphine complex $(PCy_3)_2(Cl)_2Ru{=}CHPh$ (1)

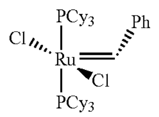

1

The catalysts of the second group are transition metal carbene complexes, preferably ruthenium carbene complexes, wherein $L^2$ is as defined above and $L^1$ is a carbene having the structure of formula (II)

(II)

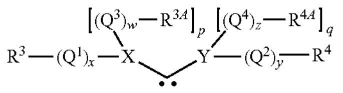

such that the complex has the structure of formula (IIA)

(IIA)

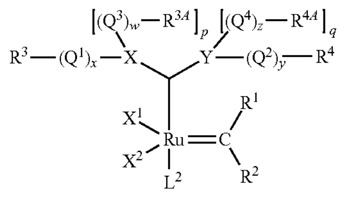

wherein:

$X^1$, $X^2$, $L^1$, $L^2$, $R^1$, and $R^2$ are as defined above;

X and Y are heteroatoms selected from N, O, S, and P;

p is zero when X is O or S, and p is 1 when X is N or P;

q is zero when Y is O or S, and q is 1 when Y is N or P;

$Q^1$, $Q^2$, $Q^3$, and $Q^4$ are independently selected from hydrocarbylene, substituted hydrocarbylene, heteroatom-containing hydrocarbylene, substituted heteroatom-containing hydrocarbylene, and —(CO)—, and further wherein two or more substituents on adjacent atoms within Q may be linked to form an additional cyclic group;

w, x, y, and z are independently zero or 1; and $R^3$, $R^{3A}$, $R^4$, and $R^{4A}$ are independently selected from hydrogen, hydrocarbyl, substituted hydrocarbyl, heteroatom-containing hydrocarbyl, and substituted heteroatom-containing hydrocarbyl, wherein any two or more of $X^1$, $X^2$, $L^2$, $R^1$, $R^2$, $R^3$, $R^{3A}$, $R^4$, and $R^{4A}$ can be taken together to form a cyclic group, and further wherein any one or more of $X^1$, $X^2$, $L^2$, $R^1$, $R^2$, $R^3$, $R^{3A}$, $R^4$, and $R^{4A}$ may be attached to a support.

The second group of catalysts, accordingly, is exemplified by the ruthenium carbene complex $(IMesH_2)(PCy_3)(Cl)_2Ru{=}CHPh$ (2):

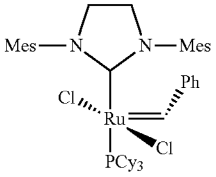

2

Additional transition metal carbene complexes useful as catalysts in conjunction with the present invention include, but are not limited to, neutral ruthenium or osmium metal carbene complexes containing metal centers that are formally in the +2 oxidation state, have an electron count of 16, are penta-coordinated, and are of the general formula (IIIA). Other preferred metathesis catalysts include, but are not limited to, cationic ruthenium or osmium metal carbene complexes containing metal centers that are formally in the +2 oxidation state, have an electron count of 14, are tetra-coordinated, and are of the general formula (IIIB). Still other preferred metathesis catalysts include, but are not limited to, neutral ruthenium or osmium metal carbene complexes containing metal centers that are formally in the +2 oxidation state, have an electron count of 18, are hexa-coordinated, and are of the general formula III(C).

ROMP Inhibitors:

ROMP inhibitors, as described herein, are typically Lewis base compounds such as triphenyl phosphine (TPP), trialkylphosphite and pyridine.

Any other ROMP inhibitors are contemplated.

Exemplary ROMP Systems

Table 1 below presents a list of exemplary components which can be included, in any combination, in a ROMP system as described herein in any one of the embodiments and any combinations thereof. In embodiments pertaining to a dual jetting methodology, the components can be included in one or more modeling material formulations, as described herein.

TABLE 1

| Trade Name | Chemical Type | Function | Supplier |
|---|---|---|---|
| ULTRENE ™ 99 DCPD | Dicyclopentadiene | ROMP Monomer (bifunctional) | Cymetech |
| ULTRENE ™ 99-X DCPD (X = 6-20%) | Cyclopentadiene trimer in dicyclopentadiene | ROMP Monomer (bifunctional) | Cymetech |
| Cyclopentadiene trimer | Cyclopentadiene trimer | ROMP Monomer (bifunctional) | Sinosteel Anshan Research Institute of thermo-energy |
| Cyclooctene | Cyclooctene | ROMP Monomer | Sigma Aldrich |
| Cyclooctadiene | Cyclooctadiene | ROMP Monomer | Sigma Aldrich |
| Norbornene | | ROMP Monomer | |
| FA-512AS | Dicyclopentadienyloxyethyl acrylate | Dual curing ROMP/UV monomer | Hitachi chemicals |
| FA-511AS | Dicyclopentadieny acrylate | Dual curing ROMP/UV monomer | Hitachi chemicals |
| Kraton no. 1102 | Styrene-butadiene-styrene rubber | rubber | GLS |
| | Polybutadiene | rubber | Lanexss |
| Vistalon | ethylene propylene diene (EPDM) rubber | rubber | ExonMobile chemicals |
| Exact plastomers | | Rubber-plastic | ExonMobile chemicals |
| Ethanox 702 | 4,4'-Methylenebis(2,6-di-tert-butylphenol) | antioxidant | Albemarle |
| Grubbs 1$^{st}$ generation catalyst | Benzylidene-bis(tricyclohexylphosphine)-dichlororuthenium | ROMP catalyst (active at room temperature) | Materia |
| Grubbs 2$^{st}$ generation catalysts | [1,3-bis-(2,4,6-trimethylphenyl)-2-imidazolidinylidene]dichloro (phenylmethylene)(tricyclohexylphosphine)ruthenium | ROMP catalyst (active at room temperature) | Materia |
| Hoveyda-Grubbs 1$^{st}$ Generation Catalyst | Dichloro(o-isopropoxyphenylmethylene) (tricyclohexylphosphine)ruthenium(II) | ROMP catalyst (active at room temperature) | Materia |
| Hoveyda-Grubbs 2$^{nd}$ Generation Catalyst | [1,3-Bis-(2,4,6-trimethylphenyl)-2-imidazolidinylidene]dichloro (oisopropoxyphenylmethylene)ruthenium | ROMP catalyst (active at room temperature) | Materia |
| Umicore 41 | [1,3-Bis(mesityl)-2-imidazolidinyl-idene]-[2-[[(4-methylphenyl)imino] methyl]-4-nitro-phenolyl]-[3-phenyl-indenylidene] (chloro)ruthenium(II) | ROMP catalyst (Pre-catalyst, activatable by an acid) | Umicore |

TABLE 1-continued

| Trade Name | Chemical Type | Function | Supplier |
|---|---|---|---|
| Umicore 42 | [1,3-Bis(mesityl)-2-imidazolidinylidene]-[2-[[(2-methylphenyl)imino]methyl]-phenolyl]-[3-phenyl-indenyliden](chloro)ruthenium(II) | ROMP catalyst (Pre-catalyst, activatable by an acid) | Umicore |
| Umicore 22 | cis-[1,3-Bis(2,4,6-trimethylphenyl)-2-imidazolidinylidene]dichloro(3-phenyl-1H-inden-1-ylidene)(triisopropylphosphite)ruthenium(II) | ROMP catalyst (thermally-activatable latent catalyst) | Umicore |
| Umicore 2 | 1,3-Bis(2,4,6-trimethylphenyl)-2-imidazolidinylidene]dichloro(3-phenyl-1H-inden-1-ylidene)(tricyclohexylphosphine)ruthenium(II) | ROMP catalyst (active at room temperature) | Umicore |
| Umicore 61 | [1,3-Bis(2,4,6-trimethylphenyl)-2-imidazolidinylidene]dichloro[2-methyl(phenyl)amino]benzylidene]ruthenium(II) | ROMP catalyst (active at room temperature) | Umicore |
| Triphenyl phosphine | Triphenyl phosphine | ROMP inhibitor | Sigma aldrich |
| Triethylphosphite | Triethylphosphite | ROMP inhibitor | Sigma aldrich |
| Trimethylphosphite | Trimethylphosphite | ROMP inhibitor | Sigma aldrich |
| tributylphosphite | tributylphosphite | ROMP inhibitor | Sigma aldrich |
| Irgacure PAG103 | | PAG (latent activator) | BASF |
| Irgacure PAG121 | | PAG (latent activator) | BASF |
| Trichloro(phenyl) silane | Trichloro(phenyl)silane | Acid generator (activator) | Aldrich |
| HCl | | Acid | |

The Modeling Material Formulations:

According to some of any of the embodiments described herein, the building material comprises one or more modeling material formulations which, upon being dispensed, can undergo a ROMP reaction.

According to some of any of the embodiments described herein, the building material comprises one or more modeling material formulations which form a ROMP system as described herein.

As is known in the art and discussed briefly hereinabove, ROMP reactions typically require a catalyst for initiating the polymerization reaction. As further discussed herein, once an active catalyst contacts a ROMP monomer, the polymerization reaction typically starts immediately, sometime without application of a curing energy, and hence modeling material formulations in which an active catalyst, as described herein, is utilized “as is”, are inapplicable for 3D inkjet printing.

Embodiments of the present invention therefore relate to modeling material formulations which are designed such that, prior to exposure to a suitable condition, the ROMP system is inactive, that is a ROMP catalyst does not initiate ROMP of the monomer, and a ROMP monomer does not polymerize via ROMP to provide a respective polymer, as described herein.

Embodiments of the present invention therefore relate to modeling material formulations which are designed such that, prior to exposure to a suitable condition, the catalyst does not initiate the ROMP reaction, that is, prior to exposure to a suitable condition, at least 50%, preferably at least 60%, preferably at least 70%, at least 80%, at least 90%, at least 95% and even 100% of the ROMP monomers do not undergo polymerization. In other words, prior to exposure of a ROMP system to a suitable condition, no more than 40% or no more than 30% or no more than 20% or no more than 10% or no more than 5% of the monomer polymerizes via ROMP mechanism to provide a respective polymer.

Such modeling material formulations are characterized by a viscosity of no more than 35 centipoises, or no more than 25 centipoises at a temperature of the inkjet printing head during the dispensing.

In some embodiments, such modeling material formulations are characterized by the indicated viscosity at a temperature lower than 70° C., or lower than 65° C., or lower than 60° C., or lower than 50° C., or lower than 40° C., or lower than 30° C., and even at room temperature (e.g., 25° C.). Such a viscosity is indicative of the presence (e.g., of more than 80%) of non-polymerizable ROMP monomers in the formulation, or of the absence (e.g., less than 20% of the formulation) of polymeric materials obtained by ROMP in the formulation.

The modeling material formulations described herein are therefore designed such that ROMP of the ROMP monomers is not effected when the formulations pass through the inkjet printing heads.

Embodiments of the present invention further relate to modeling material formulations which are designed such that, upon exposure to a suitable condition (an inducing condition as described herein), the ROMP system becomes active, that is a ROMP catalyst is active towards ROMP of the monomer, and a ROMP monomer undergo polymerization via ROMP to provide a respective polymer.

Embodiments of the present invention relate to modeling material formulations which are designed such that, upon exposure to a suitable condition, the catalyst initiates the ROMP reaction, that is, upon exposure to a suitable condition, at least 50%, preferably at least 60%, preferably at least 70%, at least 80%, at least 90%, at least 95% and even 100% of the ROMP monomers undergo polymerization via ROMP reaction.

In some of any of the embodiments described herein, the building material comprises one (single) type of a modeling material formulation. Such embodiments are also referred to herein as "single jetting" methodology or approach.

In some of these embodiments, the modeling material formulation comprises only ROMP monomers as curable materials. Such embodiments are also referred to herein as "single jetting single curing" methodology or approach.

In some of these embodiments, the modeling material formulation comprises in addition to ROMP monomers, also one or more types of monomers which are polymerizable via a non-ROMP reaction, as curable materials. Such embodiments are also referred to herein as "single jetting dual curing" or "single jetting multi-curing" methodology or approach.

In some of any of the embodiments described herein, the building material comprises two or more types of a modeling material formulation. Such embodiments are also referred to herein as "dual jetting" or "multi jetting" methodology or approach, respectively.

In some of these embodiments, each of the modeling material formulations comprises only ROMP monomers as curable materials. Such embodiments are also referred to herein as "dual jetting single curing" or "multi-jetting single curing" methodology or approach.

In some of these embodiments, the modeling material formulations comprise in addition to ROMP monomers, also one or more types of monomers which are polymerizable via a non-ROMP reaction, as curable materials. Such embodiments are also referred to herein as "multi-jetting multi-curing" or "dual jetting multi-curing" or "dual jetting dual curing" methodology or approach.

Generally, in the above terminology, "jetting" refers to the number of modeling material formulations included in the building material, and "curing" refers to the number of polymerization reactions that occur when the dispensed layers are exposed to a curing condition (e.g., a ROMP inducing condition, or a ROMP inducing condition and one or more additional curing conditions).

It is to be noted that dual curing or multi curing refers herein to the type of polymerization reactions and not to the number of conditions applied for inducing curing.

"Single Jetting Single Curing" Modeling Material Formulation:

According to some of any of the embodiments described herein, the building material comprises a single modeling material formulation, and the single modeling material comprises all the components of a ROMP system, as described herein in any of the respective embodiments.

In some of these embodiments, the ROMP system consists of a ROMP monomer as described herein and an active catalyst, as defined herein. According to these embodiments, the modeling material formulation comprises a ROMP catalyst and a ROMP monomer, and is such that the catalyst is active towards initiating ROMP of the monomer. The ROMP system in the modeling material formulation, according to these embodiments is an active ROMP system, in which the ROMP catalyst initiates ROMP of the monomer when the catalyst contacts the monomer.

According to some of these embodiments, the active catalyst and the ROMP monomer are physically separated in the modeling material formulation, such that no contact is effected between the catalyst and the ROMP monomer and hence the ROMP system is inactive, and the catalyst does not initiate ROMP of the monomer, as described herein. In these embodiments, the ROMP system is inactive in the modeling material formulation due to physical separation between the catalyst and the ROMP monomer.

According to some of these embodiments, the ROMP system becomes active once the physical separation is removed. Hence, in some embodiments, the condition is removal of the physical separation between the catalyst and the ROMP monomer. The physical separation results in a contact between the catalyst and the ROMP monomer and in an active ROMP system in which the catalyst initiates ROMP of the monomer.

In some embodiments, exposing the modeling material formulation to a condition for inducing initiation of ROMP of the monomer by the catalyst comprises removal of a physical separation between a ROMP catalyst and the ROMP monomer.

Physical separation can be effected, for example, by encapsulation of one or more components of the ROMP system.

By "encapsulation" it is meant that a component is enveloped by a capsule, whereby a capsule is used herein to describe a closed structure by which a component is enveloped. In some embodiments, the capsule has a core-shell structure in which the core is the encapsulated component which is enveloped by a shell.

Herein, the terms "physically separated" and "encapsulated" or "physical separation" and "encapsulation" are sometimes used interchangeably, for simplicity.

In some embodiments one of the catalyst and the ROMP monomer is encapsulated and the other is not encapsulated. In some embodiments, each of the ROMP monomer and ROMP catalyst is individually encapsulated (enveloped by a capsule). The capsules encapsulating the ROMP monomer can be the same as or different from the capsules encapsulating the ROMP catalyst.

The capsule may have any shape and can be made of any material.

In some embodiments, the capsule is designed so as to release its content, namely, the encapsulated ROMP component (ROMP monomer or ROMP catalyst) upon being exposed to a condition.

In some embodiments, exposure to a condition that induces initiation of ROMP monomer by the ROMP catalyst comprises exposure to a condition that affects release of a ROMP component from a capsule. That is, the ROMP including condition is a condition that degrades a capsule and results in contacting the catalyst with the ROMP monomer.

In some embodiments, the release of a ROMP component from a capsule is effected by exposure to a condition that affects degradation of the capsule.

Degradation of the capsule can be effected, for example, mechanically, so as to affect rupture or breaking of the capsule, and the condition is such that causes mechanical degradation of the capsule.

The mechanical degradation can be effected, for example, by application of mechanical forces such as shear forces.

In some embodiments, mechanical degradation is effected by exposing the capsule to shear forces, for example, by passing a modeling material formulation comprising the capsule through one or more inkjet printing heads (e.g., Ricoh Gen 3) which allow jetting at a frequency range of from about 10 kHz to about 30 kHz.

Alternatively, shear forces at such a rate are applied to the dispensed layers of the formulation (e.g., to the receiving tray).

Degradation of the capsule can be effected, for example, physically or chemically, by application of, for example, heat or radiation to the capsule so as to decompose capsule or melt the capsule's shell.

Degradation of the capsule can thus be effected by exposing the capsule to heat or radiation, to thereby release its content.

Non-limiting examples for encapsulation of a ROMP catalyst and/or a ROMP monomer include utilizing capsules made of, for example, wax, degradable polymeric materials, degradable micelles, sol-gel matrices, and/or clays. Exemplary degradable capsules are described, for example, in Adv. Funct. Mater. 2008, 18, 44-52; Adv. Mater. 2005, 17, 39-42; and Pastine, S. J.; Okawa, D.; Zettl, A.; Fréchet, J. M. J. J. Am. Chem. Soc. 2009, 131, 13586-13587. doi:10.1021/ja905378v; all of which are incorporated by reference as if fully set forth herein.

In some embodiments, one or more of the ROMP catalyst (e.g., an active catalyst) and a ROMP monomer is encapsulated (e.g., individually encapsulated, in case both are encapsulated) in a capsule and exposing a modeling material formulation to the inducing condition comprises passing the formulation through the inkjet printing heads at a shear rate that causes mechanical degradation of the capsule and release on the encapsulated component.

In some embodiments, one or more of the ROMP catalyst (e.g., an active catalyst) and a ROMP monomer is encapsulated (e.g., individually encapsulated, in case both are encapsulated) in a capsule and exposing a modeling material formulation to the inducing condition comprises exposing the dispensed formulation to heat or radiation to thereby cause degradation of the capsule and release the encapsulated component from the capsule.

In some of any of the embodiments described herein, the formulation comprises a plurality of capsules encapsulating one or both of the ROMP components. The capsules can be the same or different and can release their content when exposed to the same or different inducing condition.

In some of any of the embodiments described herein, the modeling material formulation comprises a ROMP catalyst and a ROMP monomer, and is such that the catalyst is inactive towards initiating ROMP of the monomer upon exposure to the condition.

In these embodiments, the ROMP system consists of a ROMP monomer as described herein and a latent catalyst, as defined herein, and a condition for activating the catalyst. According to these embodiments, prior to exposing the formulation to the inducing condition, the catalyst is inactive towards initiation of ROMP of the monomer, as explained hereinabove for a latent catalyst. The modeling material formulation, prior to exposure to the condition, is an inactive ROMP system, as described herein.

In some of these embodiments, the latent catalyst is photo-activatable by, for example, exposure to radiation, as described herein, and in some embodiments the latent catalyst is thermally-activatable by, for example, exposure to heat, as described herein.

In some of any of these embodiments, exposing the modeling material formulation to the inducing condition comprises exposing the formulation to heat or radiation or to any other condition that activates the catalyst, namely, converting a latent catalyst into an active catalyst.

In some of any of the embodiments described herein for the latent catalyst, the latent catalyst can be physically separated from the ROMP monomer, according to any one of the respective embodiments described herein for physical separation of an active catalyst. In some of any of the embodiments described herein, the ROMP system comprises a ROMP monomer as described herein, and a catalyst system that comprises a pre-catalyst, as defined herein, and an activator (co-catalyst) for chemically activating the catalyst.

In some of these embodiments, the ROMP system consists of a ROMP monomer as described herein, and a catalyst system that comprises a pre-catalyst, as defined herein, and an activator (co-catalyst) for chemically activating the catalyst. In such a system, the activator chemically activates the catalyst, once it contacts the catalyst and the catalyst initiates the ROMP, once it contacts the ROMP monomer, without a stimulus.

In some of these embodiments, the activator is chemically active, that is, is capable of chemically-activating the catalyst, which in turn, becomes active towards initiation of the ROMP. In these embodiments, the ROMP system in the modeling material formulation is active.

In some of these embodiments, the ROMP system is rendered inactive by physical separation between at least two of its reactive components.

In some of these embodiments, when the activator is active in the formulation, the activator is physically separated from the catalyst (e.g., the pre-catalyst) and/or the ROMP monomer in the modeling material formulation. That is, the modeling material formulation is such that there is no contact between the activator and the catalyst, or between the activator and the monomer, or between the catalyst and the monomer, or between the activator and the catalyst and the monomer. Because at least two of the ROMP components composing the active ROMP system according to these embodiments do not contact one another, the ROMP system is inactive.

According to some of these embodiments, the inducing condition renders the ROMP system active, at least by removing the physical separation and allowing contact between all the components composing the ROMP system.

According to some of these embodiments, the inducing condition is, or comprises, removing the physical separation between the activator and the catalyst (e.g., the pre-catalyst) and/or the monomer.

In some of these embodiments, the physical separation is effected by encapsulation, that is, by using a capsule (or a plurality of capsules) enveloping one or more of the catalyst, the activator and the monomer.

The capsules can be capsules individually encapsulating the activator, capsules individually encapsulating the ROMP monomer, capsules individually encapsulating the pre-catalyst, or any combination thereof.

The capsules can alternatively comprise capsules encapsulating a ROMP monomer and the activator, or capsules encapsulating a ROMP monomer and a catalyst, or capsules encapsulating an activator and a catalyst. The ROMP component not included in such capsules can be individually encapsulated, or non-encapsulated, in the modeling material formulation.

In some of any of these embodiments, the capsule is such that release the ROMP component(s) encapsulated therein upon exposure to a condition. In some embodiments, exposing the modeling material to the ROMP inducing condition comprises exposing the formulation to a condition that affects a release of one or more of the ROMP components from a capsule encapsulating same and results in a contact between all the reactive components of the ROMP system.

Any of the embodiments described herein for degradable capsules are contemplated for the embodiments pertaining to a modeling material formulation that comprises a pre-catalyst and an active activator, as described herein.

In some embodiments, the activator is enveloped by a degradable capsule and is released from the capsule upon exposure to a condition that affects degradation of the capsule and hence release of the activator.

In some of any of these embodiments, the ROMP inducing condition allows contacting between the activator and the pre-catalyst, to thereby generate an active catalyst, which in turn, contacts the ROMP monomer and initiates ROMP of the monomer.

In some of any of the embodiments described herein, the ROMP system comprises a ROMP monomer as described herein, and a catalyst system that comprises a pre-catalyst, as defined herein, a latent activator (latent co-catalyst) for chemically activating the catalyst, and a condition for activating the activator towards chemically activating the catalyst.

In such a system, the activator chemically activates the catalyst and the catalyst initiates the ROMP upon exposure to the condition.

According to these embodiments, prior to exposing the formulation to the inducing condition, the activator is inactive towards activating the catalyst (the activator is incapable of chemically activating the catalyst), and hence the catalyst is inactive towards initiation of ROMP of the monomer, as explained hereinabove for a latent activator in an activator-pre-catalyst system. According to these embodiments, the modeling material formulation comprises a ROMP pre-catalyst, a ROMP monomer, and a latent activator of the catalyst, and is such that the activator is activatable towards activating the catalyst and the pre-catalyst is convertible to an active catalyst for initiating ROMP of the monomer, upon exposure to the condition. The modeling material formulation, prior to exposure to the condition, is an inactive ROMP system, as described herein. The ROMP system is activated upon exposure to a condition that activates the latent activator.

In some of these embodiments, the latent activator is photo-activatable by, for example, exposure to radiation, as described herein, and in some embodiments the latent activator is thermally-activatable by, for example, exposure to heat, as described herein.

In some of any of these embodiments, exposing the modeling material formulation to the inducing condition comprises exposing the formulation to heat or radiation or to any other condition that activates the activator, namely, converting a latent activator into an active activator, to thereby chemically activating the catalyst towards initiating ROMP of the ROMP monomer.

According to these embodiments, the inducing condition comprises a condition that converts a latent activator to an active activator.

In some of any of the embodiments described herein for a latent activator, one or more of the pre-catalyst, the latent activator and the ROMP monomer can be physically separated in the composition, as described herein in any of the embodiments pertaining to an active activator.

In some of any of the embodiments described herein for single jetting single curing methodology, any combination of the respective embodiments is contemplated.

In exemplary embodiments, a ROMP monomer is encapsulated, a pre-catalyst is encapsulated, and the activator is a latent activator as described herein, and can be encapsulated or not.

In other exemplary embodiments, a latent catalyst is used, and is encapsulated. In some of these embodiments, the ROMP monomer can be encapsulated or not.

In other exemplary embodiments, a latent catalyst is used, and is encapsulated or not, and the ROMP monomer is encapsulated.

In some of any of the embodiments described herein, converting a ROMP system to an active ROMP system is effected by two or more conditions. For example, when one or more the ROMP component is encapsulated and one of the catalyst and the activator is latent, exposure to one condition releases the ROMP component from the capsule and exposure to another condition activates the latent component. According to these embodiments, the ROMP inducing condition comprises a set of conditions and exposing the formulation to these conditions can be effected simultaneously or sequentially. In exemplary embodiments, exposure to one condition is effected by passing the formulation through the inkjet printing heads (application of shear forces to degrade a capsule) and exposure to another condition is application of radiation.

In some of any of the embodiments described herein, converting a ROMP system to an active ROMP system is effected by a single condition. For example, a latent catalyst which is photoactivatable can be used in combination with a ROMP monomer that is encapsulated by photodegradable capsules (which undergo degradation upon exposure to radiation such as UV radiation). In another example, a pre-catalyst and/or a ROMP monomer are encapsulated in photodegradable capsules and a latent activator that is photoactivatable is used. In such embodiments, and similar embodiments, a UV-activatable ROMP system is provided in the modeling material formulation.

In additional exemplary embodiments, a latent catalyst which is thermally-activatable can be used in combination with a ROMP monomer that is encapsulated by thermally-degradable capsules (which undergo degradation upon exposure to heat). In another example, a pre-catalyst and/or a ROMP monomer are encapsulated in thermally-degradable capsules and a latent activator that is thermally-activatable is used. In such embodiments, and similar embodiments, a thermally-activatable ROMP system is provided in the modeling material formulation.

In some of any of the embodiments described herein for single jetting single curing methodology, the modeling material can further comprise a ROMP inhibitor, as described herein.

In some of any of the embodiments described herein for the "single jetting single curing" methodology, the modeling material formulation can comprise, in addition to the ROMP components, additional, non-curable (non-reactive) materials, as described in further detail hereinunder.

Single Jetting Multi-curing (e.g., Dual Curing):

According to some embodiments of the present invention, a modeling material formulation as described herein for any one of the embodiments of "single jetting single curing" further comprises one or more curable systems which undergo polymerization and/or curing via a non-ROMP reaction.

A non-ROMP reaction refers to any polymerization and curing reactions that do not involve ROMP. Such reactions include, for example, chain growth polymerization such as free-radical polymerization, cationic polymerization, anionic polymerization, and step-growth polymerization such as polycondensation.

In some embodiments, a curable system which undergoes polymerization and/or curing via a non-ROMP reaction, as described herein, comprises monomers and/or oligomers which are polymerizable by a non-ROMP reaction as described herein. Such materials are also collectively referred to herein as non-ROMP polymerizable materials or monomers, or non-ROMP curable materials or monomers.

A curable system which undergoes polymerization and/or curing via a non-ROMP reaction can alternatively, or in addition, comprise short-chain polymeric materials which undergo curing by, for example, cross-linking, whereby the curing comprises free-radical cross-linking, cationic or anionic cross-linking, and/or polycondensation. Such materials are also encompassed herein by the expressions non-ROMP polymerizable materials or monomers, or non-ROMP curable materials or monomers.

A curable system which undergoes polymerization and/or curing via a non-ROMP reaction may comprise one or more curable materials that undergo polymerization and/or curing via a non-ROMP reaction, and optionally one or more initiators for initiating a respective non-ROMP reaction. In some embodiments, such a system further comprises a condition for inducing initiation of the non-ROMP reaction.

A curable system which undergoes polymerization and/or curing via a non-ROMP reaction is also referred to herein as a non-ROMP curable system.

In some of these embodiments, the modeling material further comprises, in addition to the ROMP components described for the single curing approach, one or more curable materials that undergo polymerization and/or curing via a non-ROMP reaction, and optionally one or more initiators for initiating a respective non-ROMP reaction.

In some of any of the embodiments pertaining to a dual curing approach, the method further comprises exposing the modeling material formulation to a condition for inducing initiation of a respective polymerization and/or curing via a non-ROMP reaction.

In some embodiments, the condition for inducing polymerization and/or curing via a non-ROMP reaction is the same as the ROMP indicting condition, and in some embodiments, it is a different condition.

When the condition is different from the ROMP inducing condition, exposure to the conditions can be effected simultaneously or sequentially. The order can be determined as desired, by any person skilled in the art.

In some of any of the embodiments described herein, one or more of the components of a curable system (e.g., a non-ROMP curable material and/or an initiator of a respective non-ROMP reaction) and/or one or more of the ROMP components in the modeling material formulation is/are physically separated from the other components in the formulation.

In some of these embodiments, one or more of the ROMP components, e.g., a ROMP monomer, a ROMP active catalyst, a ROMP latent catalyst, a ROMP pre-catalyst and/or a ROMP activator (latent or not), if present, is physically separated from other components in the modeling material formulation.

Alternatively, or in addition, one or more of the non-ROMP curable systems, e.g., a non-ROMP curable monomer and/or a respective initiator and/or activator, is physically separated from other components in the modeling material formulation.

In some of any of these embodiments, the physical separation can be, for example, by means of a capsule enveloping the component, and the capsule is such that releases the enveloped component upon exposure to the condition that induced curing (a ROMP inducing condition or another curing condition).

The capsule and corresponding conditions for releasing an enveloped component and thereby initiating curing, can be in accordance with any of the embodiments described herein for a ROMP system.

In embodiments where two or components are individually encapsulated, the capsules can be degradable upon exposure to the same or different condition for initiating curing.

In a non-limiting example, a modeling material formulation for a single jetting dual curing methodology can comprise a ROMP monomer, a ROMP active catalyst, a non-ROMP curable monomer and a non-ROMP initiator, whereby the ROMP active catalyst is encapsulated.

In another example, a modeling material formulation for a single jetting dual curing methodology can comprise a ROMP monomer, a ROMP latent or active catalyst, a non-ROMP curable monomer and a non-ROMP initiator, whereby the ROMP latent catalyst is encapsulated and the non-ROMP initiator are individually encapsulated. The capsules of the ROMP catalyst and the non-ROMP initiator can be the same or different, and the condition for degrading the capsules and releasing the encapsulated component can be the same or different.

Any other combinations of encapsulated and non-encapsulated components in a dual curing methodology are contemplated.

In some of any of the embodiments described herein, the non-ROMP curable system is polymerizable or curable by free radical polymerization. In some of these embodiments, the modeling material formulation comprises, in addition to a selected inactive ROMP system as described herein in any of the respective embodiments, a monomer and/or oligomer that is polymerizable by a free radical polymerization and a free radical initiator.

In some of any of the embodiments described herein, the non-ROMP curable system is polymerizable or curable by cationic polymerization. In some of these embodiments, the modeling material formulation comprises, in addition to a selected inactive ROMP system as described herein in any of the respective embodiments, a monomer and/or oligomer that is polymerizable by a cationic polymerization and a cationic initiator.

In some of any of the embodiments described herein, the non-ROMP curable system is polymerizable or curable by anionic polymerization. In some of these embodiments, the modeling material formulation comprises, in addition to a selected inactive ROMP system as described herein in any of the respective embodiments, a monomer and/or oligomer that is polymerizable by anionic polymerization and an anionic initiator.

In some of any of the embodiments described herein, the non-ROMP initiator is a latent initiator, which is activatable upon exposure to a curing condition, as described herein.

In some of any of the embodiments described herein, the non-ROMP initiator is chemically activatable by an activator, similarly to the ROMP pre-catalysts and activators described herein. In some of these embodiments, the modeling material formulation further comprises such an activator for chemically activating the non-ROMP initiator. The activator in the formulation can be a latent activator which is activatable upon exposure to a curing condition. The activator can alternatively physically separated, as described herein, from other non-ROMP components in the formulation. The activator, latent or not, can be the same activator that chemically activates a ROMP pre-catalyst or can be a different activator.

In some of any of the embodiments described herein, the non-ROMP curable system is a photo-polymerizable or photo-activatable system, which undergoes polymerization and/or curing upon exposure to radiation as a curing condition. The radiation in these embodiments may affect one or more of initiation of a non-ROMP reaction by activating a latent initiator; initiation of a non-ROMP reaction by activating a latent activator; and/or releasing one or more encapsulated components of the system.

In some of these embodiments, the ROMP system in the formulation is a photo-activatable system, as described herein.

In some of these embodiments, the radiation required for curing the ROMP system and the non-ROMP system is the same (e.g., UV radiation).

In some of these embodiments, a modeling material formulation is cured upon exposure to radiation as a single condition for inducing curing of the formulation.

Exemplary non-ROMP curable systems and formulations that can be combined with ROMP components for the single jetting dual curing or multi-curing methodology are described on further detail hereinunder.

In some of any of the embodiments described herein, a ROMP monomer is such that further comprises a group that is polymerizable by a non-ROMP reaction. Such monomers are referred to herein as dual-curing monomers or oligomers or materials.

For example, a ROMP monomer which is a strained cyclic olefin as described herein, can be substituted by an acrylate- or methacrylate-containing group, that can undergo free-radical polymerization. Exemplary such monomers are dicyclopentenyl acrylates, such as, for example, Fancryl FA511 AS, FA512AS, marketed by Hitachi, which contain an acrylic functional group and cyclic olefin structure enabling dual polymerization of the same compound using free radical mechanism and ROMP mechanism, respectively.

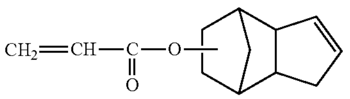

FC-511AS

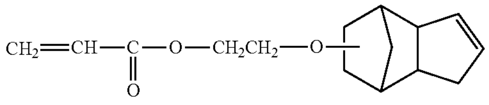

FC512AS

Other examples for dual-curing monomers are epoxy norbornene derivatives, such as, for example, described in U.S. Pat. Nos. 8,362,171 and 7,728,090, which are incorporated by reference as if fully set forth herein.

Multi-Jetting (e.g., Dual Jetting):

In some of any of the embodiments described herein, the building material comprises two or more modeling material formulations which are dispensed from different inkjet printing heads (each formulation is jetted from a different printing head or a different set of printing heads) to form the layers.

Such a methodology, which is referred to herein as dual jetting, when two different modeling material formulations are used, or as multi-jetting, when more than two modeling material formulations are used, allows dispensing modeling material formulations which are absent of one or more of the components required for a polymerization or curing to occur, whereby when the formulations are dispensed and contact one another, curing and/or polymerization occurs.

In the context of some of the present embodiments, such a methodology allows separating ROMP components as described herein by including a different combination of components in each formulation, whereby none of the formulations comprises all the components required for the ROMP reaction to occur. According to these embodiments, a ROMP reaction, and optionally non-ROMP reactions, occur only on the receiving medium, and after the building material is dispensed.

In some of these embodiments, exposing the formulation to a condition for initiating ROMP can be effected by contacting the different formulations on the receiving medium (receiving tray). In some of these embodiments, exposing to a ROMP inducing condition is effected by dispensing the formulations.

Connex 3™ (Stratasys Ltd., Israel) multiple material deposition technology, is an exemplary technology that provides the possibility to separate the components of a polymerizable or curable system into different formulations. Objet Connex 3™ (Stratasys Ltd., Israel) multiple material deposition system, is a system that allows utilizing such a technology.

In some of any of these embodiments, the building material comprises two or more modeling material formulations, and the two or more modeling material formulations are such that when combined, curing is effected by ROMP reaction. These embodiments are referred to herein as dual jetting single curing or multi-jetting single curing methodology.

In some of any of these embodiments, the building material comprises two or more modeling material formulations, and the two or more modeling material formulations are such that when combined, curing is effected by both a ROMP reaction and a non-ROMP reaction, as defined herein. These embodiments are referred to herein as dual jetting dual curing or multi-jetting multi-curing methodology.

Multi-jetting (e.g., Dual Jetting) Single Curing:

In some of any of these embodiments, the building material comprises two or more modeling material formulations, and the two or more modeling material formulations are such that when combined, curing is effected by ROMP reaction.

In some of these embodiments, each of the modeling material formulations comprises a ROMP monomer (which can be the same or different).

In some of any of the embodiments pertaining to multi-jetting single curing, any of the ROMP systems described hereinabove for single-jetting single curing can be used, whereby a different combination of the ROMP components of a respective system is included in each of the modeling material formulations.

In some of these embodiments, each of the modeling material formulations comprises a ROMP monomer (which can be the same or different), and one of the formulations further comprises a ROMP catalyst.

In some of these embodiments, the building material comprises more than two the modeling material formulations, each independently comprising a ROMP monomer (which can be the same or different), and one or two of these formulations further comprises a ROMP catalyst.

In some of any of these embodiments, one or more of the modeling material formulations is devoid of a ROMP catalyst, and in some embodiments, one or more of the modeling material formulations comprises a ROMP monomer and a ROMP catalyst.

In some of these embodiments, one or more of the ROMP catalysts is an active catalyst, as described herein.

In some of these embodiments, the formulations comprise two or more types of catalysts.

In exemplary embodiments, the two or more catalysts are active catalysts.

In some of these embodiments, the formulations comprise two or more types of ROMP monomers.

In some of these embodiments, each of the ROMP active catalysts has a different reactivity towards initiation of ROMP of the different monomers.

In some exemplary embodiments, a ROMP system of the modeling material formulations comprises first and second ROMP monomers, and first and second ROMP active catalysts. The first ROMP active catalyst has a higher reactivity towards initiation of ROMP of the first monomer, and the second ROMP active catalyst has a higher reactivity towards initiation of ROMP of the second monomer.

In some of these embodiments, one of the formulations comprises a first ROMP monomer and the second active catalyst that is less reactive towards initiation of ROMP of the first monomer and has a higher reactivity towards initiation of ROMP of the second ROMP monomer, and another one of the formulations comprises the first active catalyst that is less reactive towards initiation of ROMP of the second ROMP monomer and has a higher reactivity towards initiation of ROMP of the first ROMP monomer.

Such exemplary embodiments allow using active catalysts while avoiding substantial clogging of the inkjet printing heads.

In some of any of the embodiments described herein, the ROMP catalyst(s) include one or more latent catalysts, which are activatable upon exposure to a ROMP inducing condition, as described herein.

A method, according to these embodiments, comprises exposing the dispensed layers to a condition that activates the catalyst, as described herein.

In some embodiments, the ROMP system further comprises an activator and the catalyst is a pre-catalyst.

In some of these embodiments, each of the modeling material formulations independently comprises a ROMP monomer, one or more of the formulations further comprise a pre-catalyst, and one or more other formulations further comprise an activator. In some of these embodiments, the one or more formulations that comprise the activator are devoid of the pre-catalyst. In some embodiments, the one or more formulations that comprise the pre-catalyst are devoid of an activator.

In some of these embodiments, exposing the dispensed layers to inducing condition is effected by the contacting the formulations on the receiving medium, and hence comprises the formation of the dispensed layers (e.g., by jetting the modeling material formulation by the inkjet printing heads).

In some of any of the embodiments described herein, the ROMP system comprises a latent activator.

In some of these embodiments, exposing the dispensed layers to inducing condition is effected by exposing the dispensed formulations to a condition that activates the activator.

In some of any of the embodiments described herein, one or more of the components in one or more of the formulations is physically separated from the other components in the formulation, as described herein in the context of the single jetting single curing embodiments.

In some of any of the embodiments described herein, one or more, or each, of the modeling material formulations further comprises a ROMP inhibitor.

In some of any of the embodiments described herein, one or more, or each, of the modeling material formulations, further comprises additional materials, as is described in further detail hereinunder.

In some of any of the embodiments described herein, converting the ROMP system or systems to active ROMP systems is effected by a single condition. For example, in some embodiments, activating of a latent catalyst, if present in one or more of the formulations, of a latent activator, if present in one or more of the formulations, and/or release of one or more components that are encapsulated (e.g., degradation of capsules enveloping a ROMP component, if present in one or more of the formulations, are all effected upon exposing the dispensed formulations to the same condition. The condition can be, for example, radiation (e.g., UV radiation), such that the ROMP system or systems in the two or more modeling material formulations is/are photoactivatable. The condition can be, for example, heat, such that the ROMP system or systems in the two or more modeling material formulations is/are thermally-activatable.

Multi (e.g., Dual) Jetting Multi (e.g., Dual) Curing:

In some of the embodiments described herein pertaining to multi-curing or dual curing, the two or more modeling material formulations comprise, in addition to ROMP components, components of one or more non-ROMP curable systems, as described herein (for example, under "single jetting multi-curing").

The components of such a building material therefore undergo polymerization and/or curing via ROMP polymerization and also by one or more non-ROMP reactions, as described herein.

In some of these embodiments, the components of the two or more modeling material formulations form two curable systems, for example, one or more ROMP systems and one or more of free radial polymerization system, cationic polymerization system, anionic polymerization system, etc. Any polymerization system that is usable in 3D inkjet printing is contemplated.

In some of any of these embodiments, the ROMP components can include one or more ROMP monomers and one or more catalysts, for example, active catalysts.

In some of the embodiments when an active catalyst is used, the active catalyst is included in a modeling material formulation that is devoid of a ROMP monomer, and which, in some embodiments, comprises a material that polymerizable by a non-ROMP reaction (a non-ROMP curable or polymerizable material) as described herein.

In some of the embodiments when an active catalyst is used, one or more of the modeling material formulations comprises a ROMP monomer or monomers, and is devoid of a catalyst, and other one or more modeling material formulation comprises a ROMP catalyst which is an active catalyst, and is devoid of a ROMP monomer.

Alternatively, in any one of these embodiments, the catalyst is a latent catalyst.

Further alternatively, in any one of these embodiments, the catalyst is physically separated from the other components in the formulation containing same. Physical separation can be effected by means of degradable capsules, as described herein.

In any one of the embodiments when a latent catalyst is used, the inducing condition comprises a condition which activates the catalyst, as described herein.

In any one of the embodiments when an encapsulated catalyst is used, the inducing condition comprises a condition which degrades the capsule so as to release the active catalyst.

Alternatively, in any one of these embodiments, the catalyst is a pre-catalyst and the one or more of the modeling material formulations comprises an activator or a latent activator, as described herein.

In some of these embodiments, one or more of the modeling material formulations comprise a ROMP monomer and a pre-catalyst and other one or more modeling material formulations comprise the activator. Alternatively, one or more of the modeling material formulations comprise a ROMP monomer and the activator and other one or more modeling material formulations comprise the pre-catalyst.

Whenever the activator is included in the formulation(s) as active towards chemically activating the pre-catalyst to provide an active catalyst, the inducing condition for effecting ROMP can be contacting the respective formulations on the receiving medium (tray). Thus exposing to the condition is effected by jetting the formulations by the inkjet printing heads (dispensing the layers of the formulations).

Further alternatively, one or more of the modeling material formulations comprise a ROMP monomer and other one or more modeling material formulations comprise the activator and the pre-catalyst. In some of these embodiments, the activator is a latent activator and/or one or both of the activator and the pre-catalyst are physically separated from one another, as described herein.

In some of any of the embodiments described herein, one or more of the modeling material formulations further comprises a non-ROMP curable material (a material polymerizable or curable by a non-ROMP reaction as described herein).

In some of these embodiments, the non-ROMP curable material is included in a formulation which comprises a ROMP catalyst (active, latent or pre-catalyst, encapsulated or non-encapsulated) and/or a ROMP activator (active or latent, encapsulated or non-encapsulated).

In some of these embodiments, one or more formulations comprise a ROMP monomer and one or more other formulations comprise a non-ROMP curable material and a ROMP catalyst (active, latent or pre-catalyst, encapsulated or non-encapsulated) and/or a ROMP activator (active or latent, encapsulated or non-encapsulated), and is devoid of a ROMP monomer.

In exemplary embodiments of a dual jetting methodology, one modeling material formulation, formulation A, comprises a ROMP monomer and another modeling material formulation, formulation B comprises a non-ROMP curable material. In some embodiments, formulation A further comprises a ROMP pre-catalyst (optionally encapsulated) and formulation B further comprises a ROMP activator (latent or not, encapsulated or non-encapsulated). In some embodiments, formulation A further comprises a ROMP activator (latent or not, optionally encapsulated) and formulation B further comprises a ROMP pre-catalyst (optionally encapsulated). In some embodiments, formulation B further comprises a ROMP catalyst (latent or active, optionally encapsulated). In some embodiments, formulation B further comprises a ROMP activator (latent or not, encapsulated or non-encapsulated) and a ROMP pre-catalyst (optionally encapsulated).

Other combinations are also contemplated. For example, in any of the formulations described herein for the multi-jetting single curing methodology, a ROMP monomer in one or more of the modeling material formulations can be replaced by a non-ROMP curable material.

In some of any of the embodiments described herein, one or more of the modeling material formulations, according to any one of the embodiments described herein and any combination thereof, further comprises an initiator of the non-ROMP reaction (a non-ROMP initiator).

In some of these embodiments, the initiator is comprised in one or more modeling material formulations which are devoid of a non-ROMP curable material. In some embodiments, one or more of the modeling material formulations comprise a ROMP monomer and a non-ROMP initiator. In some embodiments, such a formulation is devoid of one or more of the ROMP components of the ROMP system (e.g., a catalyst, an activator, a pre-catalyst).

In exemplary embodiments of a dual jetting methodology according to these embodiments, one modeling material formulation, formulation A, comprises a ROMP monomer and another modeling material formulation, formulation B comprises a non-ROMP curable material. In some embodiments, formulation A further comprises a ROMP pre-catalyst (optionally encapsulated) and a non-ROMP initiator (latent or active, optionally encapsulated), and formulation B further comprises a ROMP activator (latent or not, encapsulated or non-encapsulated). In some embodiments, formulation A further comprises a ROMP activator (latent or not, optionally encapsulated) and a non-ROMP initiator (latent or active, optionally encapsulated), and formulation B further comprises a ROMP pre-catalyst (optionally encapsulated). In some embodiments, formulation A further comprises a non-ROMP initiator (latent or active, optionally encapsulated) and formulation B further comprises a ROMP catalyst (latent or active, optionally encapsulated). In some embodiments, formulation A further comprises a ROMP activator (latent or not, optionally encapsulated) and a non-ROMP initiator (latent or active, optionally encapsulated), and formulation B further comprises a ROMP activator (latent or not, encapsulated or non-encapsulated) and a ROMP pre-catalyst (optionally encapsulated).

Other combinations are also contemplated. For example, in any of the formulations described herein for the multi-jetting single curing methodology, a ROMP monomer in one or more of the modeling material formulations can be replaced by a non-ROMP curable material, and one or more of the formulations further comprises a non-ROMP initiator (latent or active, optionally encapsulated).

In some of any of the embodiments described herein, the method further comprises exposing the formulation to one or more conditions for inducing polymerization and/or curing of the one or more non-ROMP curable systems. In some embodiments, the condition for inducing ROMP and the condition for inducing polymerization and/or curing of the non-ROMP curable material(s) are the same. In some embodiments, the conditions are different and can be applied simultaneously or sequentially, as desired or required.

Curable Systems:

A "curable system" as described herein refers to a system that comprises one or more curable materials, as defined herein.

In some of any of the embodiments described herein, a "curable system" comprises one or more curable materials and optionally one or more initiators and/or catalysts for initiating curing of the curable materials, and, further optionally, one or more conditions (also referred to herein as curing conditions) for inducing the curing, as described herein.

In some of any of the embodiments described herein, a curable material is a monomer or a mixture of monomers and/or an oligomer or a mixture of oligomers which can form a polymeric material upon a polymerization reaction, when exposed to a condition at which curing, as defined herein, occurs (a condition that affects or induces curing).

A "bifunctional" or "multifunctional" curable material or monomer is meant to describe curable materials that result in a polymeric material that features two or more functional groups, and hence can act also as a cross-linker, for cross-linking polymeric chains formed of the same and/or different curable materials in the building material.

In some embodiments, a curable system further comprises an initiator for initiating the curing and/or polymerization of the curable material(s). The initiator can be active towards the initiation of the curing and/or polymerization in the curable system or can be inactive towards this initiation.

Inactive initiators can be latent initiators, which are activatable upon exposure to a condition, and this condition induces the curing and/or polymerization.

Alternatively, inactive initiators can be inactive due to physical separation from the curable material(s). The physical separation can be effected by means of capsules, preferably degradable capsules as described herein. Such initiators are activatable by a condition that removes the physical separation, e.g., induces release of the initiator from the capsule, as described herein.

Further alternatively, inactive initiators can be chemically activated by an activator, and become active upon a condition that results in contacting the activator, similarly to any of the embodiments described herein in the context of a pre-catalyst and an activator.

In some of any of the embodiments described herein, depending on its components and chemistry, a curable system further requires a condition for effecting curing and/or polymerization of the curable materials.

In some of any of the embodiments described herein, the one or more modeling material formulations comprise a curable system that is an active system, namely, the components included in the one or more modeling material formulations can undergo polymerization or curing without a stimulus.

In some of any of the embodiments described herein, the one or more modeling material formulation comprise a curable system that is inactive, namely, the components included in the one or more modeling material formulations can undergo polymerization or curing only when exposed to a condition that induces curing.

A curable system as described herein may comprise, in addition to a curable material, an initiator and optionally an activator.

A curable system as described herein can be a ROMP system, as described herein in any of the respective embodiments, which comprises one or more ROMP monomers, as described herein in any of the respective embodiments.

In embodiments pertaining to dual or multi-curing, along with single jetting, namely, the modeling material formulation comprises in addition to components of a ROMP system, components of one or more additional curable systems, which are referred to herein also as non-ROMP systems.

In embodiments pertaining to dual or multi-curing, along with dual or multi-jetting, the two or more modeling material formulations further comprise components of additional, one or more curable systems, either in the same, and preferably, in different formulations.

Herein throughout, curable systems which comprise curable materials that are curable and/or polymerizable via a polymerization or curing reaction other than ROMP, are referred to herein also as non-ROMP curable systems. The components of such systems are also referred to herein as non-ROMP components, for example, non-ROMP curable materials, non-ROMP initiators, non-ROM-activators, and non-ROMP inducing condition (or condition for inducing non-ROMP polymerization and/or curing or for initiating a non-ROMP reaction).

In some of any of the embodiments described herein, a concentration of a curable material, including a ROMP monomer, in a modeling material formulation containing same ranges from about 50% to about 99% by weight of the total weight of the modeling material formulation, including any subranges and intermediate values therebetween.

In some of these embodiments, a modeling material formulation comprises a single curable material, at the indicted concentration range.

In some of these embodiments, a modeling material formulation comprises two or more curable materials, and the total concentration of curable materials ranges from about 50% to about 99% by weight of the total weight of the formulation.

In some of any of the embodiments described herein, a concentration of additional reactive components in a curable system as described herein, including, for example, a ROMP catalyst, a ROMP activator, a non-ROMP initiator, a non-ROMP activator (or co-initiator), in a modeling material formulation containing same individually ranges (for each component) from about 0.001% to about 10%, or from about 0.01% to 5% by weight of the total weight of the modeling material formulation, including any subranges and intermediate values therebetween.

In some embodiments, a concentration of a ROMP catalyst (active or latent) or a ROMP pre-catalyst in a modeling material formulation containing same independently ranges from about 0.001% to about 1%, or from about 0.001% to about 0.1% by weight of the total weight of the modeling material formulation, including any subranges and intermediate values therebetween.

In some embodiments, a concentration of a ROMP inhibitor in a modeling material formulation containing same independently ranges from about 0.001% to about 1%, or from about 0.001% to about 0.1% by weight of the total weight of the modeling material formulation, including any subranges and intermediate values therebetween.

In some embodiments, a concentration of a ROMP activator (active or latent) in a modeling material formulation containing same independently ranges from about 0.001% to about 5%, or from about 0.001% to about 1% by weight of the total weight of the modeling material formulation, including any subranges and intermediate values there between. In some of these embodiments, a modeling material formulation comprises a single reactive component, at the indicted concentration range.

In some of these embodiments, a modeling material formulation comprises two or more curable materials reactive components, and the total concentration of the reactive components materials ranges from about 0.001% to about 10% by weight of the total weight of the formulation, including any subranges and intermediate values therebetween.

In some of any of the embodiments described herein, components which form a curable system as described herein are referred to as reactive components or materials, and curable components are referred to as reactive polymerizable components, materials, monomers, or groups, interchangeably.

In some of any of the embodiments described herein, a curable material can be a monofunctional curable material, which comprises one polymerizable group that participates in the polymerization or curing, or a bifunctional or multi-functional curable material, as defined herein.

Additional components included in the modeling material formulations as described herein, which do not undergo a polymerization and/or curing, are also referred to herein as non-reactive materials or components.

Non-ROMP curable systems according to some of the present embodiments, can be, for example, curable systems in which the non-ROMP curable material(s) undergo curing and/or polymerization via free radical polymerization. Such systems are also referred to herein as free-radical curable systems.

Any free-radical curable system that is usable in 3D inkjet printing processes and systems is contemplated by these embodiments.

In some embodiments, free-radical polymerizable (curable) components may include mono-functional and/or multi-functional acrylic and/or methacrylic monomers, acrylic and/or methacrylic oligomers, and any combination thereof. Other free-radical polymerizable compounds may include thiols, vinyl ethers and other components (monomers or oligomers) with a reactive double bond.

An acrylic or methacrylic oligomer can be, for example, a polyester of acrylic acid or methacrylic acid, oligomers of urethane acrylates and urethane methacrylates. Urethane-acrylates are manufactured from aliphatic or aromatic or cycloaliphatic diisocyanates or polyisocyanates and hydroxyl-containing acrylic acid esters. Oligomers may be mono-functional or multifunctional (for example, di-, tri-, tetra-functional, and others). An example is a urethane-acrylate oligomer marketed by IGM Resins BV (The Netherlands) under the trade name Photomer-6010.

An acrylic or metyhacrylic monomer can be, for example, an ester of acrylic acid or methacrylic acid. Monomers may be mono-functional or multifunctional (for example, di-, tri-, tetra-functional, and others). An example of an acrylic mono-functional monomer is phenoxyethyl acrylate, marketed by Sartomer Company (USA) under the trade name SR-339. An example of an acrylic di-functional monomer is propoxylated (2) neopentyl glycol diacrylate, marketed by Sartomer Company (USA) under the trade name SR-9003.

Either the monomer or the oligomer might be polyfunctional, and can be, for example, Ditrimethylolpropane Tetra-acrylate (DiTMPTTA), Pentaerythitol Tetra-acrylate (TETTA), Dipentaerythitol Penta-acrylate (DiPEP). Any other curable material that is polymerizable by free radical polymerization is contemplated.

In some embodiments, a free-radical polymerizable material is polymerizable or curable by exposure to radiation. Systems comprising such a material can be referred to as photo-polymerizable free-radical systems, or photoactivatable free-radical systems.

In some embodiments, a free-radical curable system further comprises a free radical initiator, which produces free radicals for initiating the polymerization and/or curing.

In some embodiments, a condition for initiating free-radical curing and/or polymerization comprises is a condition that induced free radical generation by the initiator. The initiator in such cases is a latent initiator, which produces free radicals when exposed to the condition.

In some embodiments, the initiator is a free-radical photoinitiator, which produces free radicals when being exposed to radiation.

In some of any of the embodiments described herein for free-radical curable systems, the radiation is UV radiation, and the system is a UV-curable system.

A free-radical photoinitiator may be any compound that produces a free radical on exposure to radiation such as ultraviolet or visible radiation and thereby initiates a polymerization reaction. Non-limiting examples of suitable photoinitiators include benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BAPO's); benzoins and bezoin alkyl ethers such as benzoin, benzoin methyl ether and benzoin isopropyl ether and the like. Examples of photoinitiators are alpha-amino ketone, and bisacylphosphine oxide (BAPO's). Additional exemplary free-radical photoinitiators are presented, for example in Tables 2, 3, 5 and 9.

A free-radical photo-initiator may be used alone or in combination with a co-initiator. Co-initiators are used with initiators that need a second molecule to produce a radical that is active in the photocurable free-radical systems. A co-initiator of a photoinitiator is also referred to herein as a non-ROMP activator. Benzophenone is an example of a photoinitiator that requires a second molecule, such as an amine, to produce a free radical. After absorbing radiation, benzophenone reacts with a ternary amine by hydrogen abstraction, to generate an alpha-amino radical which initiates polymerization of acrylates. Non-limiting example of a class of co-initiators are alkanolamines such as triethylamine, methyldiethanolamine and triethanolamine.

Representative examples of UV curable materials of a free-radical curable system include, but are not limited to, tricyclodecane dimethanol diacrylate SR 833S, Phenoxy ethyl Acrylate SR 339, Isobornyl acrylate SR 506D and etc. Other examples are provided in Table 2 herein.

In some of any of the embodiments described herein, one or more of the modeling material formulations containing a free-radical curable system comprises a radical inhibitor, for preventing or slowing down polymerization and/or curing prior to exposing to the curing condition.

In some of any of the embodiments described herein, the one or more additional curable systems is/are polymerizable or cured via cationic polymerization, and are referred to herein also as cationic polymerizable or cationic curable systems.

The curable components or materials of such systems undergo polymerization or curing via cationic polymerization.

Exemplary cationically polymerizable components include, but are not limited to, epoxy-containing materials (monomers or oligomers), caprolactams, caprolactones, oxetanes, and vinyl ethers (monomers or oligomers).

Non-limiting examples of epoxy-containing curable compounds include Bis-(3,4 cyclohexylmethyl) adipate, 3,4-epoxy cyclohexylmethyl-3,4-epoxycyclohexyl carboxylate, 1,2 epoxy-4-vinylcyclohexane, 1,2-epoxy hexadecane, 3,4-epoxy cyclohexylmethyl-3,4-epoxy cyclohexane carboxylate, which is available, for example, under the trade name UVACURE 1500 from Cytec Surface Specialties SA/NV (Belgium) and mono or multifunctional silicon epoxy resins such as PC 1000 which is available from Polyset Company (USA).

In some embodiments, a cationic polymerizable material is polymerizable or curable by exposure to radiation. Systems comprising such a material can be referred to as photo-polymerizable cationic systems, or photoactivatable cationic systems.

In some embodiments, a cationic curable system further comprises a cationic initiator, which produces cations for initiating the polymerization and/or curing.

In some embodiments, a condition for initiating cationic curing and/or polymerization comprises is a condition that induced cation generation by the initiator. The initiator in such cases is a latent initiator, which produces cations when exposed to the condition.

In some embodiments, the initiator is a cationic photoinitiator, which produces cations when exposed to radiation.

In some of any of the embodiments described herein for cationic curable systems, the radiation is UV radiation, and the system is a cationic UV-curable system.

Suitable cationic photoinitiators include, for example, compounds which form aprotic acids or Bronsted acids upon exposure to ultraviolet and/or visible light sufficient to initiate polymerization. The photoinitiator used may be a single compound, a mixture of two or more active compounds, or a combination of two or more different compounds, i.e. co-initiators. Non-limiting examples of suitable cationic photoinitiators include aryldiazonium salts, diaryliodonium salts, triarylsulphonium salts, triarylselenonium salts and the like. An exemplary cationic photoinitiator is a mixture of triarylsolfonium hexafluoroantimonate salts.

Non-limiting examples of suitable cationic photoinitiators include P-(octyloxyphenyl) phenyliodonium hexafluoroantimonate UVACURE 1600 from Cytec Company (USA), iodonium (4-methylphenyl)(4-(2-methylpropyl)phenyl)-hexafluorophosphate known as Irgacure 250 or Irgacure 270 available from Ciba Speciality Chemicals (Switzerland), mixed arylsulfonium hexafluoroantimonate salts known as UVI 6976 and 6992 available from Lambson Fine Chemicals (England), diaryliodonium hexafluoroantimonate known as PC 2506 available from Polyset Company (USA), (tolylcumyl) iodonium tetrakis (pentafluorophenyl) borate known as Rhodorsil® Photoinitiator 2074 available from Bluestar Silicones (USA), iodonium bis(4-dodecylphenyl)-(OC-6-11)-hexafluoro antimonate known as Tego PC 1466 from Evonik Industries AG (Germany). Exemplary cationic photoinitiators are also presented, for example, in Tables 2, 3, 5, and 9.

In some of any of the embodiments described herein, the non-ROMP curable system is any other system that is usable in 3D-printing processes and systems. Additional examples include, without limitation, systems based on polyurethane chemistry, in which isocyanate-containing compounds and hydroxyl-containing compounds (e.g., polyols) react via polycondensation in the presence of a catalyst and/or upon exposure to UV radiation,), thiol chemistry, in which mercaptopropionate-based curable materials polymerize when exposed to UV in the presence of a free-radical photoinitiator, and more.

In some of any of the embodiments described herein, the non-ROMP curable systems comprise a combination of two or more non-ROMP curable systems.

In some of any of the embodiments described herein, at least one, and preferably each, of the non-ROMP curable systems in the modeling material formulations described herein is activatable upon exposure to the same condition as does a ROMP system. That is, curing of all the curable systems is effected upon exposure to the same curing inducing condition, as described herein.

In some of these embodiments, the ROMP system is a photoactivatable system and the one or more non-ROMP curable systems are also photoactivatabe systems.

In some of these embodiments, the systems are UV-curable, that is, the condition inducing curing is effected by exposure to UV radiation, as described herein.

Photoactivatable ROMP systems are described herein.

Photoactivatable non-ROMP systems may include free radical photopolymerizable compounds (e.g., Tricyclodecane dimethanol diacrylate SR 833S, Phenoxy ethyl Acrylate SR 339, Isobornyl acrylate SR 506D and so on), and/or cationic polymerizable compounds (e.g., cycloaliphatic epoxide Uvacure 1500, epoxidized polybutadiene polyBD605E, limonene dioxide Celloxide 3000, Difunctional silicon-containing epoxy resin PC2000, etc.), optionally in combination with a free radical photoinitiator or a cationic photoinitiator, respectively, as described herein.

In some of any of the embodiments described herein, when a curable system is photoactivatable, a modeling material formulation can further comprise a photosensitizer.

In dual or multi-jetting methodologies, the photosensitizer can be included in a modeling material formulation that comprises a respective photocurable material (including a ROMP monomer) or in another formulation, that is devoid of the photocurable material. In some embodiments, the photosensitizer is included in a modeling material that is devoid of one or more of the components which are activatable by exposure to radiation. Such components include, for example, an active ROMP catalyst that is encapsulated by a photodegradable capsule, a latent ROMP catalyst that is photoactivatable, a latent activator that is photoactivatable, an activator that is encapsulated by a photodegradable capsule, a photoinitiator, as described herein, an initiator or co-initiator that in encapsulated in photodegradable capsule, and so forth.

Exemplary photosensitizers include, but are not limited to, 2-isopropylthioxanthone and 4-isopropylthioxanthone, marketed as SPEEDCURE ITX and referred to herein also as ITX, 9,10-Dibutoxy anthracene marketed as Anthracure® UVS-1331, Phenothiazine (253 and 318 nm), Anthracene, and a curcumin compound such as marketed as Ecocol curcumin colour 95%

Table 2 below presents a list of exemplary components which can be included, in any combination, in a UV-curable non-ROMP system as described herein in any one of the embodiments and any combinations thereof. In embodiments pertaining to a dual jetting methodology, the components can be included in one or more modeling material formulations, as described herein.

TABLE 2

| Trade Name | Chemical Type | Function | Supplier |
|---|---|---|---|
| SR423A | Isobornyl methacrylate | Free radical Oligomer | Sartomer |
| SR-843 | Tricyclodecane dimethanol dimethacrylate | Free radical Monomer | Sartomer |

TABLE 2-continued

| Trade Name | Chemical Type | Function | Supplier |
|---|---|---|---|
| SR -351 | Trimethylol propane triacrylate | Free radical bifunctional monomer (Cross-linker) | Sartomer |
| PHOTOMER 4028F | Bis Phenol A Ethoxylated Diacrylate | Free radical Acrylic oligomer (bifunctional) | Cognis |
| SR506D | Isobornyl acrylate | Free radical Acrylic oligomer | Sartomer |
| SR833S | Tricyclodecane dimethanol diacrylate | Free radical Acrylic oligomer | Sartomer |
| EBECRYL 350 | Silicon acrylated oligomer | Phase separation promoter | UCB Chemicals |
| UVCURE 1600 | P-(octyloxyphenyl) phenyliodonium hexafluoroantimonate | Cationic photoinitiator | CYTEC |
| IGRACURE I-651 | Alpha, alpha-dimethoxy alpha phenylacetophenone | Free radical photoinitiator | CIBA |
| Uvacure 1500 | Cycloaliphatic epoxide | Cationic monomer | Cytec |
| TPO | Diphenyl (2,4,6 trimethylbenzoyl) phosphine oxide | Free radical photoinitiator | BASF |
| BR 970 | Urethane diacrylate | Free radical Acrylic oligomer | IGM |
| SPEEDCURE ITX | 2-isopropylthioxanthone and 4-isopropylthioxanthone | Cationic photosensitizer | LAMBSON |
| BYK 3570 | Acrylfunctional polyester modified polydimethlsiloxane | Additive | BYK |
| CURCUMIN | 1,6-Heptadiene-3,5-dione, 1,7-bis(4-hydroxy-3-methoxyphenyl)- | Cationic photosensitizer | AXOWIN |
| DBS-C21 | Carbinol hydroxyterminated PDMS | Toughening agent | GELEST |

Additional Materials:

In some of any of the embodiments described herein, a modeling material formulation can further comprise one or more additional materials, which are referred to herein also as non-reactive materials.

Such agents include, for example, surface active agents, stabilizers, antioxidants, fillers, pigments, dispersants, and/or impact modifying agents (toughening agents or toughness modifiers).

In cases of multi-jetting methodologies, the non-reactive agents can be independently included in one or all of the modeling material formulations.

The term "filler" describes an inert material that modifies the properties of a polymeric material and/or adjusts a quality of the end products. The filler may be an inorganic particle, for example calcium carbonate, silica, and clay.

Fillers may be added to the modeling formulation in order to reduce shrinkage during polymerization or during cooling, for example, to reduce the coefficient of thermal expansion, increase strength, increase thermal stability, reduce cost and/or adopt rheological properties. Nanoparticles fillers are typically useful in applications requiring low viscosity such as ink-jet applications.

In some embodiments, a modeling formulation comprises a surface active agent. A surface-active agent may be used to reduce the surface tension of the formulation to the value required for jetting or for printing process, which is typically around 30 dyne/cm. An exemplary such agent is a silicone surface additive.

Suitable stabilizers (stabilizing agents) include, for example, thermal stabilizers, which stabilize the formulation at high temperatures.

In some embodiments, the modeling formulation comprises one or more pigments. In some embodiments, the pigment's concentration is lower than 35%, or lower than 25% or lower than 15%, by weight.

The pigment may be a white pigment. The pigment may be an organic pigment or an inorganic pigment, or a metal pigment or a combination thereof.

In some embodiments the modeling formulation further comprises a dye.

In some embodiments, combinations of white pigments and dyes are used to prepare colored cured materials.

The dye may be any of a broad class of solvent soluble dyes. Some non-limiting examples are azo dyes which are yellow, orange, brown and red; anthraquinone and triarylmethane dyes which are green and blue; and azine dye which is black.

In some of any of the embodiments described herein, one or more of the modeling material formulations comprises a toughening agent.

Non-limiting examples of toughening agents include elastomeric materials. Representative examples include, without limitation, natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, styrene-ethylene/butylene-styrene copolymer, styrene-ethylene/propylene-styrene copolymer, ethylene-propylene-diene terpolymers, ethylene-vinyl acetate and nitrile rubbers. Preferred agents are elastomers such as polybutadienes. Toughening agents such as elastomeric materials can be added to the formulation by incorporating in a modeling material formulation an elastomeric material in a dispersed/dissolved phase.

A concentration of elastomeric materials may range from about 0.10 phr to about 10 phr, or from about 0.1 phr to about 5 phr, relative to the weight of the formulation containing same.

A concentration of elastomeric materials may alternatively range from about 0.1% to about 20%, by weight, of the total weight of a formulation containing same.

Other impact modifying agents, such as, for example, carbon fibers, carbon nanotubes, glass fibers, aramid Keylar, polyparaphenylene benzobisoxazole Zylon, and other polar and non polar impact modifiers, are also contemplated.

Kits:

According to some of any of the embodiments described herein, there are provided kits containing modeling material formulations as described herein.

In some embodiments, a kit comprises a modeling material formulation for use in a single jetting single curing methodology, as described herein. The components of the modeling material formulations are packaged together in the kit and include a ROMP monomer or monomers, as described in any of the respective embodiments, a ROMP catalyst, which can be active or latent, or can be a system of a pre-catalyst and an activator (latent or active).

In some embodiments, and in accordance with any of the respective embodiments described herein for single jetting single curing approach, one or more of the components in the kit can be physically separated from the other components (e.g., encapsulated, as described herein).

In some embodiments, a kit comprises a modeling material formulation for use in a single jetting dual or multi-curing methodology, as described herein. The components of the modeling material formulations are packaged together in the kit and include a ROMP monomer or monomers, as described in any of the respective embodiments, a ROMP catalyst, which can be active or latent, or can be a system of a pre-catalyst and an activator (latent or active), and components of an additional curable system, as described herein in any of the respective embodiments.

In some embodiments, and in accordance with any of the respective embodiments described herein for multi jetting dual or multi-curing approach, one or more of the components in the kit can be physically separated from the other components (e.g., encapsulated, as described herein).

In some embodiments, a kit comprises a modeling material formulation for use in a single jetting dual or multi-curing methodology, as described herein. The components of each of the modeling material formulations are packaged individually in the kit and include a ROMP monomer or monomers, as described in any of the respective embodiments, a ROMP catalyst, which can be active or latent, or can be a system of a pre-catalyst and an activator (latent or active), divided in the formulations in accordance with any one of the respective embodiments.

In some embodiments, and in accordance with any of the respective embodiments described herein for single jetting dual or multi-curing approach, one or more of the components in one or more formulations can be physically separated from the other components (e.g., encapsulated, as described herein) in a respective formulation.

In some embodiments, a kit comprises a modeling material formulation for use in a dual or multi-jetting dual or multi-curing methodology, as described herein. The components of each of the modeling material formulations are packaged individually in the kit and include a ROMP monomer or monomers, as described in any of the respective embodiments, a ROMP catalyst, which can be active or latent, or can be a system of a pre-catalyst and an activator (latent or active), and components of one or more additional curable systems, as described herein in any of the respective embodiments.

In some embodiments, and in accordance with any of the respective embodiments described herein for dual or multi-jetting dual or multi-curing approach, one or more of the components in one or more formulations can be physically separated from the other components (e.g., encapsulated, as described herein). in a respective formulation The Object:

According to an aspect of some embodiments of the present invention there is provided three-dimensional object which comprises a polymeric material obtainable by ROMP of respective ROMP monomer or combination of ROMP monomers. In some embodiments, the 3D object further comprises In some of these embodiments, the 3D object is obtainable by 3D inkjet printing.

According to an aspect of some embodiments of the present invention there is provided a three-dimensional object fabricated by a 3D inkjet printing process, which is characterized by an impact resistance of at least 80 J/m.

In some embodiments, the object is characterized by an impact resistance of at least 100, at least 150, at least 180, at least 200 J/m, and even higher impact resistance Herein throughout and in the art, the phrase “impact resistance”, which is also referred to interchangeably, herein and in the art, as “impact strength” or simply as “impact”, describes the resistance of a material to fracture by a mechanical impact, and is expressed in terms of the amount of energy absorbed by the material before complete fracture. Impact resistance can be measured using, for example, the ASTM D256-06 standard Izod impact testing (also known as “Izod notched impact”, or as “Izod impact”), and/or as described hereinunder, and is expressed as J/m.

In some embodiments, the object is characterized by heat deflection temperature (HDT) which is at least 50, at least 60, at least 60, at least 70, and even at least 80° C.

Herein throughout and in the art, the phrase “heat deflection temperature”, or HDT, describes the temperature at which a specimen of cured material deforms under a specified load. Determination of HDT can be performed using the procedure outlined in ASTM D648-06/D648-07 and/or as described hereinunder.

The fabrication of 3D objects by a 3D inkjet printing process is enabled by the use of ROMP systems, as described herein.

Molds:

According to some of any of the embodiments described herein, a method of fabricating a 3D object as described herein in any of the respective embodiments can be utilized for preparing a 3D-printed (e.g., 3D-inkjet printed) mold.

A mold as described herein can be used, for example, in reactive injection molding, or in any other molding techniques used for fabricating three-dimensional objects.

According to an aspect of some embodiments of the present invention there is provided a method of fabricating a three-dimensional object, the method comprising:

sequentially forming a plurality of layers in a configured pattern corresponding to a shape of a mold (e.g., having an inner surface shaped in accordance with an outer surface of the three-dimensional object); and introducing into the mold a molding composition which comprises an unsaturated cyclic monomer polymerizable by ROMP and a catalyst for initiating ROMP of the monomer, thereby fabricating the three-dimensional object.

In some of these embodiments, the molding composition comprises a ROMP system as described in any of the respective embodiments described herein for single jetting single curing, excluding embodiments in which one or more of the components is physically separated in the formulation.

In some embodiment, the method further comprises exposing the mold to a condition for inducing initiation of ROMP of the monomer by the catalyst. Such a condition can include a condition for activating a latent catalyst, or a condition for activating a latent activator, or any other condition for promoting the ROMP.

In some embodiments, the formation of each of the layers forming the mold comprises dispensing by at least one inkjet printing head at least one modeling material formulation.

In some of these embodiments, the modeling material formulation(s) comprise a non-ROMP curable system as described herein in any of the respective embodiments. In some embodiments, the non-ROMP curable system is a UV-curable non-ROMP system, as described herein in any of the respective embodiments.

Figure 2:
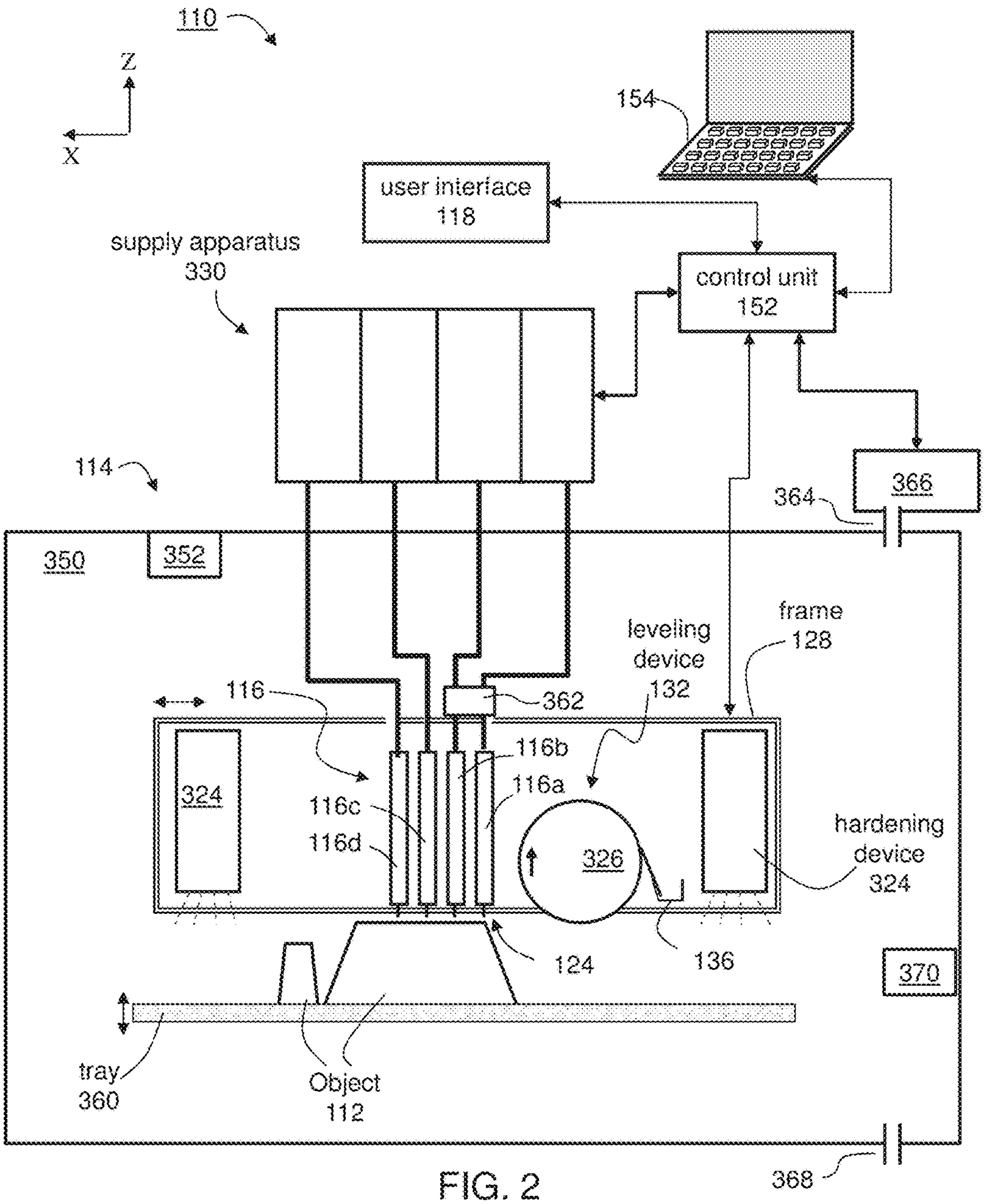
FIG. 2 is a schematic illustration of a system suitable for 3D inkjet printing of an object according to some embodiments of the present invention.
Figure 3A:
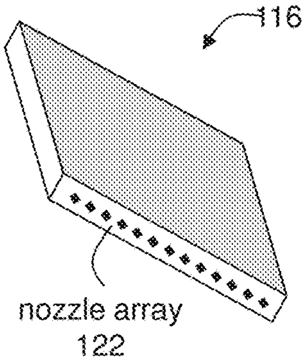
FIG. 3A-C are schematic illustrations of printing heads according to some embodiments of the present invention.
Figure 3B:
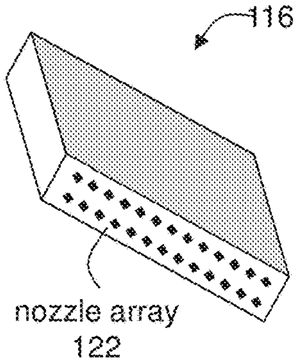
Figure 3C:
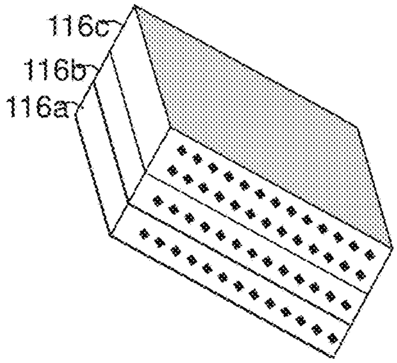

The Printing System:

FIG. 2 is a schematic illustration of a system 110 suitable for 3D inkjet printing of an object 112 according to some embodiments of the present invention. System 110 comprises a printing apparatus 114 having a printing unit 116 which comprises a plurality of printing heads. Each head preferably comprises an array of one or more nozzles 122, as illustrated in FIG. 3A-C described below, through which a liquid (uncured) building material 124 is dispensed. Preferably, apparatus 114 is a three-dimensional inkjet printing apparatus. FIG. 3A-B illustrate a printing head 116 with one (FIG. 3A) and two (FIG. 3B) nozzle arrays 22. The nozzles in the array are preferably aligned linearly, along a straight line. In embodiments in which a particular printing head has two or more linear nozzle arrays, the nozzle arrays are optionally and preferably can be parallel to each other. In some embodiments, two or more printing heads can be assembled to a block of printing heads, in which case the printing heads of the block are typically parallel to each other. A block including several inkjet printing heads 116*a*, 116*b*, 116*c* is illustrated in FIG. 3C. Printing heads 116 are optionally and preferably oriented along the indexing direction with their positions along the scanning direction being offset to one another.

Each printing head is optionally and preferably fed via a building material reservoir which may optionally include a temperature control unit (e.g., a temperature sensor and/or a heating device), and a material level sensor. To dispense the building material, a voltage signal is applied to the printing heads to selectively deposit droplets of material via the printing head nozzles, for example, as in piezoelectric inkjet printing technology. The dispensing rate of each head depends on the number of nozzles, the type of nozzles and the applied voltage signal rate (frequency). Such printing heads are known to those skilled in the art of solid freeform fabrication.

Preferably, but not obligatorily, the overall number of printing nozzles or nozzle arrays is selected such that half of the printing nozzles are designated to dispense support material formulation(s) and half of the printing nozzles are designated to dispense modeling material formulation(s), i.e. the number of nozzles jetting modeling material formulations is the same as the number of nozzles jetting support material formulations. In the representative example of FIG. 2, four printing heads 116*a*, 116*b*, 116*c* and 116*d* are illustrated. Each of heads 116*a*, 116*b*, 116*c* and 116*d* has a nozzle array. In this Example, heads 116*a* and 116*b* can be designated for modeling material/s and heads 116*c* and 116*d* can be designated for support material. Thus, head 116*a* can dispense a first modeling material formulation, head 116*b* can dispense a second modeling material formulation and heads 116*c* and 116*d* can both dispense a support material formulation. In an alternative embodiment, heads 116*c* and 116*d*, for example, may be combined in a single head having two nozzle arrays for depositing a support material formulation.

Yet it is to be understood that it is not intended to limit the scope of the present invention and that the number of modeling material formulations depositing heads (modeling heads) and the number of support material depositing heads (support heads) may differ. Generally, the number of modeling heads, the number of support heads and the number of nozzles in each respective head or head array are selected such as to provide a predetermined ratio, a, between the maximal dispensing rate of the support material and the maximal dispensing rate of modeling material. The value of the predetermined ratio, a, is preferably selected to ensure that in each formed layer, the height of modeling material equals the height of support material. Typical values for a are from about 0.6 to about 1.5.

For example, for $\alpha=1$, the overall dispensing rate of support material is generally the same as the overall dispensing rate of the modeling material when all modeling heads and support heads operate.

In a preferred embodiment, there are M modeling heads each having m arrays of p nozzles, and S support heads each having s arrays of q nozzles such that $M\times m\times p=S\times s\times q$. Each of the $M\times m$ modeling arrays and $S\times s$ support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

Apparatus 114 can further comprise a hardening device 324 which can include any device configured to emit light, heat or any other curing energy that may cause the deposited material to hardened. For example, hardening device 324 can comprise one or more radiation sources, which can be, for example, an infrared lamp or any other source emitting heat-inducing radiation, as further detailed hereinabove, a UV radiation source. In some embodiments of the present invention, hardening device 324 serves for applying a curing condition to the modeling material.

The printing head and radiation source are preferably mounted in a frame or block 128 which is preferably operative to reciprocally move over a tray 360, which serves as the working surface. Apparatus 114 can further comprise a tray heater 328 configured for heating the tray. These embodiments are particularly useful when the modeling material is hardened by heating (exposure to heat).

In some embodiments of the present invention the radiation sources are mounted in the block such that they follow in the wake of the printing heads to at least partially cure or solidify the materials just dispensed by the printing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward.

In various exemplary embodiments of the invention, apparatus 114 further comprises one or more leveling devices 132. Leveling device 132 serves to straighten, level and/or establish a thickness of the newly formed layer prior to the formation of the successive layer thereon. Leveling device 132 can comprise one or more rollers 326. Rollers 326 can has a generally smooth surface or it can has a patterned surface. In some embodiments of the present invention one or more of the layers is straightened while the formulation within the layer is at a cured or partially cured state. In these embodiments, leveling device 132 is capable of deforming the solidified portion of the formulation. For example, when leveling device 132 comprises one or more rollers at least one of these rollers is capable of milling, grinding and/or flaking the solidified portion of the formulation. Preferably, in these embodiments, the roller has a non-smooth surface so as to facilitate the milling, grinding and/or flaking. For example, the surface of the roller can be patterned with blades and/or have a shape of an auger.

In some embodiments of the present invention one or more of the layers is straightened while the formulation within the layer is uncured. In these embodiments, leveling device 132 can comprise a roller or a blade, which is optionally and preferably, but not necessarily, incapable of effecting milling, grinding and/or flaking.

Figure 4:
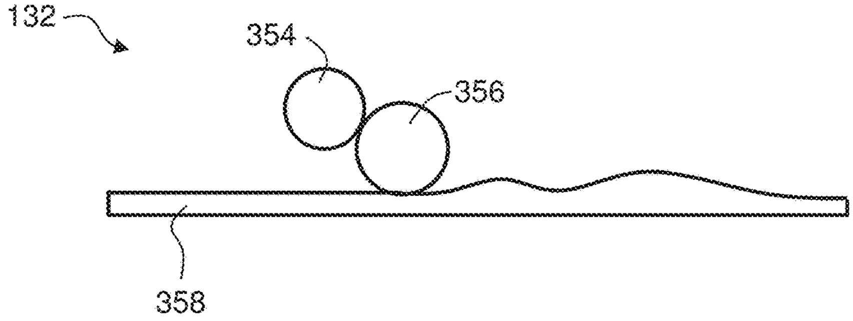
FIG. 4 is a schematic illustration of a self-cleaning leveling device, according to some embodiments of the present invention.

Leveling device 132 preferably comprises a waste collection device 136 for collecting the excess material generated during leveling. Waste collection device 136 may comprise any mechanism that delivers the material to a waste tank or waste cartridge. Optionally, Leveling device 132 is a self-cleaning leveling device, wherein cured or partially cured formulation is periodically removed from leveling device 132. A representative Example of a self-cleaning leveling device is illustrated in FIG. 4. Shown in FIG. 4 is a double roller having a first roller 356 that contacts and straightens a layer 358 and a second roller 354 that is in contact with the first roller 356 but not with the layer 358 and which is configured to remove the formulation from the first roller 358. When first roller 356 has a non-smooth surface, second roller 354 preferably is also non-smoothed wherein the pattern formed on the surface of roller 354 is complementary to the pattern formed on the surface of roller 356, so as to allow roller 354 to clean the surface of roller 358.

Apparatus 114 can also comprise a chamber 350 enclosing at least heads 116 and tray 360, but may also enclose other components of system 110, such as, but not limited to, devices 132 and 324, frame 128 and the like. In some embodiments of the present invention apparatus 114 comprises a chamber heater 352 that heats the interior of chamber 350 as further detailed hereinabove. Chamber 350 is preferably generally sealed to an environment outside chamber 350.

In some embodiments of the present invention chamber 350 comprises a gas inlet 364 and the system comprises a gas source 366 configured for filling said chamber by an inert gas through gas inlet 364. Gas source 366 can be a container filled with the inert gas. The gas can be any of the inert gases described above. Optionally, chamber 350 is also formed with a gas outlet 368 for allowing the gas to exit chamber 350 if desired. Both inlet 366 and outlet 368 are of the present embodiments provided with valves (not shown) so as to controllably allow entry and/or exit of the gas to and from chamber 350. Preferably, controller 152 generates, continuously or intermittently, inflow and outflow of the inert gas through gas inlet 366 and gas outlet 368. This can be achieved by configuring controller 152 to control at least one of source 366, inlet 364 and outlet 368. Optionally, system 110 comprises a gas flow generating device 370, placed within chamber 350 and configured for generating a flow of the inert gas within chamber 350. Device 370 can be a fan or a blower. Controller 152 can be configured for controlling also device 370, for example, based on a predetermined printing protocol.

In some embodiments of the present invention apparatus 114 comprises a mixing chamber 362 for preparing the modeling material formulation prior to entry of the modeling material formulation into a respective head. In the schematic illustration of FIG. 2, which is not to be considered as limiting, chamber 362 receives materials from different containers, mixes the received materials and introduces the mix to two heads (heads 116*b* and 116*a*, in the present example). However, this need not necessarily be the case since in some embodiments chamber 362 can receive materials from different containers, mixes the received materials and introduces the mix only to more than two heads of only to one head. Preferably, the position and fluid communication between mixing chamber 362 and respective head is selected such that at least 80% or at least 85% or at least 90% or at least 95% or at least 99% or the modeling material formulation that enters the respective head or heads (e.g., heads 116*b* and 116*a* in the present example) remains uncured. For example, chamber 362 can be attached directly to the printing head or the printing block, such that motion of the printing head is accompanied by motion of the mixing chamber. These embodiments are particularly useful when the formulation undergoes fast polymerization reaction even in the absence of curing radiation.

In use, the dispensing heads of unit 116 move in a scanning direction, which is referred to herein as the X direction, and selectively dispense building material in a predetermined configuration in the course of their passage over tray 360. The building material typically comprises one or more types of support material and one or more types of modeling material. The passage of the dispensing heads of unit 116 is followed by the curing of the modeling material(s) by radiation source 126. In the reverse passage of the heads, back to their starting point for the layer just deposited, an additional dispensing of building material may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 116, within the layer. Such Z displacement is carried out in order to cause contact of the leveling device with the surface in one direction and prevent contact in the other direction.

System 110 optionally and preferably comprises a building material supply system 330 which comprises the building material containers or cartridges and supplies a plurality of building materials to fabrication apparatus 114.

A control unit 340 controls fabrication apparatus 114 and optionally and preferably also supply system 330. Control unit 340 typically includes an electronic circuit configured to perform the controlling operations. Control unit 340 preferably communicates with a data processor 154 which transmits digital data pertaining to fabrication instructions based on computer object data, e.g., a CAD configuration represented on a computer readable medium in a form of, for example, a Standard Tessellation Language (STL) format Standard Tessellation Language (STL), StereoLithography Contour (SLC) format, Virtual Reality Modeling Language (VRML), Additive Manufacturing File (AMF) format, Drawing Exchange Format (DXF), Polygon File Format (PLY) or any other format suitable for CAD. Typically, control unit 340 controls the voltage applied to each printing head or nozzle array and the temperature of the building material in the respective printing head.

Once the manufacturing data is loaded to control unit 340 it can operate without user intervention. In some embodiments, control unit 340 receives additional input from the operator, e.g., using data processor 154 or using a user interface 118 communicating with unit 340. User interface 118 can be of any type known in the art, such as, but not limited to, a keyboard, a touch screen and the like. For example, control unit 340 can receive, as additional input, one or more building material types and/or attributes, such as, but not limited to, color, characteristic distortion and/or transition temperature, viscosity, electrical property, magnetic property. Other attributes and groups of attributes are also contemplated.

It is expected that during the life of a patent maturing from this application many relevant components of a ROMP system as described herein will be developed and the scope of the terms ROMP monomer, ROMP catalyst, ROMP activator, ROMP pre-catalyst, is intended to include all such new technologies a priori.

It is expected that during the life of a patent maturing from this application many relevant degradable capsules and other technologies for physically separating components in a modeling material formulation as described herein will be developed and the scope of the terms physical separation and degradable capsule, is intended to include all such new technologies a priori.

As used herein the term "about" refers to ±10% or ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Herein throughout, the phrase "linking moiety" or "linking group" describes a group that connects two or more moieties or groups in a compound. A linking moiety is typically derived from a bi- or tri-functional compound, and can be regarded as a bi- or tri-radical moiety, which is connected to two or three other moieties, via two or three atoms thereof, respectively.

Exemplary linking moieties include a hydrocarbon moiety or chain, optionally interrupted by one or more heteroatoms, as defined herein, and/or any of the chemical groups listed below, when defined as linking groups.

When a chemical group is referred to herein as "end group" it is to be interpreted as a substituent, which is connected to another group via one atom thereof.

Herein throughout, the term "hydrocarbon" collectively describes a chemical group composed mainly of carbon and hydrogen atoms. A hydrocarbon can be comprised of alkyl, alkene, alkyne, aryl, and/or cycloalkyl, each can be substituted or unsubstituted, and can be interrupted by one or more heteroatoms. The number of carbon atoms can range from 2 to 20, and is preferably lower, e.g., from 1 to 10, or from 1 to 6, or from 1 to 4. A hydrocarbon can be a linking group or an end group.

Bisphenol A is An example of a hydrocarbon comprised of 2 aryl groups and one alkyl group.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR— group in cases where the amine is a linking group or is or part of a linking moiety.

The term "alkyl" describes a saturated aliphatic hydrocarbon including straight chain and branched chain groups. Preferably, the alkyl group has 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. More preferably, the alkyl is a medium size alkyl having 1 to 10 carbon atoms. Most preferably, unless otherwise indicated, the alkyl is a lower alkyl having 1 to 4 carbon atoms (C(1-4) alkyl). The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Alkene (or alkenyl) and Alkyne (or alkynyl), as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofuran, tetrahydropyrane, morpholino, oxalidine, and the like. The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide" and "halo" describes fluorine, chlorine, bromine or iodine.

The term "haloalkyl" describes an alkyl group as defined above, further substituted by one or more halide.

The term "sulfate" describes a $—O—S(=O)_2—OR'$ end group, as this term is defined hereinabove, or an $—O—S(=O)_2—O—$ linking group, as these phrases are defined hereinabove, where R' is as defined hereinabove.

The term "thiosulfate" describes a —O—S(═S)(═O)—OR' end group or a —O—S(═S)(═O)—O— linking group, as these phrases are defined hereinabove, where R' is as defined hereinabove.

The term "sulfite" describes an —O—S(═O)—O—R' end group or a —O—S(═O)—O— group linking group, as these phrases are defined hereinabove, where R' is as defined hereinabove.

The term "thiosulfite" describes a —O—S(═S)—O—R' end group or an —O—S(═S)—O— group linking group, as these phrases are defined hereinabove, where R' is as defined hereinabove.

The term "sulfinate" describes a —S(═O)—OR' end group or an —S(═O)—O— group linking group, as these phrases are defined hereinabove, where R' is as defined hereinabove.

The term "sulfoxide" or "sulfinyl" describes a —S(═O)R' end group or an —S(═O)— linking group, as these phrases are defined hereinabove, where R' is as defined hereinabove.

The term "sulfonate" describes a —S(═O)$_2$—R' end group or an —S(═O)$_2$-linking group, as these phrases are defined hereinabove, where R' is as defined herein.

The term "S-sulfonamide" describes a —S(═O)$_2$—NR'R" end group or a —S(═O)$_2$—NR'— linking group, as these phrases are defined hereinabove, with R' and R" as defined herein.

The term "N-sulfonamide" describes an R'S(═O)$_2$—NR"— end group or a —S(═O)$_2$—NR'— linking group, as these phrases are defined hereinabove, where R' and R" are as defined herein.

The term "disulfide" refers to a —S—SR' end group or a —S—S-linking group, as these phrases are defined hereinabove, where R' is as defined herein.

The term "oxo" as used herein, describes a (═O) group, wherein an oxygen atom is linked by a double bond to the atom (e.g., carbon atom) at the indicated position.

The term "thiooxo" as used herein, describes a (═S) group, wherein a sulfur atom is linked by a double bond to the atom (e.g., carbon atom) at the indicated position.

The term "oxime" describes a ═N—OH end group or a ═N—O-linking group, as these phrases are defined hereinabove.

The term "hydroxyl" describes a —OH group.

The term "alkoxy" describes both an —O-alkyl and an —O-cycloalkyl group, as defined herein.

The term "aryloxy" describes both an —O-aryl and an —O-heteroaryl group, as defined herein.

The term "thiohydroxy" describes a —SH group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "cyanurate" describes a

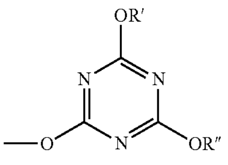

end group or

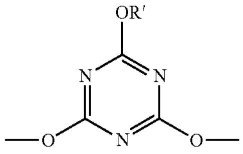

linking group, with R' and R" as defined herein.

The term "isocyanurate" describes a

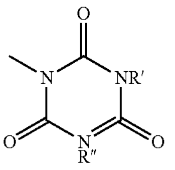

end group or

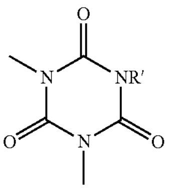

a linking group, with R' and R" as defined herein.

The term "thiocyanurate" describes a

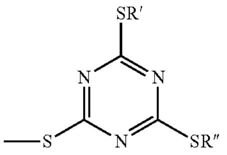

end group or

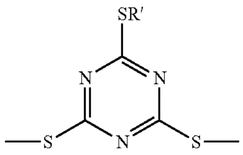

linking group, with R' and R" as defined herein.

The term "isocyanate" describes an —N═C═O group.

The term "isothiocyanate" describes an —N═C═S group.

The term "nitro" describes an —NO$_2$ group.

The term "acyl halide" describes a —(C═O)R"" group wherein R"" is halide, as defined hereinabove.

The term "azo" or "diazo" describes an —N═NR' end group or an —N═N-linking group, as these phrases are defined hereinabove, with R' as defined hereinabove.

The term "peroxo" describes an —O—OR' end group or an —O—O— linking group, as these phrases are defined hereinabove, with R' as defined hereinabove.

The term “carboxylate” as used herein encompasses C-carboxylate and O-carboxylate.

The term “C-carboxylate” describes a —C(═O)—OR' end group or a —C(═O)—O-linking group, as these phrases are defined hereinabove, where R' is as defined herein.

The term “O-carboxylate” describes a —OC(═O)R' end group or a —OC(═O)-linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term “thiocarboxylate” as used herein encompasses C-thiocarboxylate and O-thiocarboxylate.

The term “C-thiocarboxylate” describes a —C(═S)—OR' end group or a —C(═S)—O-linking group, as these phrases are defined hereinabove, where R' is as defined herein.

The term “O-thiocarboxylate” describes a —OC(═S)R' end group or a —OC(═S)-linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term “carbamate” as used herein encompasses N-carbamate and O-carbamate.

The term “N-carbamate” describes an R"OC(═O)—NR'-end group or a —OC(═O)—NR'-linking group, as these phrases are defined hereinabove, with R' and R" as defined herein.

The term “O-carbamate” describes an —OC(═O)—NR'R" end group or an —OC(═O)—NR'-linking group, as these phrases are defined hereinabove, with R' and R" as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term “carbamate” as used herein encompasses N-carbamate and O-carbamate. The term “thiocarbamate” as used herein encompasses N-thiocarbamate and O-thiocarbamate.

The term “O-thiocarbamate” describes a —OC(═S)—NR'R" end group or a —OC(═S)—NR'-linking group, as these phrases are defined hereinabove, with R' and R" as defined herein.

The term “N-thiocarbamate” describes an R"OC(═S)NR'-end group or a —OC(═S)NR'-linking group, as these phrases are defined hereinabove, with R' and R" as defined herein.

Thiocarbamates can be linear or cyclic, as described herein for carbamates.

The term “dithiocarbamate” as used herein encompasses S-dithiocarbamate and N-dithiocarbamate.

The term “S-dithiocarbamate” describes a —SC(═S)—NR'R" end group or a —SC(═S)NR'-linking group, as these phrases are defined hereinabove, with R' and R" as defined herein.

The term “N-dithiocarbamate” describes an R"SC(═S)NR'-end group or a —SC(═S)NR'-linking group, as these phrases are defined hereinabove, with R' and R" as defined herein.

The term “urea”, which is also referred to herein as “ureido”, describes a —NR'C(═O)—NR"R'" end group or a —NR'C(═O)—NR"-linking group, as these phrases are defined hereinabove, where R' and R" are as defined herein and R'" is as defined herein for R' and R".

The term “thiourea”, which is also referred to herein as “thioureido”, describes a —NR'—C(═S)—NR"R'" end group or a —NR'—C(═S)—NR"-linking group, with R', R" and R'" as defined herein.

The term “amide” as used herein encompasses C-amide and N-amide.

The term “C-amide” describes a —C(═O)—NR'R" end group or a —C(═O)—NR'-linking group, as these phrases are defined hereinabove, where R' and R" are as defined herein.

The term “N-amide” describes a R'C(═O)—NR"-end group or a R'C(═O)—N-linking group, as these phrases are defined hereinabove, where R' and R" are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term “guanyl” describes a R'R"NC(═N)-end group or a —R'NC(═N)-linking group, as these phrases are defined hereinabove, where R' and R" are as defined herein.

The term “guanidine” describes a —R'NC(═N)—NR"R'" end group or a —R'NC(═N)—NR"-linking group, as these phrases are defined hereinabove, where R', R" and R'" are as defined herein.

The term “hydrazine” describes a —NR'—NR"R'" end group or a —NR'—NR"-linking group, as these phrases are defined hereinabove, with R', R", and R'" as defined herein.

As used herein, the term “hydrazide” describes a —C(═O)—NR'—NR"R'" end group or a —C(═O)—NR'—NR"-linking group, as these phrases are defined hereinabove, where R', R" and R'" are as defined herein.

As used herein, the term “thiohydrazide” describes a —C(═S)—NR'—NR"R'" end group or a —C(═S)—NR'—NR"-linking group, as these phrases are defined hereinabove, where R', R" and R'" are as defined herein.

As used herein, the term “alkylene glycol” describes a $—O—[(CR'R")_z—O]_y—R'"$ end group or a $—O—[(CR'R")_z—O]_y$-linking group, with R', R" and R'" being as defined herein, and with z being an integer of from 1 to 10, preferably, 2-6, more preferably 2 or 3, and y being an integer of 1 or more. Preferably R' and R" are both hydrogen. When z is 2 and y is 1, this group is ethylene glycol. When z is 3 and y is 1, this group is propylene glycol.

When y is greater than 4, the alkylene glycol is referred to herein as poly(alkylene glycol). In some embodiments of the present invention, a poly(alkylene glycol) group or moiety can have from 10 to 200 repeating alkyelene glycol units, such that z is 10 to 200, preferably 10-100, more preferably 10-50.

The term “silyl” describes a —SiR'R"R'" end group or a —SiR'R"-linking group, as these phrases are defined hereinabove, whereby each of R', R" and R'" are as defined herein.

The term “siloxy” describes a —Si(OR')R"R'" end group or a —Si(OR')R"-linking group, as these phrases are defined hereinabove, whereby each of R', R" and R'" are as defined herein.

The term “silaza” describes a —Si(NR'R")R'" end group or a —Si(NR'R")-linking group, as these phrases are defined hereinabove, whereby each of R', R" and R'" is as defined herein.

The term “silicate” describes a —O—Si(OR')(OR")(OR'") end group or a —O—Si(OR')(OR")-linking group, as these phrases are defined hereinabove, with R', R" and R'" as defined herein.

The term “boryl” describes a —BR'R" end group or a —BR'-linking group, as these phrases are defined hereinabove, with R' and R" are as defined herein.

The term “borate” describes a —O—B(OR')(OR") end group or a —O—B(OR')(O—) linking group, as these phrases are defined hereinabove, with R' and R" are as defined herein.

As used herein, the term “epoxide” describes a

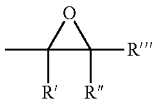

end group or a

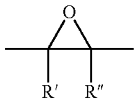

linking group, as these phrases are defined hereinabove, where R', R" and R'" are as defined herein.

As used herein, the term “methyleneamine” describes an —NR'—$CH_2$—CH═CR"R'" end group or a —NR'—$CH_2$—CH═CR"-linking group, as these phrases are defined hereinabove, where R', R" and R'" are as defined herein.

The term “phosphonate” describes a —P(═O)(OR')(OR") end group or a —P(═O)(OR')(O)-linking group, as these phrases are defined hereinabove, with R' and R" as defined herein.

The term “thiophosphonate” describes a —P(═S)(OR')(OR") end group or a —P(═S)(OR')(O)-linking group, as these phrases are defined hereinabove, with R' and R" as defined herein.

The term “phosphinyl” describes a —PR'R" end group or a —PR'-linking group, as these phrases are defined hereinabove, with R' and R" as defined hereinabove.

The term “phosphine oxide” describes a —P(═O)(R')(R") end group or a —P(═O)(R')-linking group, as these phrases are defined hereinabove, with R' and R" as defined herein.

The term “phosphine sulfide” describes a —P(═S)(R')(R") end group or a —P(═S)(R')-linking group, as these phrases are defined hereinabove, with R' and R" as defined herein.

The term “phosphite” describes an —O—PR'(═O)(OR") end group or an —O—PH(═O)(O)-linking group, as these phrases are defined hereinabove, with R' and R" as defined herein.

The term “carbonyl” or “carbonate” as used herein, describes a —C(═O)—R' end group or a —C(═O)-linking group, as these phrases are defined hereinabove, with R' as defined herein. This term encompasses ketones and aldehydes.

The term “thiocarbonyl” as used herein, describes a —C(═S)—R' end group or a —C(═S)-linking group, as these phrases are defined hereinabove, with R' as defined herein.

The term “oxime” describes a ═N—OH end group or a ═N—O-linking group, as these phrases are defined hereinabove.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Experimental Methods

Thermo-mechanical properties of the polymerized material were determined by measuring the impact strength and HDT according to respective ASTM procedures, as follows:

The impact strength of polymerized (cured) materials was measured by a Resil 5.5 J type instrument (CEAST Series, Instron® (USA)) using an Izod impact test (notched Izod) according to the ASTM International organization D-256 standard.

The Heat deflection temperature (HDT) of the samples was determined according to the ASTM International organization D-648 standard using a HDT 3 VICAT instrument (CEAST Series, Instron® (USA)).

Example 1

Single Jetting and Single or Dual Curing

Table 3 below presents exemplary components usable in a single jetting methodology according to some embodiments of the present invention. Dual curing can be selected by including in the formulation monomers other than ROMP monomers or by including one or more of the dual-curing ROMP-UV monomers (as shaded in grey in Table 3). Single curing includes only ROMP monomers, in any combination.

TABLE 3

| Trade Name | Chemical Type | Function | Optional Supplier |
|---|---|---|---|
| ULTRENE ™ 99 DCPD | Dicyclopentadiene | ROMP bifunctional Monomer (Cross-linker) | Cymetech |
| ULTRENE ™ 99-X DCPD (X = 6-20%) | Cyclopentadiene trimer in dicyclopentadiene | ROMP bifunctional Monomer (Cross-linker) | Cymetech |

TABLE 3-continued

| Trade Name | Chemical Type | Function | Optional Supplier |
|---|---|---|---|
| Cyclopentadiene trimer | Cyclopentadiene trimer | ROMP bifunctional Monomer (Cross-linker) | Sinosteel Anshan Research Institute of thermo-energy |
| Cyclooctene | Cyclooctene | ROMP Monomer | Sigma Aldrich |
| Cyclooctadiene | Cyclooctadiene | ROMP Monomer | Sigma Aldrich |
| Norbornene | | ROMP Monomer | |
| Cyclododecatriene | Cyclododecatriene | ROMP Monomer | BASF |
| FA-512AS | Dicyclopentadienyloxyethyl-acrylate | ROMP-UV dual-curing monomer | Hitachi chemicals |
| FA-511AS | Dicyclopentadieny acrylate | ROMP-UV dual-curing monomer | Hitachi chemicals |
| Kraton no. 1102 | Styrene-butadiene-styrene rubber | rubber | GLS |
| Trilene | Liquid EPDM | rubber | Lion copolymers |
| RICON | Epoxydized poly butadiene | rubber | Cray Valley |
| | Polybutadiene | rubber | Lanexss |
| Vistalon | Ethylene propylene diene (EPDM) rubber | rubber | ExonMobile chemicals |
| PolyBD 605E | Epoxidized hydroxyl terminated polybutadiene resin | Epoxy polymer (multifunctional; cross-linker) | Cray Valley |
| SR 833S | Cycloaliphatic diacrylate | Acrylate monomer (bifuncational; cross-linker) | Sartomer |
| SR 423 | IBOMA | Methacrylate monomer | Sartomer |
| Exact plastomers | | Rubber-plastic | ExonMobile chemicals |
| Ethanox 702 | 4,4'-Methylenebis(2,6-di-tert-butylphenol) | antioxidant | Albemarle |
| Grubbs 1$^{st}$ generation catalyst | Benzylidene-bis(tricyclohexylphosphine)-dichlororuthenium | ROMP catalyst | Materia |
| Grubbs 2$^{st}$ generation catalysts | [1,3-bis-(2,4,6-trimethylphenyl)-2-imidazolidinylidene]dichloro (phenylmethylene)(tricyclo-hexylphosphine)ruthenium | ROMP catalyst | Materia |
| Hoveyda-Grubbs 1$^{st}$ Generation Catalyst | Dichloro(o-isopropoxyphenyl methylene)(tricyclohexyl-phosphine)ruthenium(II) | ROMP catalyst | Materia |
| Hoveyda-Grubbs 2$^{nd}$ Generation Catalyst | [1,3-Bis-(2,4,6-trimethylphenyl)-2-imidazolidinylidene]dichloro (oisopropoxyphenylmeth-ylene)ruthenium | ROMP catalyst | Materia |
| Umicore 41 | [1,3-Bis(mesityl)-2-imidazolidinyl-idene]-[2-[[(4-methylphenyl)imino] methyl]-4-nitro-phenolyl]-[3-phenyl-indenylidene] (chloro)ruthenium(II) | ROMP catalyst | Umicore |
| Umicore 42 | [1,3-Bis(mesityl)-2-imidazolidinylidene]-[2-[[(2-methylphenyl)imino]methyl]-phenolyl]-[3-phenyl-indenyliden] (chloro)ruthenium(II) | ROMP catalyst | Umicore |
| Umicore 22 | cis-[1,3-Bis(2,4,6-trimethylphenyl)-2-imidazolidinylidene]dichloro-(3-phenyl-1H-inden-1-ylidene) (triisopropylphos-phite)ruthenium(II) | ROMP catalyst | Umicore |
| Umicore 2 | 1,3-Bis(2,4,6-trimethylphenyl)-2-imidazolidinylidene] dichloro(3-phenyl-1H-inden-1-ylidene)(tricyclohexylphos-phine)ruthenium(II) | ROMP catalyst | Umicore |
| Umicore 61 | [1,3-Bis(2,4,6-trimethylphenyl)-2-imidazolidinylidene]dichloro[2-methyl(phenyl)amino]-benzylidene]ruthenium(II) | ROMP catalyst | Umicore |

TABLE 3-continued

| Trade Name | Chemical Type | Function | Optional Supplier |
|---|---|---|---|
| Triphenyl phosphine | Triphenyl phosphine | ROMP inhibitor | Sigma aldrich |
| Triethylphosphite | Triethylphosphite | ROMP inhibitor | Sigma aldrich |
| Trimethylphosphite | Trimethylphosphite | ROMP inhibitor | Sigma aldrich |
| tributylphosphite | tributylphosphite | ROMP inhibitor | Sigma aldrich |
| Irgacure PAG103 | | Photoacid generator (PAG) | BASF |
| Irgacure PAG121 | | Photoacid generator (PAG) | BASF |
| Trichloro(phenyl) silane | Trichloro(phenyl)silane | Chemically-activated Acid generator | Aldrich |
| -(4-Methoxystyryl)-4,6-bis(trichloromethyl)-1,3,5-triazine | | Photoacid generator (PAG) | TCI |
| TMCH | | Photoacid generator (PAG) | |
| Triphenyl sulfonium chloride | | Photoacid generator (PAG) | Sigma Aldrich |

In exemplary embodiments of a single jetting single curing approach, a modeling material formulation comprises one or more of the ROMP monomers listed in Table 3 and one or more of the ROMP catalysts listed in Table 3. Depending on the selected catalyst, one or more of the ROMP inhibitors and/or one or more of the acid generators are also included. Optionally, and for the purpose of modifying mechanical and/or physical properties, one or more of the rubbers and/or epoxy resins are also included. Further optionally, an antioxidant such as listed in Table 3 is included.

Table 4 below presents a representative, non-limiting example of a modeling material formulation suitable for use in a single jetting single curing approach.

TABLE 4

| Component | Chemical name | Function | X | Y |
|---|---|---|---|---|
| DCPD | | ROMP Monomer | X | X |
| Grubbs 2st generation catalysts | [1,3-bis-(2,4,6-trimethylphenyl)-2-imidazolidinylidene]dichloro(phenyl methylene)(tricyclohexylphosphine)ruthenium | ROMP catalyst | X | |
| Triphenyl phosphine | Triphenyl phosphine | ROMP inhibitor | X | |
| pyridine | | ROMP inhibitor | | X |

In exemplary embodiments of a single jetting dual curing approach, one or more of the acrylate or methacrylate UV-curable monomers and/or one or more of the ROMP-UV curable monomers are also included in a formulation as described hereinabove.

Table 5 below presents an exemplary, non-limiting modeling material formulation usable in embodiments pertaining to a single jetting methodology, with formulations A, B C and E are representative for single curing approach and formulation D for dual curing.

TABLE 5

| Component (Trade name) | Function | A | B | C | D | E |
|---|---|---|---|---|---|---|
| ULTRENE ™ 99 DCPD | ROMP monomer - DCPD | | | X | | X |
| ULTRENE ™ 99-X DCPD | ROMP monomer - DCPD (88.8%) TCPD (10.9%) | X | X | | X | |
| SR 833S | Acrylic monomer (bifunctional) | | X | | | X |
| PolyBD605E | Epoxidized polybutadiene (bifunctional) | | | X | | |
| SR 423 | Methacrylic monomer | | | | X | |
| Photoactivatable catalyst | ROMP latent catalyst | X | X | X | X | X |

The photoactivatable catalyst is described in Beilsten J. Org. Chem., 2010, 6, 1106-1119.

Table 6 presents the mechanical properties of the formulations presented in Table 5 upon curing a molded formulation.

TABLE 6

| Mechanical properties | A | B | C | D | E |
|---|---|---|---|---|---|
| Impact (J/m) | 92.1 | 94 | 157 | 80 | 157 |
| HDT (° C.) | 93.2 | 87 | 54 | 150 | 55 |
| Post curing conditions | 2 hours at 85° C. | 5 hours at 70° C. | 1.5 hours at 140° C. | 5 hours at 70° C. | 5 hours at 70° C. |

Table 7 below presents non-limiting, exemplary modeling material formulations containing an acid-activatable catalyst, a photoacid generator (PAG) and a photosensitizer. Usable acid-activatable catalysts include, for example, those described in U.S. Pat. No. 6,486,279; WO 99/22865; and U.S. Patent Application having Publication No. US 2012/0271019, all of which are incorporated by reference as if fully set forth herein.

TABLE 7

| Component | Function | F | G |
|---|---|---|---|
| DCPD | ROMP Monomer (bifunctional; cross linker) | X | X |
| CPD oligomers | ROMP Monomer (bifunctional; cross linker) | X | X |
| Trilene77 | rubber | X | X |
| Acid-activatable catalyst | Pre-catalyst | X | X |

TABLE 7-continued

| Component | Function | F | G |
|---|---|---|---|
| 2-(4-Methoxystyryl)-4,6-bis(trichloromethyl)-1,3,5-triazine | PAG (photo activator) | X | X |
| ITX | Photosensitizer | X | |

Example 2

Dual Jetting, Single or Dual Curing

Tables 8, 9 and 10 below present exemplary components usable in a dual jetting methodology according to some embodiments of the present invention.

Table 8 below presents exemplary ROMP polymerizable monomers usable for a dual jetting single curing approach as described herein, and the properties of an object obtainable when these monomers co-polymerize in a mold, as described in the art (see, for example, www(dot)metton(dot)com/index(dot)php/metton-lmr/benefits).

TABLE 8

| Formulation | Component | Function | Impact (J/m)* | Tg (° C.)* |
|---|---|---|---|---|
| I | Metton LMR M15xx | ROMP monomer | 460 | >135 |
| II | Metton M2100VO | ROMP monomer | 400 | ND |

In exemplary embodiments, two modeling material formulations, I and II, are employed, each comprising a ROMP monomer as shown in Table 8. One of the formulations comprises a ROMP pre-catalyst and the other formulation comprises a suitable activator.

Table 9 below presents exemplary modeling material formulations which are usable in the context of embodiments of the present invention, pertaining to a dual jetting dual curing approach. Formulation Model I includes one or more ROMP monomers and a photoinitiator for cationic polymerization, and optionally a rubber, and Formulation Model II includes epoxy monomers (polymerizable via cationic polymerization) and an activatable catalyst for ROMP.

TABLE 9

| Formulation | Component | Function | A | B |
|---|---|---|---|---|
| Model I | DCPD | ROMP Monomer (bifunctional; crosslinker) | X | X |
| | CPD oligomers | ROMP Monomer (bifunctional; crosslinker) | X | X |
| | Trilene77 | rubber | X | X |
| | UVACURE1600 | Cationic Photoinitiator | X | X |
| Model II | ITX | Photo- sensitizer | X | X |
| | UVACURE1500 | Epoxy monomer | X | |
| | Celloxide 8000 | Epoxy monomer | | X |
| | Genorad 20 | Stabilizer | X | X |
| | Grubbs $2^{nd}$ Gen | ROMP active catalyst | X | X |

Table 10 below presents the properties of an object obtainable upon dual curing of formulations I and II presented in Table 9, used at weight ratio of 70:30 (I:II).

TABLE 10

| Mechanical properties | A | B |
|---|---|---|
| Impact (J/m) | 60 | 67 |
| HDT (° C.) | 90 | 93 |
| Post curing conditions | 2 h at 150° C. | 2 h at 150° C. |

Additional, non-limiting exemplary modeling material formulations suitable for use in a dual jetting dual curing approach according to some embodiments of the invention are shown in Table 11.

TABLE 11

| Component (Trade name) | Function | Model I | Model II |
|---|---|---|---|
| ULTRENE ™ 99 DCPD | DCPD (ROMP) monomer | X | |
| Uvacure 1600 | Cationic photoinitiator | X | |
| Uvacure 1500 | Cycloaliphatic epoxide (UV-curable monomer) | | X |
| Grubbs $2^{nd}$ Gen | ROMP catalyst | | X |

Table 12 below presents the mechanical properties of objects prepared using the modeling material formulations presented in Table 11.

TABLE 12

| Mechanical properties | |
|---|---|
| Impact (J/m) | 65 |
| HDT (° C.) | 63 |
| Post curing conditions | 2 h at 85° C. |

Additional, non-limiting exemplary modeling material formulations suitable for use in a dual jetting dual curing approach according to some embodiments of the invention are shown in Table 13.

TABLE 13

| Component (Trade name) | Function | Model I | Model II |
|---|---|---|---|
| ULTRENE ™ 99 DCPD | DCPD (ROMP) monomer | X | |
| Irgacure I-819 | Radical photoinitiator | X | |
| Fancryl FA512 | Dicyclopentadienyloxyethyl acrylate (UV-curable monomer) | | X |
| Grubbs $2^{nd}$ Gen | ROMP catalyst | | X |

Table 14 below presents the mechanical properties of objects prepared using the modeling material formulations presented in Table 13.

TABLE 14

| Mechanical properties | |
|---|---|
| Impact (J/m) | 72 |
| HDT (° C.) | 73 |
| Post curing conditions | 5 h at 70° C. |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of fabricating a three-dimensional object, the method comprising sequentially forming a plurality of layers in a configured pattern corresponding to the shape of the object, thereby forming the object, wherein said formation of each layer comprises dispensing by at least one inkjet printing head at least one modeling material formulation, said at least one modeling material formulation comprising an unsaturated cyclic monomer polymerizable by ring opening metathesis polymerization (ROMP) and a catalyst for initiating ROMP of said monomer; and exposing the modeling material formulation to a condition for inducing initiation of ROMP of said monomer by said catalyst, to thereby obtain a cured modeling material, wherein prior to said exposing said catalyst does not initiate ROMP of said monomer, wherein said at least one modeling material formulation is characterized by a viscosity of no more than 35 centipoises at a temperature of said inkjet printing head during said dispensing, and wherein said at least one modeling material formulation further comprises an activator for chemically activating said catalyst towards initiating ROMP of said monomer, and wherein prior to said exposing, said activator is incapable of activating said catalyst.

2. The method of claim 1, wherein said modeling material formulation is such that said catalyst is active towards initiating ROMP of said monomer, and wherein prior to said exposing, said catalyst and said monomer are physically separated in said modeling material formulation.

3. The method of claim 2, wherein said condition comprises removing said physical separation between said catalyst and said monomer.

4. The method of claim 2, wherein at least one of said monomer and said catalyst is enveloped by a capsule and said condition affects a release of said monomer or said catalyst from said capsule.

5. The method of claim 1, wherein said modeling material formulation is such that said catalyst is inactive towards initiating ROMP of said monomer.

6. The method of claim 5, wherein said catalyst is activatable upon exposure to said condition.

7. The method of claim 1, wherein said activator is physically separated from said catalyst and/or said monomer in said modeling material formulation.

8. The method of claim 7, wherein said condition comprises removing said physical separation between said activator and said catalyst and/or said monomer.

9. The method of claim 7, wherein said activator is enveloped by a capsule, and said condition affects a release of said activator from said capsule.

10. The method of claim 1, wherein prior to said exposing, said activator is chemically inactive in said modeling material formulation.

11. The method of claim 10, wherein said activator is activatable upon exposure to said condition, such that exposing to said condition activates said activator, thereby activating said catalyst towards initiating ROMP of said monomer.

12. The method of claim 1, wherein said at least one modeling material formulation further comprises at least one material polymerizable or curable via a non-ROMP reaction, and wherein said exposing further comprises exposing said at least one modeling material formulation to a condition for inducing polymerization or curing of said at least one material.

13. The method of claim 12, wherein said material is polymerizable or curable upon exposure to irradiation (photopolymerizable).

14. The method of claim 12, wherein said polymerizable material and said unsaturated cyclic monomer polymerizable by said ROMP are included in the same modeling material formulation.

15. The method of claim 14, wherein at least one of said non-ROMP polymerizable or curable material, an initiator of said non-ROMP reaction, said monomer polymerizable by said ROMP, and said catalyst is physically separated from other components in said formulation.

16. The method of claim 12, wherein said formation of each layer comprises dispensing at least two modeling material formulations by at least two inkjet printing heads, each head jetting one of said at least two modeling material formulations.

17. The method of claim 16, wherein at least one of said modeling material formulations comprises said unsaturated cyclic monomer polymerizable by ROMP, and at least another one of said modeling material formulations comprises said catalyst.

18. The method of claim 17, wherein at least one of said modeling material formulations which comprises said monomer polymerizable by ROMP further comprises said activator for chemically activating said catalyst towards initiating ROMP of said monomer.

19. The method of claim 17, wherein said material polymerizable or curable by said non-ROMP reaction is comprised in at least one modeling material formulation which is devoid of said monomer polymerizable by said ROMP.

20. The method of claim 17, wherein at least one of said modeling material formulations further comprises an initiator of said non-ROMP reaction.

21. The method of claim 20, wherein said initiator is comprised in at least one modeling material formulation which is devoid of said material polymerizable or curable via said non-ROMP reaction.

22. The method of claim 12, wherein said condition for inducing ROMP of said unsaturated cyclic monomer and said condition for inducing polymerization or curing of said chemical group or material polymerizable or curable via a non-ROMP reaction are the same.

23. The method of claim 1, wherein said formation of each layer comprises dispensing at least two modeling material formulations by at least two inkjet printing heads, each head jetting one of said at least two modeling material formulations, wherein at least two of said modeling material formulations independently comprise said unsaturated cyclic monomer polymerizable by ROMP, and wherein at least one of said modeling material formulations comprises said catalyst.

24. The method of claim 23, wherein at least one of said modeling material formulations comprises said monomer and said catalyst.

25. The method of claim 24, wherein said catalyst is activatable by said condition.

26. The method of claim 23, wherein said catalyst is activatable by said activator, and at least one of said modeling material formulations comprises said activator and is devoid of said catalyst.

27. The method of claim 26, wherein at least one of said formulations comprises said monomer and said activator and at least another one of said formulations comprises said monomer and said catalyst.

28. The method of claim 1, wherein said at least one modeling material formulation further comprises an impact modifying agent, a stabilizing agent, a surface active agent, an elastomeric component or composition, and an antioxidant, a filler, a pigment, and a dispersant.

29. The method of claim 1, further comprising dispensing a support material formulation by at least one additional inkjet printing head.

30. The method of claim 1, wherein a temperature of an inkjet printing head for dispensing said at least one modeling material formulation ranges from 25° C. to 65° C.

31. The method of claim 1, a temperature of an inkjet printing head for dispensing said at least one modeling material formulation ranges from 65° C. to about 85° C.

32. The method of claim 1, wherein said condition is heat and wherein said exposing to said condition comprises heating said at least one modeling material formulation following said dispensing.

33. The method of claim 32, wherein said heating is by infrared radiation.

34. The method of claim 32, wherein said dispensing is in a chamber, and wherein said heating comprises heating said chamber to a temperature of from 25° C. to 65° C.

35. The method of claim 32, wherein said plurality of layers are formed on a working tray, the method comprising heating said working tray to a temperature of from 25° C. to 65° C.

36. The method of claim 1, wherein said dispensing and/or said exposing are performed under inert atmosphere.

37. The method of claim 1, further comprising straightening said layer by a leveling device.

38. The method of claim 37, further comprising removing cured or partially cured formulation off said leveling device.

39. The method of claim 37, wherein said straightening is while said at least one formulation is at a cured or partially cured state.

40. The method of claim 16, wherein at least one of said modeling material formulations comprises said unsaturated cyclic monomer polymerizable by ROMP, and said catalyst, and at least another one of said modeling material formulations comprises said activator for chemically activating said catalyst towards initiating ROMP of said monomer.

* * * * *

UNITED STATES PATENT AND TRADEMARK OFFICE
CERTIFICATE OF CORRECTION

PATENT NO. : 10,259,210 B2
APPLICATION NO. : 15/520458
DATED : April 16, 2019
INVENTOR(S) : Yuval Vidavsky et al.

It is certified that error appears in the above-identified patent and that said Letters Patent is hereby corrected as shown below:

On the Title Page

Item (73) Assignee:
"Statasys"
Should read:
-- Stratasys --

Signed and Sealed this
Twentieth Day of August, 2019

Andrei Iancu
*Director of the United States Patent and Trademark Office*